United States Patent
Morita et al.

(10) Patent No.: US 11,370,444 B2
(45) Date of Patent: Jun. 28, 2022

(54) VEHICLE CONTROL DEVICE, TERMINAL DEVICE AND VEHICLE CONTROL SYSTEM

(71) Applicant: HONDA MOTOR CO., LTD., Tokyo (JP)

(72) Inventors: Go Morita, Wako (JP); Takashi Ozeki, Wako (JP); Tomoyuki Sahata, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 107 days.

(21) Appl. No.: 16/829,008

(22) Filed: Mar. 25, 2020

(65) Prior Publication Data
US 2020/0307604 A1 Oct. 1, 2020

(30) Foreign Application Priority Data
Mar. 28, 2019 (JP) .............................. JP2019-064488

(51) Int. Cl.
| | |
|---|---|
| *B60W 40/06* | (2012.01) |
| *B60W 10/04* | (2006.01) |
| *B60W 10/22* | (2006.01) |
| *B60W 30/18* | (2012.01) |
| *B60W 50/00* | (2006.01) |

(52) U.S. Cl.
CPC ............ *B60W 40/06* (2013.01); *B60W 10/04* (2013.01); *B60W 10/22* (2013.01); *B60W 30/18172* (2013.01); *B60W 2050/0057* (2013.01); *B60W 2420/54* (2013.01); *B60W 2710/0605* (2013.01)

(58) Field of Classification Search
CPC ...... B60W 40/06; B60W 10/04; B60W 10/22; B60W 30/18172; B60W 2050/0057; B60W 2420/54; B60W 2710/0605
See application file for complete search history.

(56) References Cited

U.S. PATENT DOCUMENTS

| | | | | |
|---|---|---|---|---|
| 2004/0094912 | A1* | 5/2004 | Niwa | B60G 17/0165 |
| | | | | 280/5.518 |
| 2013/0234845 | A1 | 9/2013 | Kikuchi et al. | |
| 2016/0212525 | A1* | 7/2016 | Nakadai | H04R 1/406 |
| 2016/0221581 | A1* | 8/2016 | Talwar | B60W 30/00 |
| 2017/0040030 | A1* | 2/2017 | Nakamura | G10L 25/78 |
| 2018/0286398 | A1 | 10/2018 | Nakano et al. | |

(Continued)

FOREIGN PATENT DOCUMENTS

| | | |
|---|---|---|
| JP | 06-138018 | 5/1994 |
| JP | 4444345 | 3/2010 |

(Continued)

*Primary Examiner* — Maceeh Anwari
*Assistant Examiner* — Charles Pall
(74) *Attorney, Agent, or Firm* — Amin, Turocy & Watson, LLP

(57) ABSTRACT

A vehicle control device includes an information acquisition unit that acquires road surface condition information indicative of a road surface condition determined on the basis of sound data obtained by performing sound source separation with respect to a sound acquired by a microphone array, a storage unit in which there is stored control content in accordance with the road surface condition, and a control unit which controls a drive unit provided on a vehicle, on the basis of the control content in accordance with the road surface condition indicated by the road surface condition information.

11 Claims, 41 Drawing Sheets

(56) References Cited

U.S. PATENT DOCUMENTS

2019/0243371 A1\* 8/2019 Nister .................. G05D 1/0223
2020/0241552 A1\* 7/2020 Leenayongwut .... G05D 1/0088

FOREIGN PATENT DOCUMENTS

| JP | 2010266399 A | \* 11/2010 | ......... B60G 17/0165 |
|----|--------------|------------|------------------------|
| JP | 2016-133304  | 7/2016     |                        |
| JP | 2017-032857  | 2/2017     |                        |
| JP | 6379376      | 8/2018     |                        |
| JP | 6427807      | 11/2018    |                        |

\* cited by examiner

VEHICLE CONTROL DEVICE, TERMINAL DEVICE AND VEHICLE CONTROL SYSTEM

CROSS-REFERENCE TO RELATED APPLICATION

This application is based upon and claims the benefit of priority from Japanese Patent Application No. 2019-064488 filed on Mar. 28, 2019, the contents of which are incorporated herein by reference.

BACKGROUND OF THE INVENTION

Field of the Invention

The present invention relates to a vehicle control device, a terminal device, a server device, a vehicle, a vehicle control system, and a vehicle control method.

Description of the Related Art

In Japanese Laid-Open Patent Publication No. 06-138018, a road surface condition measurement device is disclosed, which acquires travel sounds of a vehicle, acquires frequency spectrum information by performing a frequency analysis on the travel sounds, and outputs the road surface condition on the basis of the frequency spectrum information.

SUMMARY OF THE INVENTION

However, Japanese Laid-Open Patent Publication No. 06-138018 does not go beyond simply disclosing that the road surface condition is output on the basis of a frequency spectrum of the travel sounds.

An object of the present invention is to provide a vehicle control device, a terminal device, a server device, a vehicle, a vehicle control system, and a vehicle control method, which are capable of controlling a vehicle satisfactorily in accordance with the road surface condition.

A vehicle control device (110) according to one aspect of the present invention comprises an information acquisition unit (129) configured to acquire road surface condition information indicative of a road surface condition determined on the basis of separation data obtained by sound source separation performed with respect to a sound acquired by a microphone array (202a), a storage unit (128) in which there is stored control content in accordance with the road surface condition, and a control unit (130) configured to control a drive unit (115) provided on a vehicle (100), on the basis of the control content in accordance with the road surface condition indicated by the road surface condition information.

In accordance with such a configuration, since the sound source separation is performed, the sound from the front wheel can be selectively acquired while suppressing the acquisition of sounds emitted from the engine. Therefore, in accordance with such a configuration, the road surface condition can be determined more suitably, and it becomes possible for the vehicle to be controlled more satisfactorily depending on the road surface condition.

A Fourier transform may be performed on the sound data on the basis of the sound acquired by the microphone array (202a), a separation data may be obtained by the sound source separation performed with respect to the transformation data obtained by the Fourier transform, a power spectrum may be acquired on the basis of the separation data obtained by the sound source separation, and the road surface condition may be determined by comparing the power spectrum with previously acquired spectrum models for each of respective road surface conditions.

The vehicle (100) is a two-wheeled vehicle, and a sound from a front wheel (20) of the two-wheeled vehicle may be acquired in the sound source separation.

A position of the sound source is estimated by performing sound source localization with respect to the sound acquired by the microphone array (202a), and the sound from a sound source corresponding to the front wheel (20) of the two-wheeled vehicle may be obtained by the sound source separation.

The sound source localization may be performed using beam forming. The sound source separation may be performed using a GHDSS (Geometric High-order Decorrelation-based Source Separation) method.

The control unit (130) may change an output characteristic of the drive unit (115) in accordance with the road surface condition.

The control unit (130) may change a degree of a throttle opening, which is dependent on an operated amount of a throttle grip (72) provided on the vehicle (100), in accordance with the road surface condition.

The control unit (130) may change a threshold value that activates a traction control system (132) in accordance with the road surface condition.

The control unit (130) may change an operating characteristic of an electronically controlled suspension (134) in accordance with the road surface condition.

A terminal device (200) according to another aspect of the present invention comprises a generating unit (204) configured to generate sound data on the basis of a sound acquired by a microphone array (202a), a Fourier transform unit (308) configured to generate transformation data by performing a Fourier transform on the sound data, a sound source separation unit (222) configured to acquire separation data by performing sound source separation with respect to the transformation data, a spectrum computation unit (310) configured to acquire a power spectrum on the basis of the separation data, and a communication unit (213) configured to transmit the power spectrum to a server device (300), receive road surface condition information from the server device (300) indicative of a road surface condition determined on the basis of the power spectrum, and transmit the received road surface condition information to a vehicle (100).

A terminal device (200) according to yet another aspect of the present invention comprises a generating unit (204) configured to generate sound data on the basis of a sound acquired by a microphone array (202a), and a communication unit (213) configured to transmit the sound data to a server device (300), receive road surface condition information from the server device (300) indicative of a road surface condition determined on the basis of the sound data, and transmit the received road surface condition information to a vehicle (100).

A server device (300) according to yet another aspect of the present invention comprises a communication unit (306) configured to receive from a terminal device (200) power spectrum on the basis of separation data obtained by the sound source separation performed with respect to a sound acquired by a microphone array (202a), and a road surface condition determination unit (312) configured to determine a road surface condition by comparing the power spectrum with previously acquired spectrum models for each of respective road surface conditions, wherein the communication unit (306) transmits to the terminal device (200) road surface condition information indicative of the road surface condition.

A server device (300) according to yet another aspect of the present invention comprises a communication unit (306) configured to receive from a terminal device (200) sound data on the basis of a sound acquired by a microphone array (202a), a Fourier transform unit (308) configured to generate transformation data by performing a Fourier transform on the sound data, a sound source separation unit (222) configured to acquire separation data by performing sound source separation with respect to the transformation data, a spectrum computation unit (310) configured to acquire a power spectrum on the basis of the separation data, and a road surface condition determination unit (312) configured to determine a road surface condition by comparing the power spectrum with previously acquired spectrum models for each of respective road surface conditions, wherein the communication unit (306) transmits to the terminal device (200) road surface condition information indicative of the road surface condition.

A vehicle (100) according to yet another aspect of the present invention comprises an information acquisition unit (129) configured to acquire road surface condition information indicative of a road surface condition determined on the basis of sound data obtained by performing sound source separation with respect to a sound acquired by a microphone array (202a), a storage unit (128) in which there is stored control content in accordance with the road surface condition, and a control unit (130) configured to control a drive unit (115), on the basis of the control content in accordance with the road surface condition indicated by the road surface condition information.

A vehicle control system (10) according to yet another aspect of the present invention comprises a terminal device (200) configured to transmit a power spectrum on the basis of separation data obtained by performing sound source separation with respect to a sound acquired by a microphone array (202a), a server device (300) configured to determine a road surface condition on the basis of the power spectrum supplied from the terminal device (200), and transmit to the terminal device (200) road surface condition information which is information concerning the road surface condition, and a vehicle (100) configured to control a drive unit (115) on the basis of control content in accordance with the road surface condition information supplied from the terminal device (200).

A vehicle control system (10) according to yet another aspect of the present invention comprises a terminal device (200) configured to transmit sound data obtained by performing sound source separation with respect to a sound acquired by a microphone array (202a), a server device (300) configured to determine a road surface condition on the basis of the sound data supplied from the terminal device (200), and transmit to the terminal device (200) road surface condition information which is information concerning the road surface condition, and a vehicle (100) configured to control a drive unit (115) on the basis of control content in accordance with the road surface condition information supplied from the terminal device (200).

A vehicle control method according to yet another aspect of the present invention comprises a step of acquiring road surface condition information indicative of a road surface condition determined on the basis of sound data obtained by performing sound source separation with respect to a sound acquired by a microphone array (202a), and a step of controlling a drive unit (115) provided on a vehicle (100), on the basis of control content in accordance with the road surface condition indicated by the road surface condition information.

According to the present invention, it is possible to provide a vehicle control device, a terminal device, a server device, a vehicle, a vehicle control system, and a vehicle control method, which are capable of controlling a vehicle satisfactorily in accordance with the road surface condition.

The above and other objects, features, and advantages of the present invention will become more apparent from the following description when taken in conjunction with the accompanying drawings, in which preferred embodiments of the present invention are shown by way of illustrative example.

DETAILED DESCRIPTION OF THE PREFERRED EMBODIMENTS

Preferred embodiments of a vehicle control device, a terminal device, a server device, a vehicle, a vehicle control system, and a vehicle control method according to the present invention will be presented and described in detail below with reference to the accompanying drawings.

First Embodiment

Figure 1:
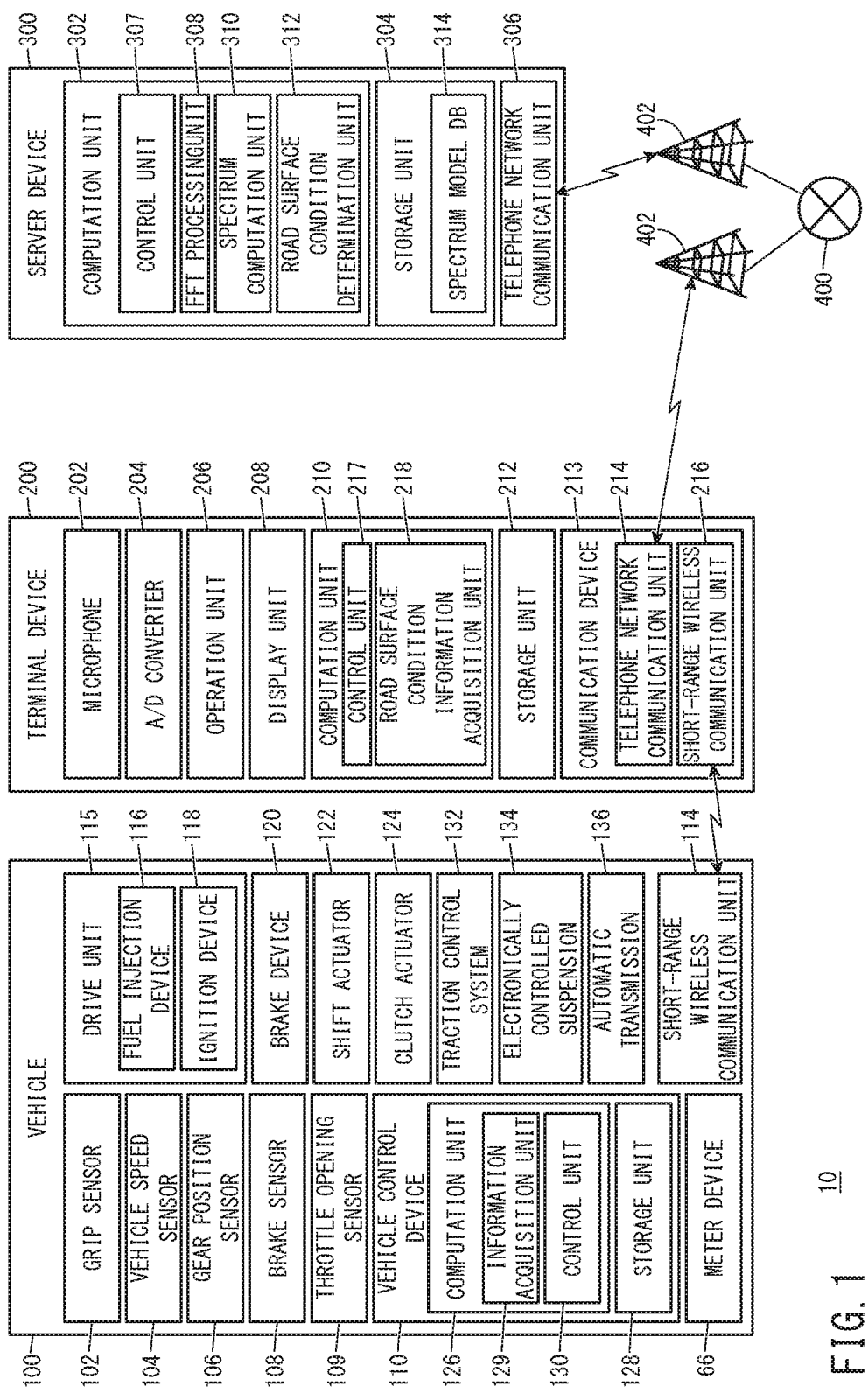
FIG. 1 is a block diagram showing a vehicle control system according to a first embodiment.

A vehicle control device, a terminal device, a server device, a vehicle, a vehicle control system, and a vehicle control method according to a first embodiment will be described with reference to FIGS. 1 to 20. FIG. 1 is a block diagram showing a vehicle control system according to the present embodiment.

The vehicle control system 10 according to the present embodiment can be configured by a vehicle 100, a terminal device (user terminal, portable terminal) 200, and a server device (server) 300; however, the present invention is not limited to this feature. In this instance, an exemplary case will be described in which the vehicle 100 is a two-wheeled vehicle; however, the present invention is not limited to this feature.

In the vehicle control system 10 according to the present embodiment, sound data acquired by the terminal device 200 that is mounted on the vehicle 100 is transmitted to the server device 300. The server device 300 determines the road surface condition on the basis of the sound data supplied from the terminal device 200. Road surface condition information, which is information indicative of the road surface condition, is transmitted from the server device 300 to the terminal device 200. The terminal device 200 transmits the road surface condition information to the vehicle 100. The vehicle 100 controls the vehicle 100 using the control content in accordance with the road surface condition information. For example, when the vehicle 100 is traveling in a sports mode, in the case that the vehicle 100 acquires road surface condition information indicating that the road surface is wet, the vehicle 100 switches the travel mode from the sports mode to a rain mode.

The vehicle 100 and the terminal device 200 are capable of performing short-range wireless communications. The concerned type of short-range wireless communications may include, for example, short-range communications based on the Bluetooth (registered trademark) standard or the like; however, the present invention is not limited to this feature.

The terminal device 200 and the server device 300 are capable of performing communications via a network (communication network) 400 or the like. The network 400, for example, is an Internet communications network; however, the present invention is not limited to this feature. FIG. 1 shows an example in which the terminal device 200 is a portable communication terminal. The portable communication terminal may include, for example, a smartphone; however, the present invention is not limited to this feature. In the case that the terminal device 200 is a portable communication terminal, the terminal device 200 and the server device 300 are capable of performing communications with each other via the network 400 and a relay station 402.

Figure 2:
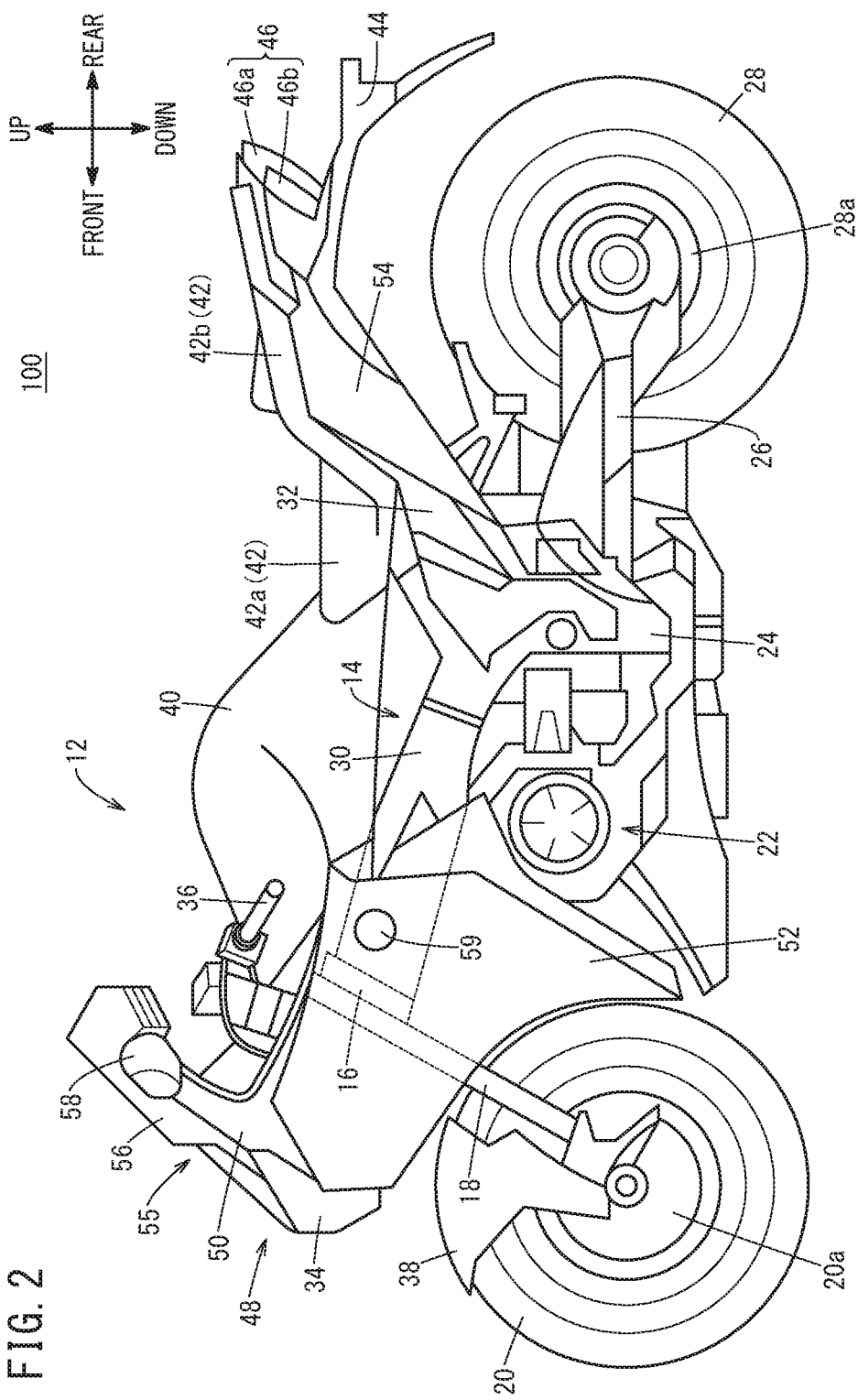
FIG. 2 is a side view showing a vehicle according to the first embodiment.

FIG. 2 is a side view showing a vehicle according to the present embodiment. In order to facilitate understanding of the present invention, unless otherwise specified, longitudinal (frontward/rearward) and vertical (upward/downward) directions will be described with reference to the directions of the arrows shown in FIG. 2. Further, lateral (leftward/rightward) directions will be described with reference to a direction as viewed from the perspective of a non-illustrated driver (user) who is seated on the vehicle body 12.

The vehicle 100 is equipped with a vehicle body frame 14 that constitutes the vehicle body 12, and a pair of left and right front forks 18 that are rotatably supported by a head pipe 16 provided at a front end of the vehicle body frame 14. The vehicle 100 is further equipped with a front wheel (steered wheel) 20 attached to the front forks 18. The vehicle 100 further includes a power unit 22. The power unit 22 includes a drive unit (engine) 115 (see FIG. 1), which serves as the drive source for the vehicle 100, and a non-illustrated automatic transmission. The drive unit 115 is supported by the vehicle body frame 14.

The vehicle body frame 14 is equipped with a pair of main frames 30 that extend obliquely downward from the head pipe 16, and pivot sections 24 connected to a rear part of the main frames 30 and extending downward. The vehicle 100 is further equipped with swing arms 26 swingably supported by the pivot sections 24. The vehicle 100 is further equipped with a rear wheel (driven wheel) 28 attached to the rear end of the swing arms 26. The vehicle body frame 14 is further equipped with a pair of left and right seat frames 32 attached to rear portions of the main frames 30 and extending obliquely upward and rearward.

A headlight 34 for irradiating light in front of the vehicle body 12 is provided in front of the head pipe 16. Above the head pipe 16, a bar-shaped handle 36 is provided that enables the front wheel 20 to be steered.

The front wheel 20 is rotatably supported at a lower end of the front forks 18. On a side surface of the front wheel 20, a front wheel brake device (disk brake) 20*a* is provided for applying a braking force to the front wheel 20. A front fender 38 that covers the front wheel 20 from above is provided at a lower end of the front forks 18.

The power unit 22 is fixedly supported by the main frames 30 and the pivot sections 24. The swing arms 26 extend in a rearward direction substantially horizontally from the pivot sections 24. The rear wheel 28 is rotatably supported at the rear end of the swing arms 26. On a side surface of the rear wheel 28, a rear wheel brake device (disk brake) 28*a* is provided for applying a braking force to the rear wheel 28. A brake device 120 (see FIG. 1) is constituted by the front wheel brake device 20*a* and the rear wheel brake device 28*a*.

A fuel tank 40 is provided above the power unit 22. Upwardly of the seat frames 32 and behind the fuel tank 40, a seat 42 is provided on which riders may be seated. The seat 42 is a tandem-type seat including a front seat 42*a*, and a rear seat 42*b* located behind the front seat 42*a*. A driver is seated on the front seat 42*a*, and a fellow passenger is seated on the rear seat 42*b*. A rear fender 44, which extends rearward and further extends obliquely downward from a lower rear side thereof, is provided at a rear portion of the seat frames 32. A tail lamp unit 46 is provided behind the seat 42. The tail lamp unit 46 includes a brake lamp 46*a* and rear side blinker lamps 46*b*.

The vehicle 100 is equipped with a vehicle body cover 48 that makes up the design (external appearance) of the vehicle body 12, in a manner extending along a longitudinal (front/rear) direction of the vehicle body 12. An upper cowl 50 that covers a front portion of the vehicle body 12, and a pair of left and right side cowls 52 that extend in a rearward direction from both side surfaces of the headlight 34 are provided on the vehicle body cover 48. The vehicle body cover 48 is further equipped with a rear cowl 54 that extends rearward and upwardly along the seat frames 32, and covers both side surfaces of the seat frames 32. A windshield 56 is provided on an upper part of the upper cowl 50. Side mirrors 58 are provided on left and right sides of the upper cowl 50. Front side blinker lamps 59 are further provided on the left and right side cowls 52.

Figure 3:
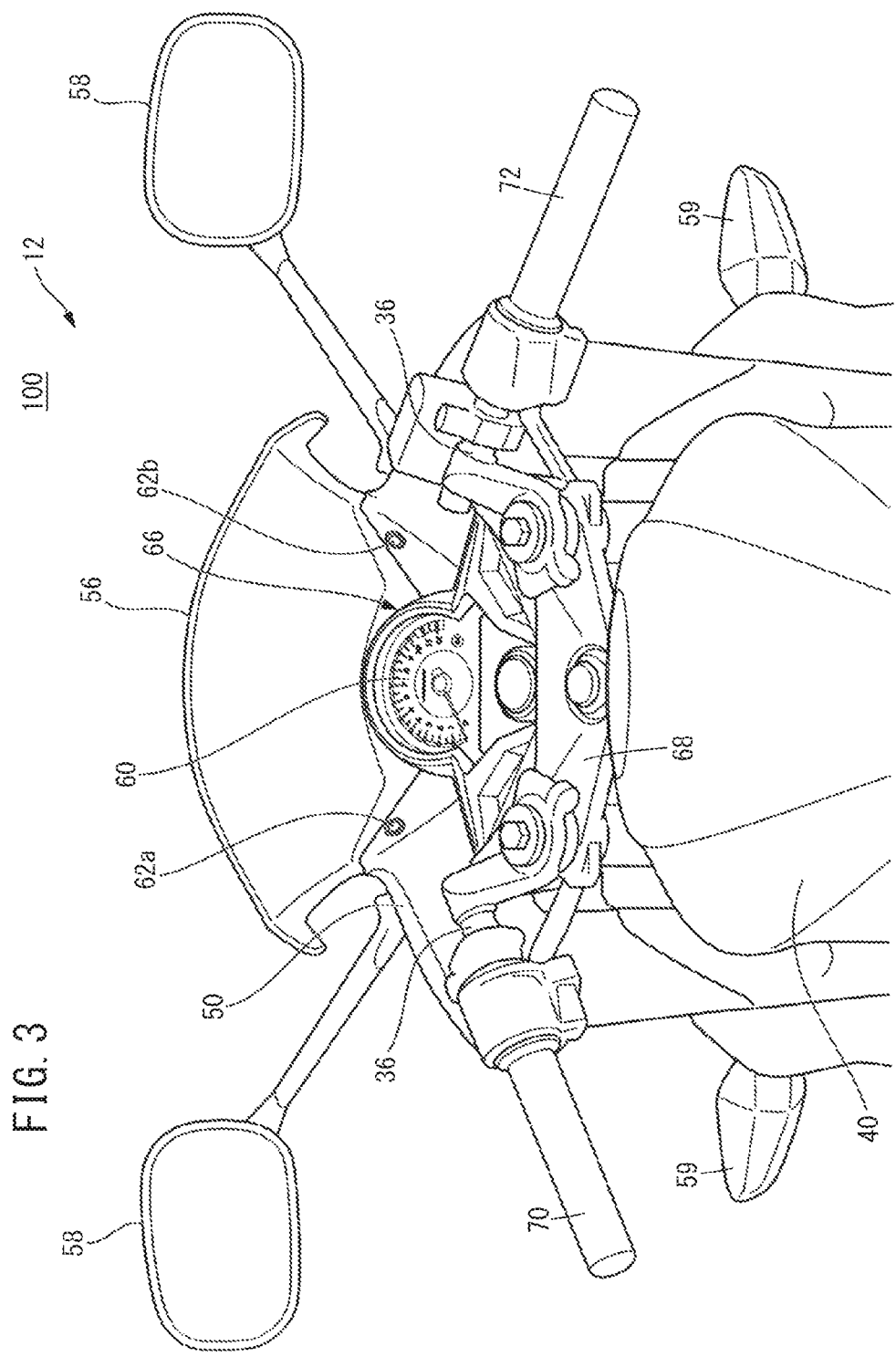
FIG. 3 is a view showing a portion of the vehicle according to the first embodiment.

FIG. 3 is a view showing a portion of the vehicle according to the present embodiment. FIG. 3 shows a state in which the periphery of the handle is looked down on from behind and above the vehicle body 12. FIG. 3 shows a state in which a mounting member 64 (see FIG. 4) for mounting the terminal device 200 (see FIG. 5) to the vehicle body 12 is not attached to the upper cowl 50. A meter device 66 having a tachometer (engine rotation meter) 60 is provided on the upper cowl 50 between the windshield 56 and the handle 36. The meter device 66 can display the engine rotational speed, the vehicle speed, and the like. The meter device 66 is attached to the upper cowl 50 through vibration preventative rubber.

Two non-illustrated bolt insertion holes are formed in the upper cowl 50. Further, two non-illustrated bolt insertion holes are formed in the windshield 56. The bolt insertion holes are located on outer sides in a vehicle widthwise direction with respect to the meter device 66. Bolts 62*a* and 62*b* are inserted into the bolt insertion holes. The upper cowl 50 and the windshield 56 are fastened together by the bolts 62*a* and 62*b* in a state in which they are superimposed on one another.

A handle shaft 68 that extends to the left and right is provided on the handle 36. A left grip 70 is provided on the left end of the handle shaft 68. A right grip, and more specifically, a throttle grip 72 is provided on the right end of the handle shaft 68. The throttle grip 72 is capable of being turned (rotated) with respect to the handle shaft 68, and is capable of issuing an instruction to accelerate (increase the engine rotational speed). The throttle grip 72 may also be referred to as an accelerator grip. A non-illustrated front wheel brake lever is provided on the vehicle body 12 on a front side of the throttle grip 72. At a base of the front wheel brake lever, a non-illustrated reserve tank is provided in which hydraulic oil of a hydraulic brake system is stored. A non-illustrated rear wheel brake lever is provided on the vehicle body 12 on a front side of the left grip 70. At a base of the rear wheel brake lever, a non-illustrated reserve tank is provided in which hydraulic oil of a hydraulic brake system is stored. By the driver operating the front wheel brake lever, a front wheel brake device 20*a* is operated to apply a braking force to the front wheel 20. Further, by the driver operating the rear wheel brake lever, the rear wheel brake device 28*a* is operated to apply a braking force to the rear wheel 28.

Figure 4:
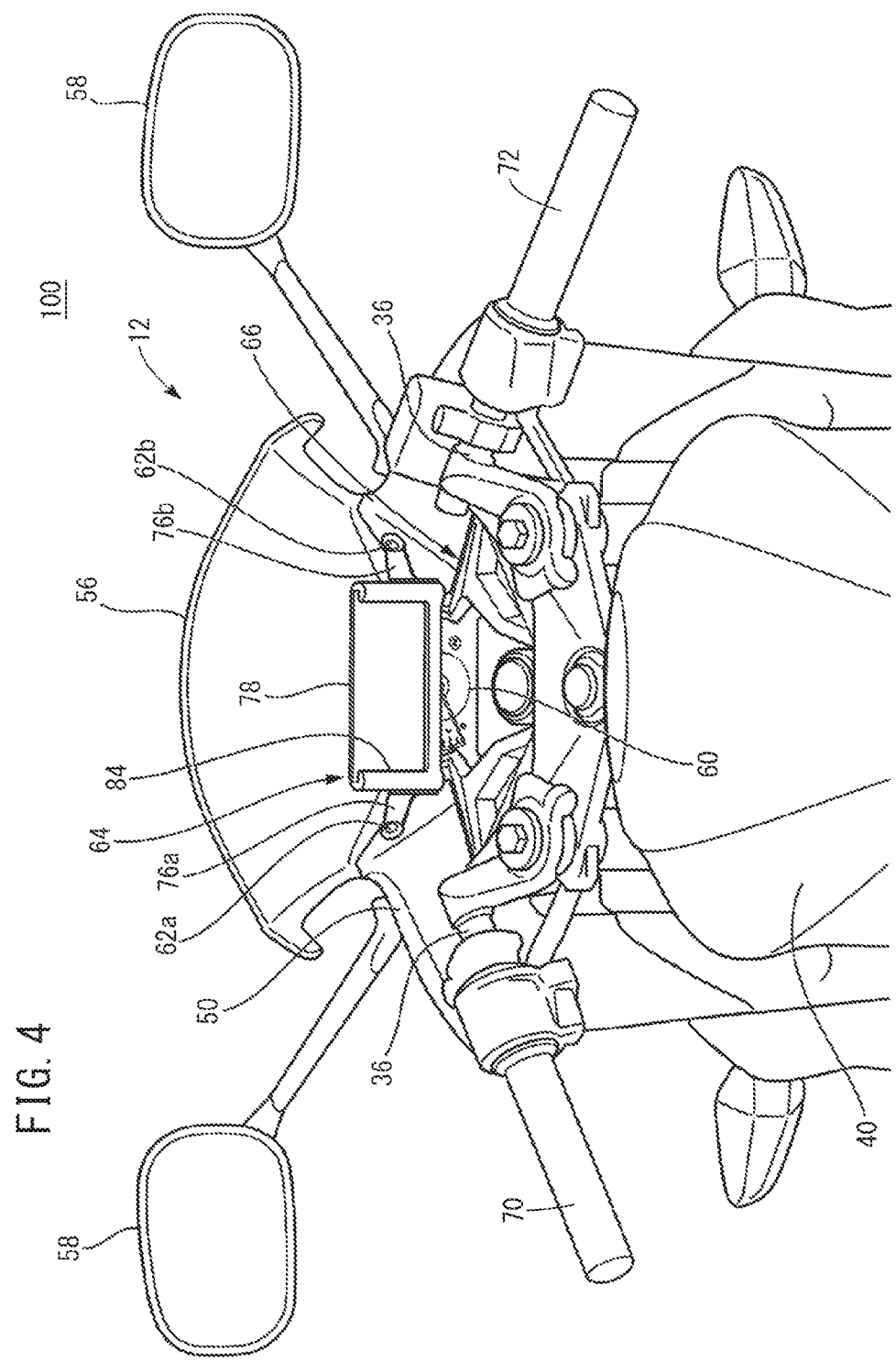
FIG. 4 is a view showing a portion of the vehicle according to the first embodiment.

FIG. 4 is a view showing a portion of the vehicle according to the present embodiment. FIG. 4 shows a state in which the mounting member 64 for mounting the terminal device 200 to the vehicle 100 is attached to the upper cowl 50.

As shown in FIG. 4, the mounting member 64 includes a retaining case 78 that retains the terminal device 200, and stays 76*a* and 76*b* that support the retaining case 78. The stays 76*a* and 76*b* are arranged on the left and right sides with the tachometer 60 sandwiched therebetween. The left side stay 76*a* extends rearwardly of the upper cowl 50 in a leftward direction of the tachometer 60. The right side stay 76*b* extends rearwardly of the upper cowl 50 in a rightward direction of the tachometer 60. The front ends of the stays 76*a* and 76*b* are jointly fastened by the bolts 62*a* and 62*b* that fasten the windshield 56 and the upper cowl 50. The rear ends of the stays 76*a* and 76*b* rotatably support the retaining case 78. In this manner, the mounting member 64 is fixed to the upper cowl 50 via the stays 76*a* and 76*b*. A window 84 is formed on the driver's side surface of the retaining case 78 in order that the display unit 82 (see FIG. 5) of the terminal device 200, which is accommodated in the retaining case 78, can be visually perceived by the driver.

Figure 5:
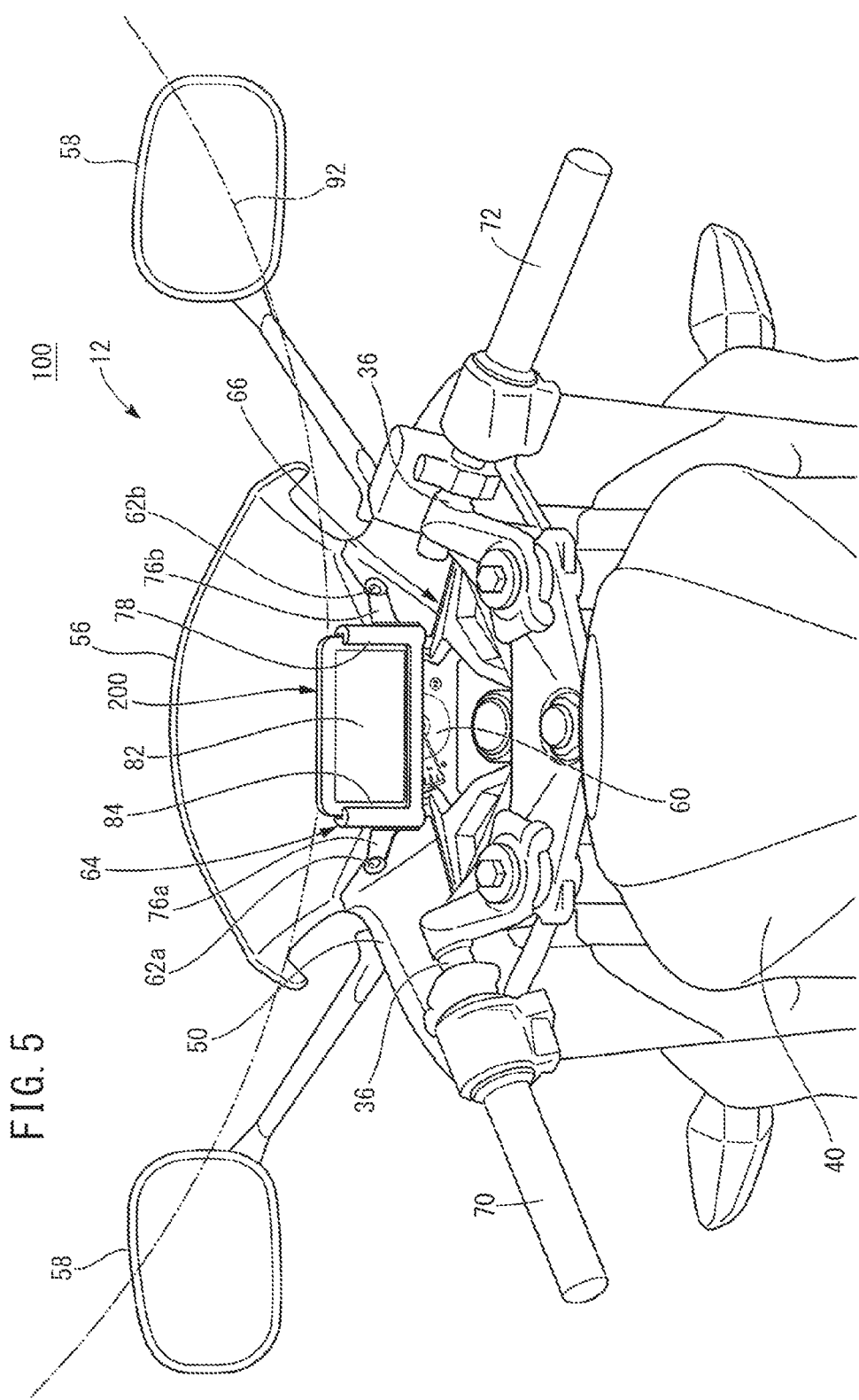
FIG. 5 is a view showing a portion of the vehicle according to the first embodiment.

FIG. 5 is a view showing a portion of the vehicle according to the present embodiment. FIG. 5 shows a state in which the terminal device 200 is accommodated in the retaining case 78 of the mounting member 64. The two-dot-dashed line in FIG. 5 shows an example of an image capturing range 92 of the image capturing unit (camera) 224 (see FIG. 6) provided in the terminal device 200.

As shown in FIG. 5, the driver can visually perceive through the window 84 the display unit 82 of the terminal device 200 that is accommodated in the retaining case 78. Moreover, as shown in FIG. 5, although a portion of the meter device 66 is incapable of being visually perceived due to the mounting member 64 and the terminal device 200, as will be discussed later, since the display content of the meter device 66 can be displayed on the terminal device 200, no particular problem arises.

Figure 6:
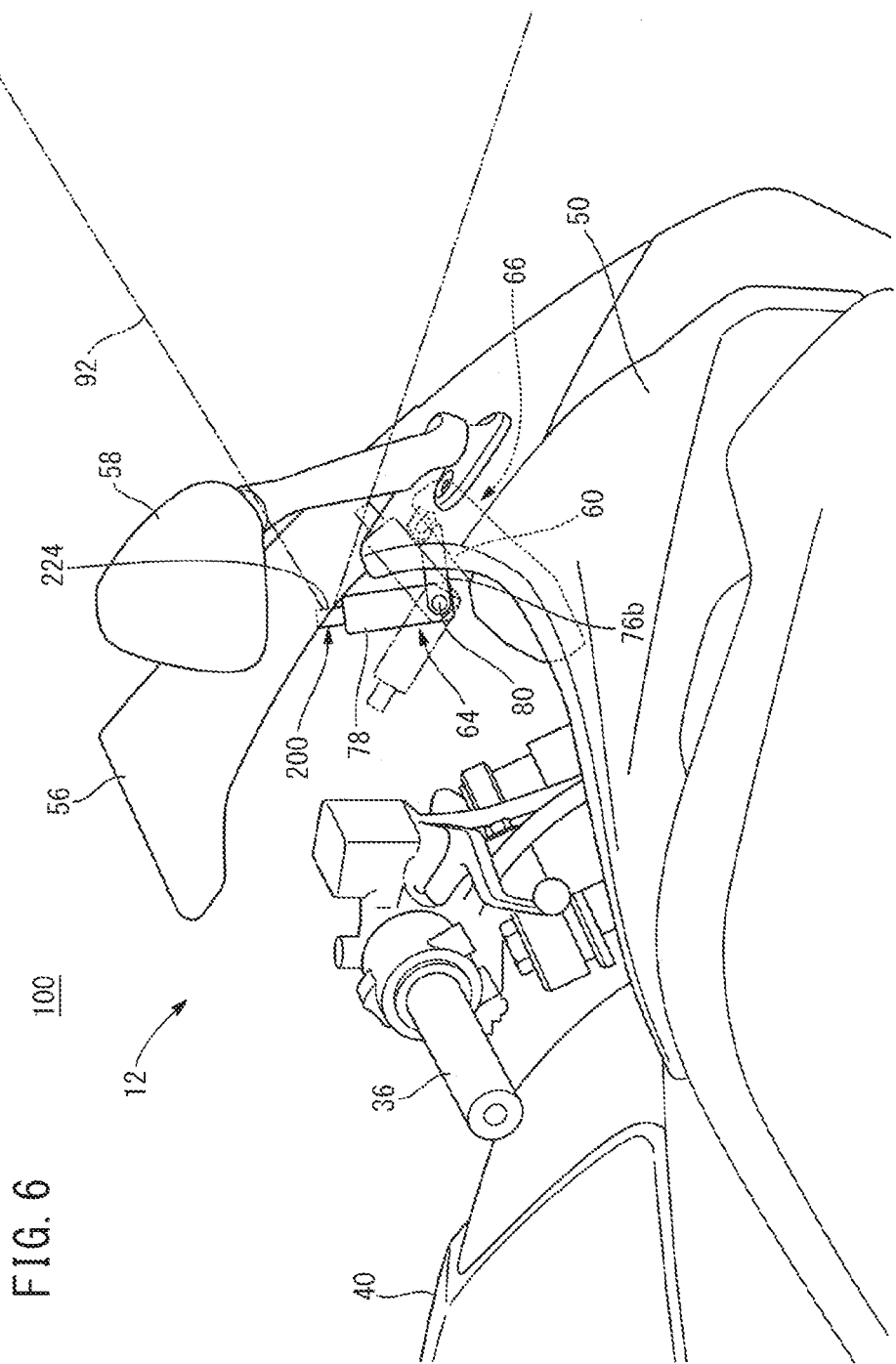
FIG. 6 is a side view showing a portion of the vehicle according to the first embodiment.

FIG. 6 is a view showing a portion of the vehicle according to the present embodiment. At the rear ends of the stays 76a and 76b, hinge shafts 80 are provided that project toward inner sides in the vehicle widthwise direction. The retaining case 78 is rotatably supported by the hinge shafts 80. The retaining case 78 is rotatable about a horizontal axis along the vehicle widthwise direction.

An image capturing unit 224 is provided on a rear surface of the terminal device 200. The dimensions of the rear surface side of the retaining case 78 are set in a manner so that the image capturing unit 224 is exposed from the retaining case 78. Therefore, in a state in which the terminal device 200 is retained by the mounting member 64, the terminal device 200 can capture images in a frontward direction of the vehicle 100 via the windshield 56. The two-dot-dashed lines in FIG. 6 show an example of the image capturing range 92 of the image capturing unit 224 provided in the terminal device 200. Since the retaining case 78 can be rotated about the horizontal axis, the image capturing range 92 is capable of being changed by rotating the retaining case 78. Since the retaining case 78 can be rotated about the horizontal axis, by the driver changing the angle of inclination of the retaining case 78, the angle of the display unit 82 of the terminal device 200 can be adjusted to an easily viewable angle.

Figure 7:
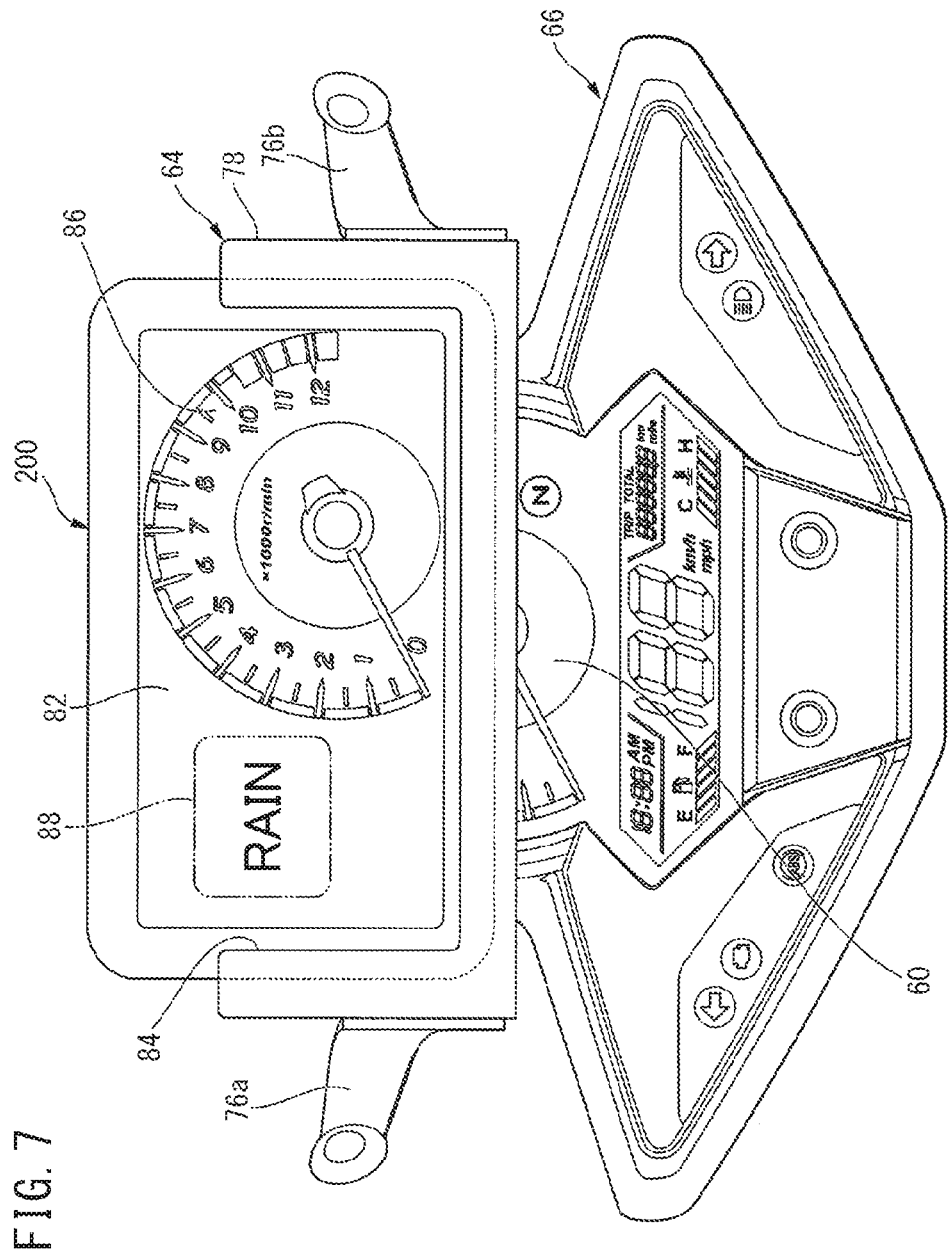
FIG. 7 is a view showing a portion of the vehicle according to the first embodiment.

FIG. 7 is a view showing a portion of the vehicle according to the present embodiment. As shown in FIG. 7, on the display unit 82, there are provided a display area 86 for displaying an engine speed or the like, and a display area 88 for displaying a travel mode or the like. In this instance, an example is shown in which the travel mode is the rain mode.

Figure 8A:
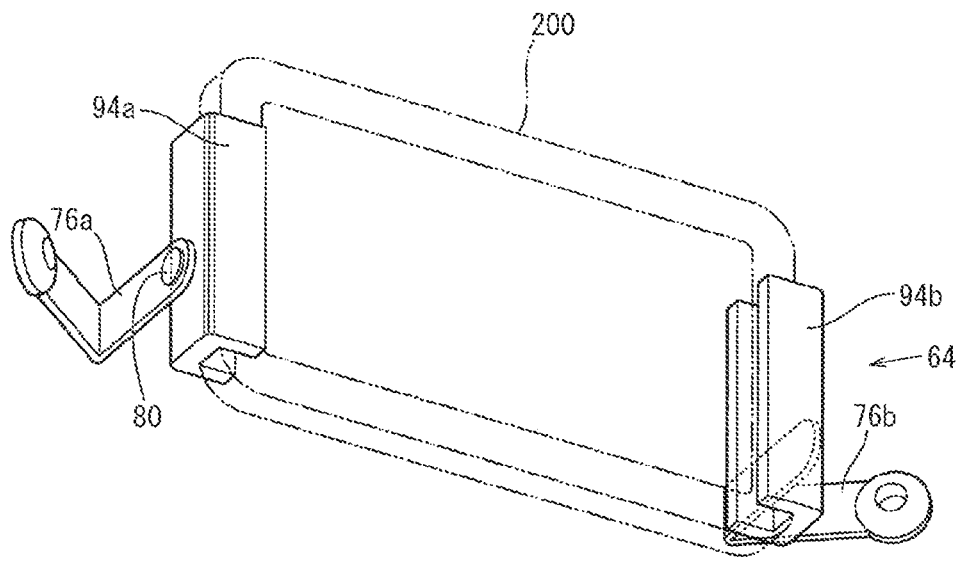
FIGS. 8A and 8B are views showing an example of another mounting member.
Figure 8B:
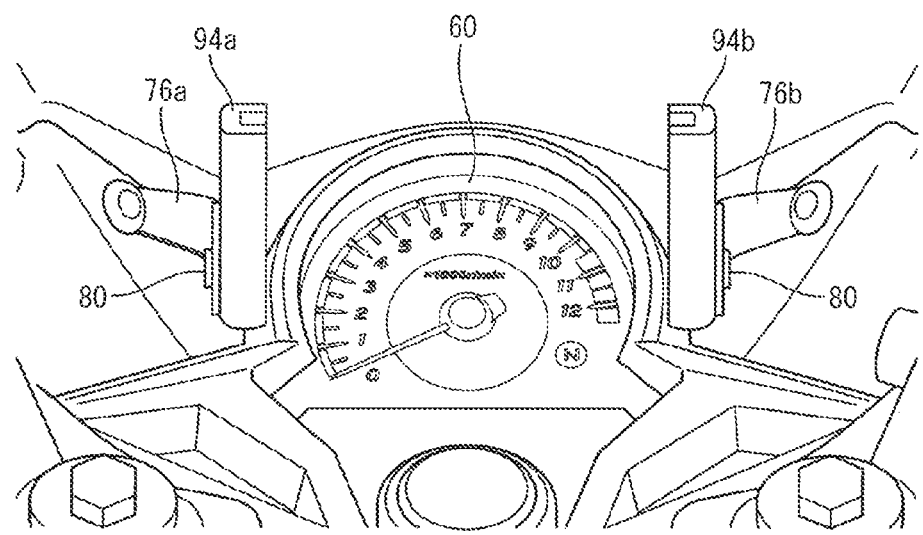

FIGS. 8A and 8B are views showing an example of another mounting member. In the example shown in FIGS. 8A and 8B, the mounting member 64 includes retaining sections 94a and 94b and stays 76a and 76b. The retaining sections 94a and 94b are rotatably supported by the hinge shafts 80 provided at rear ends of the stays 76a and 76b. The retaining sections 94a and 94b are U-shaped in cross section. The terminal device 200 is mounted in the mounting member 64 so as to be sandwiched between the retaining sections 94a and 94b that are U-shaped in cross section. Moreover, as shown in FIG. 8B, when the terminal device 200 is not retained by the retaining sections 94a and 94b, the driver is capable of visually perceiving the entire area of the tachometer 60.

As shown in FIG. 1, the vehicle 100 is further equipped with a grip sensor 102, a vehicle speed sensor 104, a gear position sensor 106, a brake sensor 108, and a throttle opening sensor 109. The vehicle 100 is further equipped with a vehicle control device (ECU: Electronic Control Unit) 110, a meter device 66, a short-range wireless communication unit 114, and a drive unit 115. The vehicle 100 is further equipped with a shift actuator 122, a clutch actuator 124, a traction control system 132, an electronically controlled suspension 134, and an automatic transmission 136.

Moreover, although other constituent elements may be provided in the vehicle 100 apart from these constituent elements, description of such elements will be omitted herein.

The grip sensor (grip operation amount sensor, grip angle sensor) 102 detects an amount of operation, or stated otherwise, a grip operation amount (grip angle) of the throttle grip 72. The grip sensor 102 supplies grip operation amount information, which is information indicative of the detected grip operation amount, to the vehicle control device 110. The vehicle speed sensor 104 detects the speed, and more specifically, the vehicle speed of the vehicle 100, for example, by detecting the speed of rotation of the rear wheel 28. The vehicle speed sensor 104 supplies information, namely, vehicle speed information indicative of the detected vehicle speed to the vehicle control device 110. The gear position sensor 106 detects the gear position (shift gear stage) of the automatic transmission 136, and supplies information indicative of the detected gear position to the vehicle control device 110. The brake sensor 108 detects the pressure of a non-illustrated master cylinder provided in the brake device 120, and supplies brake pressure information, which is information indicative of the detected brake pressure, to the vehicle control device 110. The throttle opening sensor 109 detects an angle of rotation, and more specifically, a throttle angle of rotation (throttle opening) of a throttle valve, to be described later. The throttle opening sensor 109 supplies throttle angle of rotation information (throttle opening information), which is information indicative of the detected angle of rotation of the throttle, to the vehicle control device 110.

The vehicle control device 110 controls the overall operation of the vehicle 100. The vehicle control device 110 is equipped with a computation unit 126 and a storage unit 128. The computation unit 126 may be configured, for example, by a CPU (Central Processing Unit), an ASIC (Application Specific Integrated Circuit), or the like; however, the present invention is not limited to this feature. The computation unit 126 comprises an information acquisition unit 129 and a control unit 130. The information acquisition unit 129 and the control unit 130 can be realized by the computation unit 126 executing programs stored in the storage unit 128.

The storage unit 128 includes a non-illustrated volatile memory and a non-illustrated nonvolatile memory. As examples of the volatile memory, there may be cited a RAM or the like. As examples of the nonvolatile memory, there may be cited a ROM, a flash memory, or the like. Programs, tables, maps, and the like are stored, for example, in the nonvolatile memory. For example, control content and the like in accordance with the road surface condition information may be stored in the nonvolatile memory. More specifically, control content (travel characteristics) and the like in accordance with the travel mode can be stored in the nonvolatile memory.

The information acquisition unit 129 acquires road surface condition information, which is information indicative of the road surface condition determined on the basis of the sounds acquired by a microphone 202. The concerned road surface condition information is supplied from the server device 300 via the terminal device 200.

The drive unit 115, for example, is an engine, although the present invention is not limited to this feature. In this instance, a description will be given of a case in which the drive unit 115 is an engine. The engine 115 is equipped with a non-illustrated intake pipe. A non-illustrated throttle valve is provided in the intake pipe. The throttle valve adjusts an amount of intake air that is drawn into the engine 115. In the intake pipe, a fuel injection device (injector) 116 is provided, which produces an air-fuel mixture by injecting fuel into air that is supplied to a combustion chamber of the engine 115 via the throttle valve. In the engine 115, there is further provided an ignition device (ignition plug) 118 that ignites the air-fuel mixture flowing into the combustion chamber. By carrying out ignition by the ignition device 118, the air-fuel mixture existing in the combustion chamber undergoes combustion, and the engine 115 converts the combustion energy into motive power.

The throttle valve is equipped with a non-illustrated motor. Such a motor adjusts a degree of opening of the throttle valve. The motor is driven by a non-illustrated driver. A non-illustrated crankshaft, which is an output shaft of the engine 115, transmits power to the rear wheel 28 via the automatic transmission (transmission) 136.

The automatic transmission 136 includes a plurality of shift gear stages. The control unit 130 controls the automatic transmission 136 on the basis of a shift map, which is selected from among a plurality of shift maps that are stored in the storage unit 128. The control unit 130 switches the shift gear stage of the automatic transmission 136 in accordance with, for example, the vehicle speed and the throttle opening. Using the shift actuator 122, the control unit 130 carries out switching of a transmission ratio, and more specifically, switching of a change in the shift gear stage of the automatic transmission 136. The shift actuator 122 is configured, for example, using a hydraulic circuit. The automatic transmission 136 transmits the torque transmitted by the automatic transmission 136 to the rear wheel 28 while changing the transmission ratio (gear reduction ratio).

According to the present embodiment, a TBW (Throttle-By-Wire) method is employed in which the amount of the air-fuel mixture supplied to the combustion chamber is controlled by adjusting the throttle opening in accordance with the grip operation amount detected by the grip sensor 102.

The control unit 130 controls the engine rotational speed by adjusting the throttle opening in accordance with the grip operation amount, and by controlling a fuel injection amount, an injection timing, and an ignition period on the basis of the grip operation amount, the vehicle speed, and the like.

The control unit 130 transmits vehicle speed information indicative of the vehicle speed to the terminal device 200 via the short-range wireless communication unit 114. The control unit 130 acquires the road surface condition information from the server device 300 via the terminal device 200. The control unit 130 reads out from the storage unit 128 the control content corresponding to the road surface condition indicated by the road surface condition information, and controls the drive unit 115 on the basis of the control content read out from the storage unit 128. The control unit 130 can change an output characteristic of the drive unit 115 in accordance with the road surface condition. The control unit 130 can change the degree of a throttle opening, which is dependent on an operated amount of the throttle grip 72 provided on the vehicle 100, in accordance with the road surface condition. The control unit 130 can change a threshold value that activates the traction control system 132 in accordance with the road surface condition. The control unit 130 can change an operating characteristic of the electronically controlled suspension 134 in accordance with the road surface condition.

The clutch actuator 124 is configured using, for example, a hydraulic circuit, and can be used for switching between a connected (engaged) and a disconnected (non-engaged) state of a non-illustrated clutch. The traction control system 132 prevents the rear wheel 28 from idling at a time of starting, accelerating, or the like.

The short-range wireless communication unit 114 is equipped with a non-illustrated short-range wireless communication module. As the short-range wireless communication module, for example, a communication module that is compliant with the Bluetooth (registered trademark) standard can be used. The short-range wireless communication unit 114 is capable of performing short-range wireless communications with a short-range wireless communication unit 216 provided in the terminal device 200.

An example of the control content in accordance with the road surface condition will be described with reference to FIGS. 9 to 15.

Figure 9:
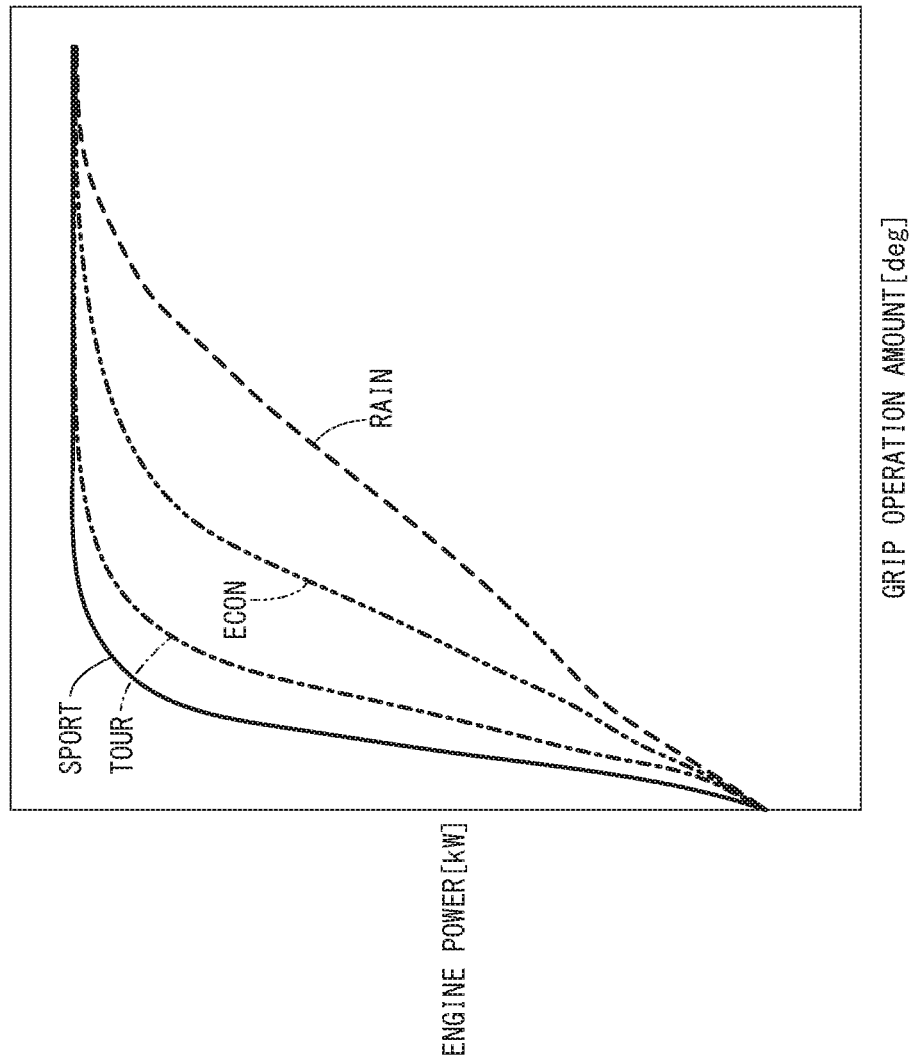
FIG. 9 is a graph showing engine output characteristics of the vehicle according to the first embodiment.

FIG. 9 is a graph showing engine output characteristics of the vehicle according to the present embodiment. FIG. 9 shows a relationship between the engine power and an amount of a gripping operation. The horizontal axis indicates the amount of the gripping operation, whereas the vertical axis indicates the engine power. The terms SPORT (sports), TOUR (touring), ECON (economy), and RAIN (rain) indicate scene-specific travel modes that match the travel scene. As shown in FIG. 9, in the rain mode, and more specifically, in a rainy travel mode, an increase in the engine power in accordance with an increase in the amount of the gripping operation is gentle. On the other hand, in the sports mode, the increase in the engine power in accordance with the increase in the amount of the gripping operation is steep.

Figure 10:
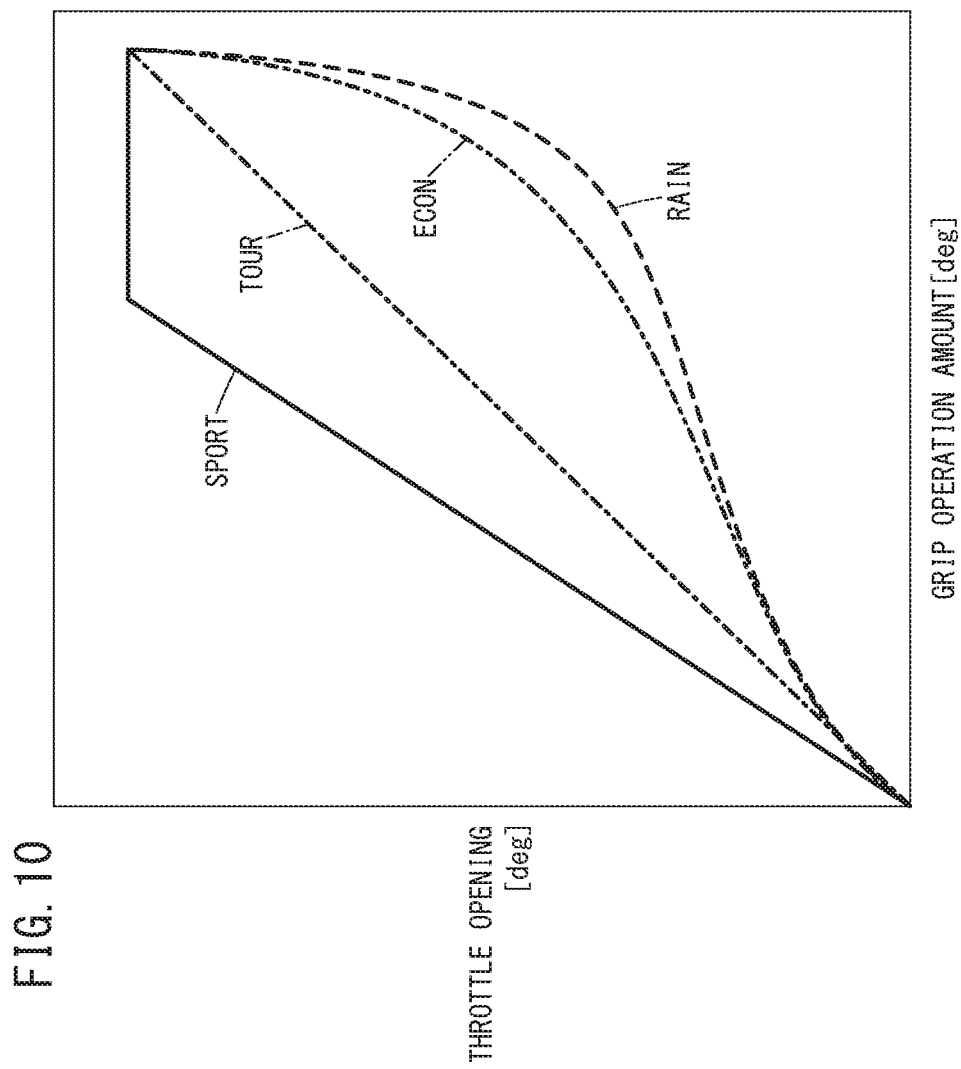
FIG. 10 is a graph showing TBW characteristics of the vehicle according to the first embodiment.

FIG. 10 is a graph showing TBW characteristics of the vehicle according to the present embodiment. FIG. 10 shows a relationship between the amount of the gripping operation and an angle of rotation of the throttle. The horizontal axis indicates the amount of the gripping operation, whereas the vertical axis indicates the angle of rotation of the throttle. As shown in FIG. 10, in the rain mode, an increase in the angle of rotation of the throttle in accordance with an increase in the amount of the gripping operation is gentle. On the other hand, in the sports mode, the increase in the angle of rotation of the throttle in accordance with the increase in the amount of the gripping operation is steep.

Figure 11:
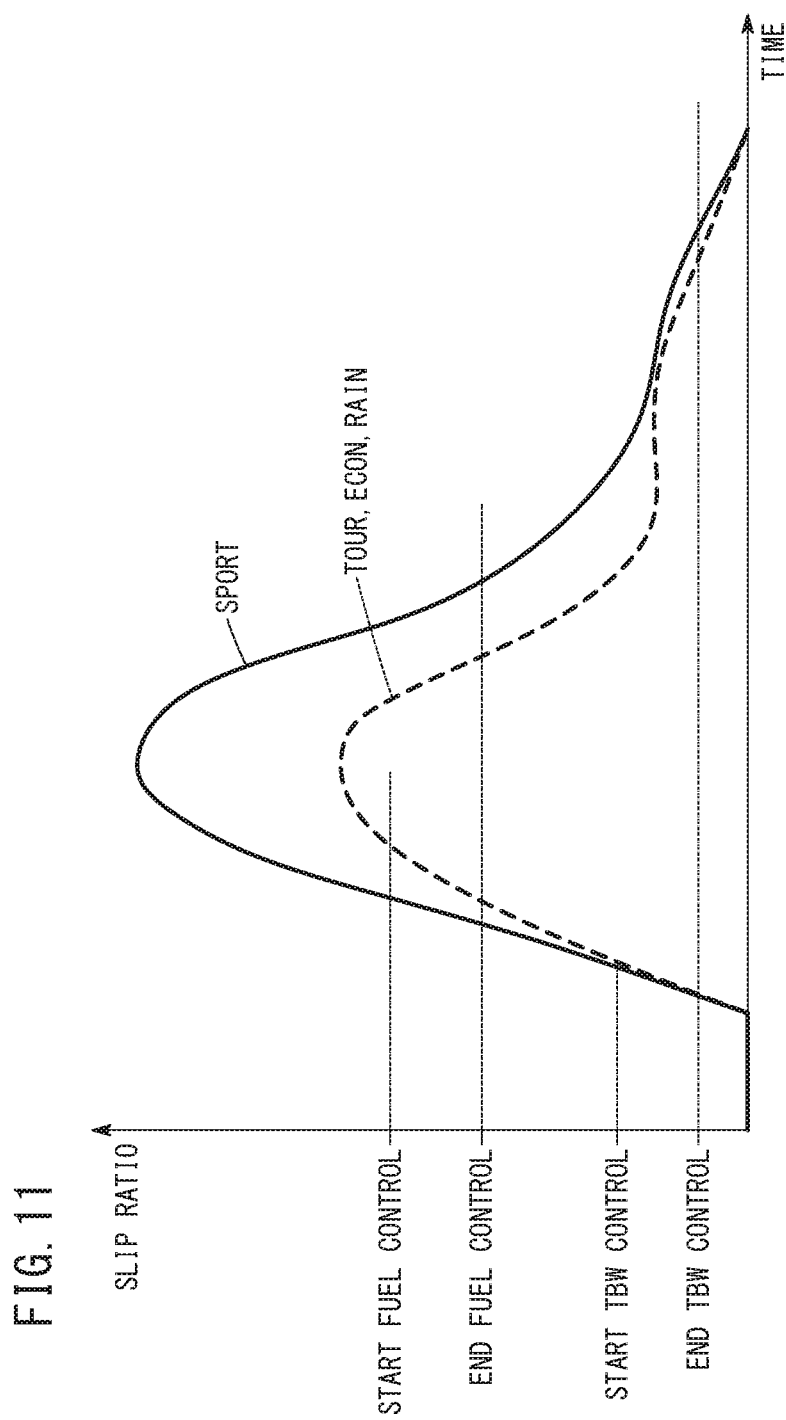
FIG. 11 is a graph showing operating characteristics of a traction control system of the vehicle according to the first embodiment.
Figure 12:
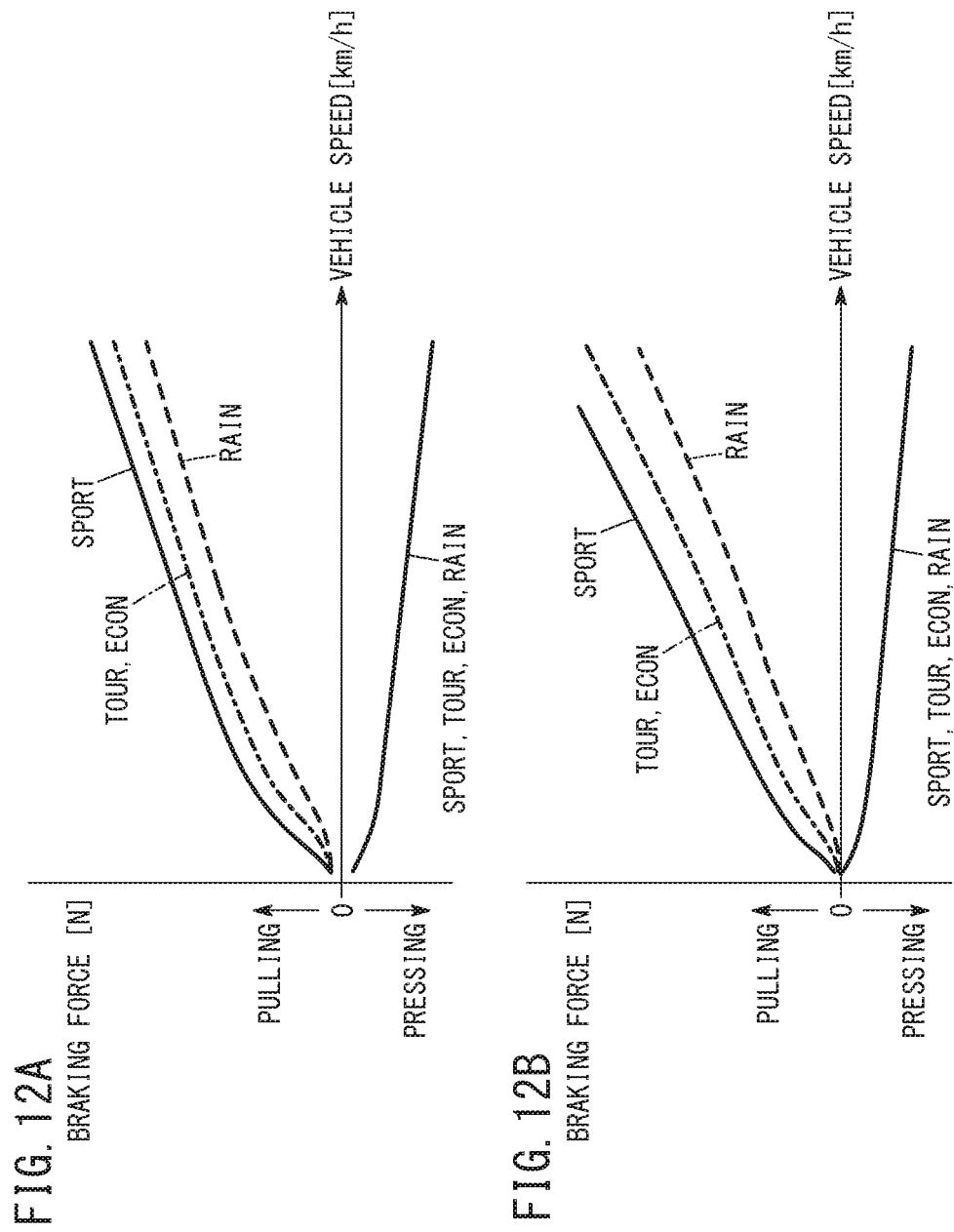
FIGS. 12A and 12B are graphs showing operating characteristics of an electronically controlled suspension of the vehicle according to the first embodiment.

FIG. 11 is a graph showing operating characteristics of the traction control system of the vehicle according to the present embodiment. The horizontal axis indicates time, whereas the vertical axis indicates a slip ratio.

FIGS. 12A and 12B are graphs showing operating characteristics of the electronically controlled suspension of the vehicle according to the present embodiment. The horizontal axis indicates the vehicle speed, whereas the vertical axis indicates a braking force. FIG. 12A shows the operating characteristics of the electronically controlled suspension on the side of the front wheel. FIG. 12B shows the operating characteristics of the electronically controlled suspension on the side of the rear wheel. As shown in FIGS. 12A and 12B, a pulling force in the rain mode is set to be smaller than a pulling force in the sports mode.

Figure 13:
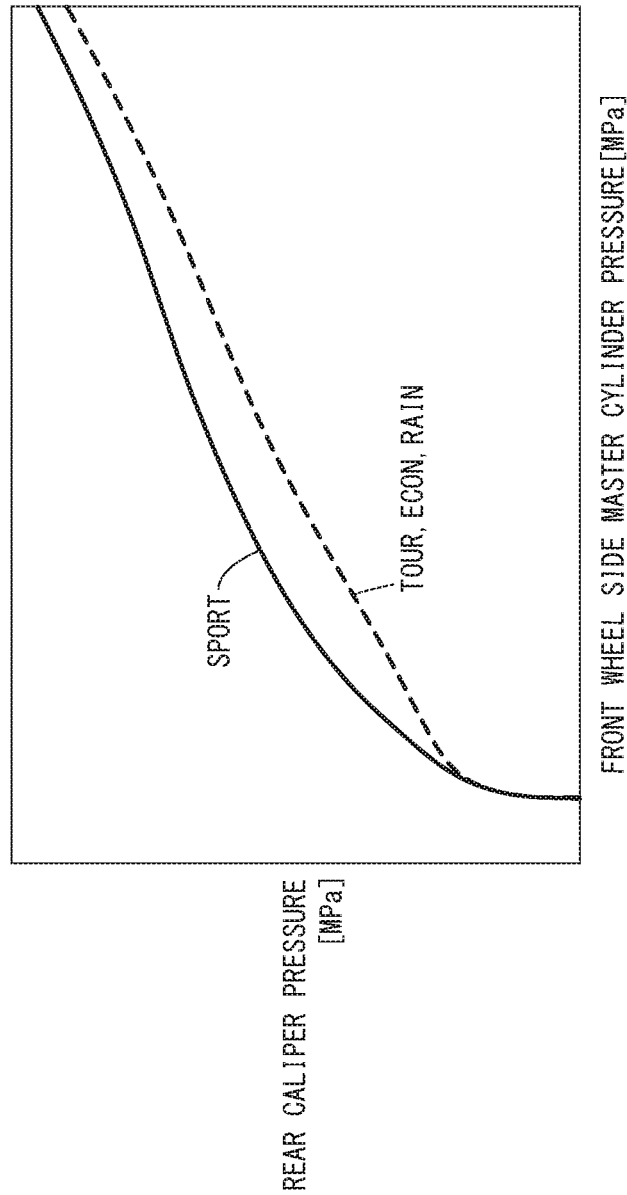
FIG. 13 is a graph showing rear brake characteristics of the vehicle according to the first embodiment.

FIG. 13 is a graph showing rear brake characteristics of the vehicle according to the present embodiment. The horizontal axis indicates the pressure of a master cylinder provided in the brake device 120 on the side of the front wheel, whereas the vertical axis indicates the pressure of a rear caliper. As shown in FIG. 13, in the rain mode, an increase in the pressure of the rear caliper with respect to an increase in the pressure of the master cylinder on the side of the front wheel is gentle. In contrast thereto, in the sports mode, the increase in the pressure of the rear caliper with respect to the increase in the pressure of the master cylinder on the side of the front wheel is steep.

Figure 14:
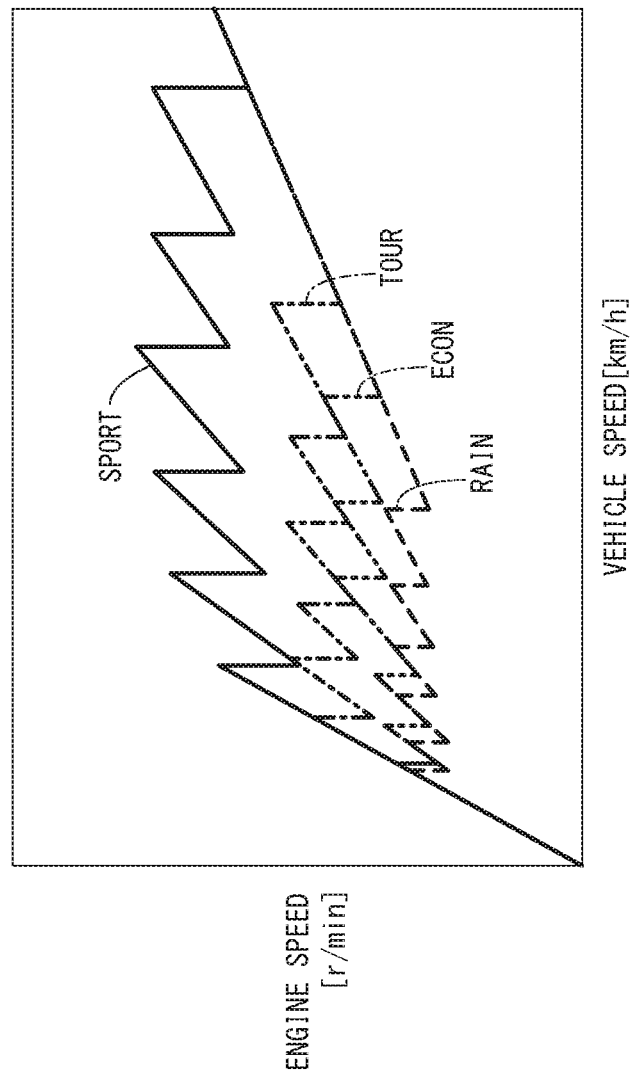
FIG. 14 is a graph showing gear change characteristics of the vehicle according to the first embodiment.

FIG. 14 is a graph showing gear change characteristics of the vehicle according to the present embodiment. The horizontal axis indicates the vehicle speed, whereas the vertical axis indicates the engine speed. As shown in FIG. 14, in the rain mode, switching is carried out from the first speed to the second speed before the engine speed becomes too high. On the other hand, in the sports mode, switching is not carried out from the first speed to the second speed until the engine speed becomes sufficiently high.

Figure 15A:
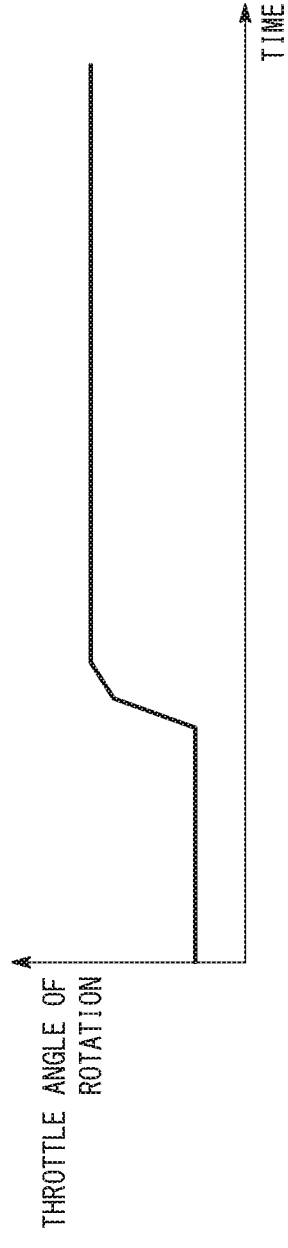
FIGS. 15A and 15B are graphs showing clutch control characteristics of the vehicle according to the first embodiment.
Figure 15B:
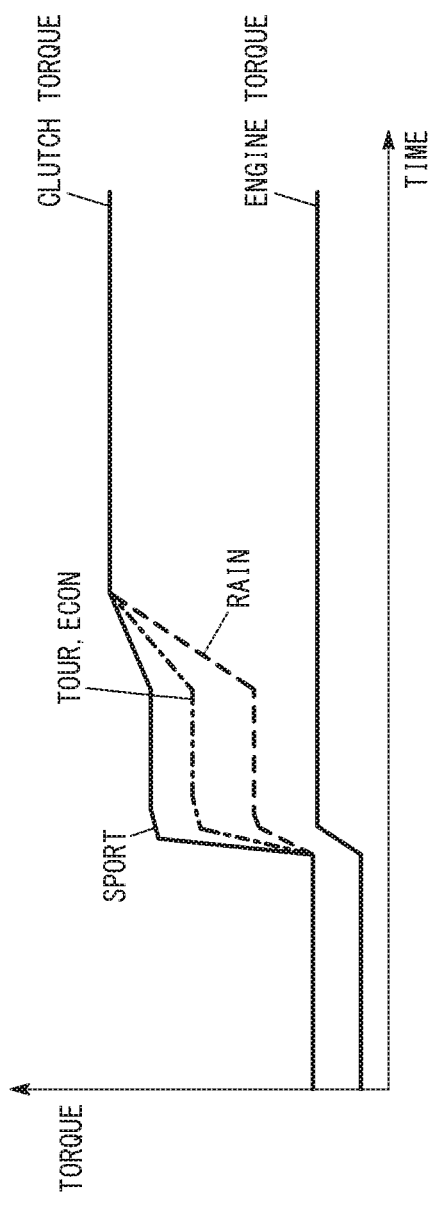

FIGS. 15A and 15B are graphs showing clutch control characteristics of the vehicle according to the present embodiment. The horizontal axes in FIG. 15A and FIG. 15B indicate time. The vertical axis in FIG. 15A indicates an angle of rotation of the throttle, whereas the vertical axis in FIG. 15B indicates torque. As shown in FIG. 15B, in the rain mode, an increase in the clutch torque is gentle. On the other hand, in the sports mode, the increase in the clutch torque is steep.

The terminal device 200 is equipped with the microphone 202, an A/D converter 204, an operation unit 206, a display unit 208, a computation unit 210, a storage unit 212, and a communication device (communication unit) 213. Moreover, although other constituent elements may be provided in the terminal device 200 apart from these constituent elements, description of such elements will be omitted herein.

The microphone 202 acquires sounds. The A/D converter 204 performs analog to digital conversion at a predetermined sampling interval with respect to the sounds acquired by the microphone 202. The A/D converter 204 supplies sound data obtained by analog to digital conversion to the computation unit 210. The A/D converter 204 is capable of functioning as a sound data generating unit (generating unit) that generates sound data on the basis of the sounds acquired by the microphone 202.

The operation unit 206 can be used when a user operates the terminal device 200. The display unit 208 includes a display element. As the display element, for example, a liquid crystal display element, an organic electroluminescence display element, or the like can be used. The operation unit 206 and the display unit 208 may be configured in the form of a touch panel equipped with such a display element.

The computation unit 210 may be configured, for example, by a CPU (Central Processing Unit), an ASIC (Application Specific Integrated Circuit), or the like; however, the present invention is not limited to this feature. The computation unit 210 comprises a control unit 217, and a road surface condition information acquisition unit (information acquisition unit) 218. The control unit 217 and the road surface condition information acquisition unit 218 can be realized by the computation unit 210 executing programs stored in the storage unit 212.

The control unit 217 governs the overall control of the terminal device 200. The control unit 217 acquires the vehicle speed information supplied from the vehicle 100 via the short-range wireless communication unit 216. The control unit 217 transmits the sound data supplied from the A/D converter 204 to the server device 300 via a telephone network communication unit 214. The road surface condition information acquisition unit 218 acquires the road surface condition information supplied from the server device 300 via the telephone network communication unit 214. The control unit 217 transmits the road surface condition information acquired by the road surface condition information acquisition unit 218 to the vehicle 100 via the short-range wireless communication unit 216.

The storage unit 212 includes a non-illustrated volatile memory and a non-illustrated nonvolatile memory. As examples of the volatile memory, there may be cited a RAM or the like. As examples of the nonvolatile memory, there may be cited a ROM, a flash memory, or the like. Programs, tables, maps, and the like are stored, for example, in the nonvolatile memory.

The communication device 213 is equipped with the telephone network communication unit 214 and the short-range wireless communication unit 216. A non-illustrated communication module which is capable of supporting a mobile telephone network is provided in the telephone network communication unit 214. The telephone network communication unit 214 can perform communications via the telephone network. The telephone network communication unit 214 is capable of performing communications with the telephone network communication unit 306 provided in the server device 300 via the relay station 402 and the network 400. The telephone network communication unit 214 transmits the sound data to the server device 300. Further, the telephone network communication unit 214 receives, from the server device 300, the road surface condition information indicative of the road surface condition that is determined based on the sound data.

The short-range wireless communication unit 216 is equipped with a non-illustrated short-range wireless communication module. As the short-range wireless communication module, for example, a communication module that is compliant with the Bluetooth (registered trademark) standard can be used. The short-range wireless communication unit 216 is capable of performing short-range wireless communications with the short-range wireless communication unit 114 provided in the vehicle 100. The short-range wireless communication unit 216 transmits the road surface condition information to the vehicle 100. It should be noted that a pairing setting is carried out in advance between the short-range wireless communication unit 114 provided in the vehicle 100 and the short-range wireless communication unit 216 provided in the terminal device 200.

The server device 300 is equipped with a computation unit 302, a storage unit 304, and a telephone network communication unit 306. Moreover, although other constituent elements may be provided in the server device 300 apart from these constituent elements, description of such elements will be omitted herein.

The computation unit 302 may be configured, for example, by a CPU (Central Processing Unit), an ASIC (Application Specific Integrated Circuit), or the like; however, the present invention is not limited to this feature. The computation unit 302 comprises a control unit 307, an FFT (Fast Fourier Transform) processing unit 308, a spectrum computation unit 310, and a road surface condition determination unit 312. The control unit 307, the FFT processing unit (Fourier transform unit) 308, the spectrum computation unit 310, and the road surface condition determination unit 312 can be realized by the computation unit 302 executing programs stored in the storage unit 304.

The control unit 307 governs the overall control of the server device 300. The control unit 307 receives the sound data supplied from the terminal device 200 via the telephone network communication unit 306. The FFT processing unit 308 performs a Fourier transform on the sound data supplied from the terminal device 200 to thereby generate the transformation data. The spectrum computation unit 310 acquires the power spectrum on the basis of the transformation data generated by the FFT processing unit 308. The road surface condition determination unit 312 determines the road surface condition by comparing spectrum models (sound spectrum models, power spectrum models), which are acquired in advance for each of respective road surface conditions, with the power spectrum acquired by the spectrum computation unit 310. The spectrum models acquired in advance for each of the respective road surface conditions are stored in a spectrum model database 314 to be described later. The control unit 307 transmits the road surface condition information indicative of the road surface condition to the terminal device 200 via the telephone network communication unit 306.

The storage unit 304 includes a non-illustrated volatile memory and a non-illustrated nonvolatile memory. As examples of the volatile memory, there may be cited a RAM or the like. As examples of the nonvolatile memory, there may be cited a ROM, a flash memory, or the like. Programs, tables, maps, and the like are stored, for example, in the nonvolatile memory.

A spectrum model database (spectrum model DB) 314 is provided in the storage unit 304. Spectrum models for each of respective road surface conditions are stored in the spectrum model database 314. As examples of the spectrum models for each of the respective road surface conditions, there may be cited a spectrum model for a case in which the road surface is dry, a spectrum model for a case in which the road surface is wet, and the like.

A non-illustrated communication module which is capable of supporting a mobile telephone network is provided in the telephone network communication unit (communication unit) 306. The telephone network communication unit 306 can perform communications via the telephone network. The telephone network communication unit 306 is capable of performing communications with the telephone network communication unit 214 provided in the terminal device 200 via the relay station 402 and the network 400. The telephone network communication unit 306 receives the sound data from the terminal device 200. The telephone network communication unit 306 transmits the road surface condition information indicative of the road surface condition to the terminal device 200.

Figure 16:
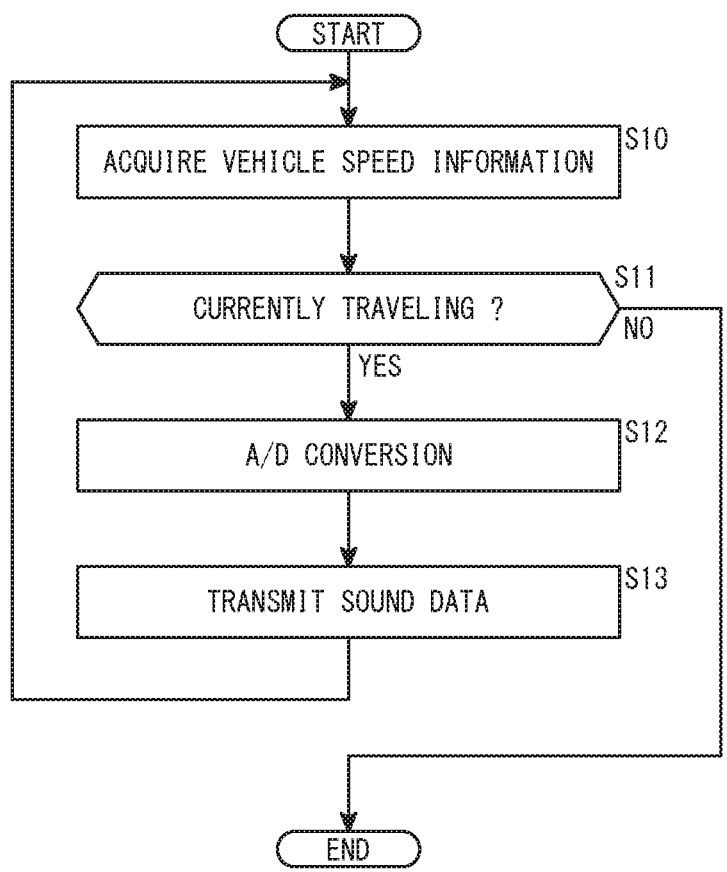
FIG. 16 is a flowchart illustrating an example of operations of a terminal device according to the first embodiment.

An example of operations of the terminal device 200 according to the present embodiment will be described with reference to FIG. 16. FIG. 16 is a flowchart illustrating an example of operations of the terminal device according to the first embodiment.

In step S10, the control unit 217 provided in the terminal device 200 acquires the vehicle speed information supplied from the vehicle 100 via the short-range wireless communication unit 216. Thereafter, the process transitions to Step S11.

In step S11, the control unit 217 determines whether or not the vehicle 100 is currently traveling on the basis of the vehicle speed information. In the case that the vehicle 100 is currently traveling (YES in step S11), the process transitions to step S12. In the case that the vehicle 100 is not currently traveling (NO in step S11), the process shown in FIG. 16 is brought to an end.

In step S12, analog to digital conversion is performed by the A/D converter 204 on the sound acquired by the microphone 202. The interval over which the analog to digital conversion is performed, for example, is on the order of 20 ms; however, the present invention is not limited to this feature. In this manner, the sound data is generated. Thereafter, the process transitions to Step S13.

In step S13, the control unit 217 transmits the sound data to the server device 300 via the telephone network communication unit 214. Thereafter, the processes of step S10 and the steps thereafter are repeated. In this manner, the process shown in FIG. 16 is performed.

Figure 17:
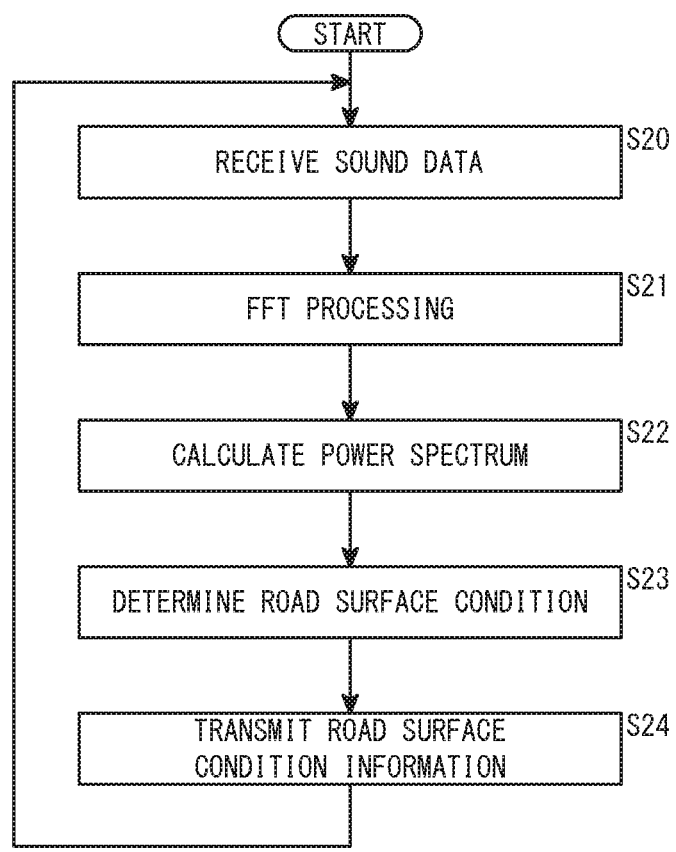
FIG. 17 is a flowchart illustrating an example of operations of a server device according to the first embodiment.

An example of operations of the server device 300 according to the present embodiment will be described with reference to FIG. 17. FIG. 17 is a flowchart illustrating an example of operations of the server device according to the present embodiment.

In step S20, the control unit 307 provided in the server device 300 receives the sound data supplied from the terminal device 200 via the telephone network communication unit 306. Thereafter, the process transitions to Step S21.

In step S21, the FFT processing unit 308 performs a Fourier transform on the sound data supplied from the terminal device 200 to thereby generate the transformation data. Thereafter, the process transitions to Step S22.

In step S22, the spectrum computation unit 310 calculates the power spectrum on the basis of the transformation data generated by the FFT processing unit 308. Thereafter, the process transitions to Step S23.

In step S23, the road surface condition determination unit 312 determines the road surface condition by comparing the spectrum models, which are acquired in advance for each of respective road surface conditions, with the power spectrum acquired by the spectrum computation unit 310. Thereafter, the process transitions to Step S24.

In step S24, the control unit 307 transmits the road surface condition information indicative of the road surface condition to the terminal device 200 via the telephone network communication unit 306. Thereafter, the processes of step S20 and the steps thereafter are repeated. In this manner, the process shown in FIG. 17 is performed.

Figure 18:
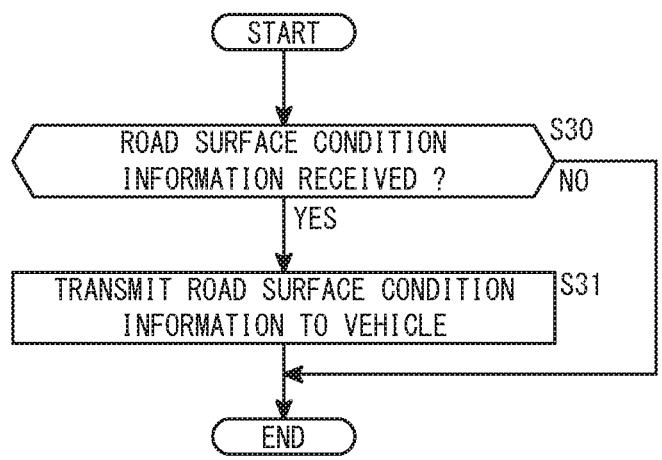
FIG. 18 is a flowchart illustrating an example of operations of the terminal device according to the first embodiment.

An example of operations of the terminal device 200 according to the present embodiment will be described with reference to FIG. 18. FIG. 18 is a flowchart illustrating and example of operations of the terminal device according to the present embodiment.

In step S30, the control unit 217 provided in the terminal device 200 determines whether or not the road surface condition information has been received from the server device 300. In the case that the road surface condition information has been received from the server device 300 (YES in step S30), the process transitions to step S31. In the case that the road surface condition information has not been received from the server device 300 (NO in step S30), the process illustrated in FIG. 18 is brought to an end.

In step S31, the control unit 217 transmits the road surface condition information to the vehicle 100 via the short-range wireless communication unit 216. In the case that step S31 is completed, the process shown in FIG. 18 is brought to an end. In this manner, the process shown in FIG. 18 is performed.

Figure 19:
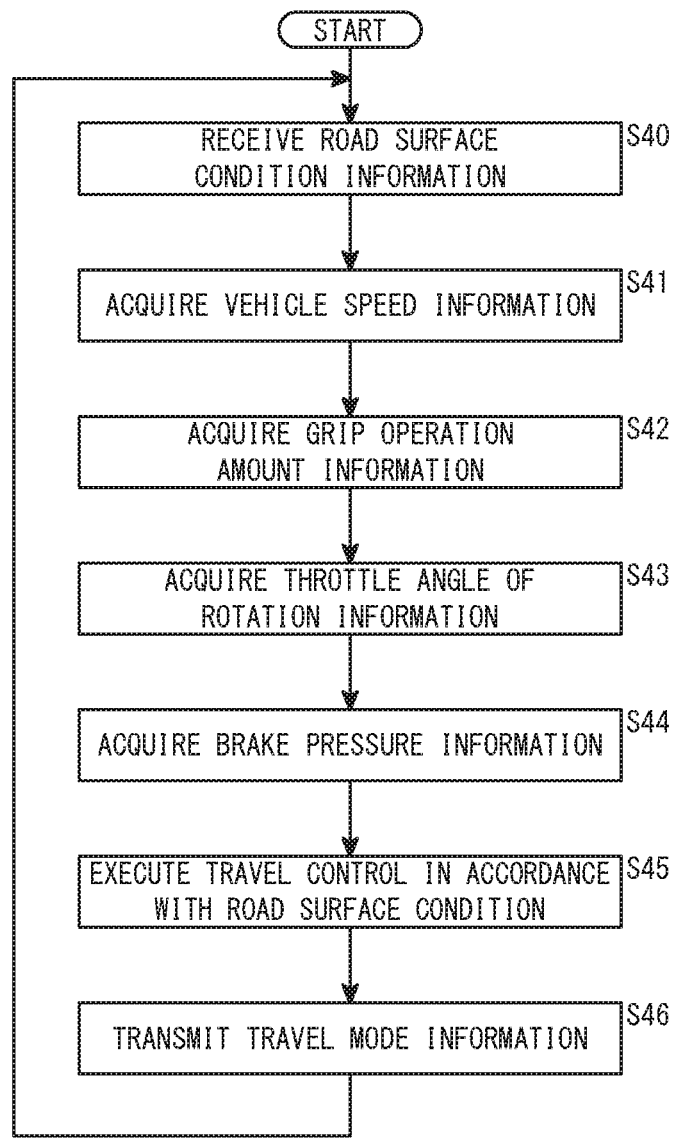
FIG. 19 is a flowchart illustrating an example of operations of the vehicle according to the first embodiment.

An example of operations of the vehicle 100 according to the present embodiment will be described with reference to FIG. 19. FIG. 19 is a flowchart illustrating an example of operations of the vehicle according to the present embodiment.

In step S40, the information acquisition unit 129 provided in the vehicle 100 receives the road surface condition information via the short-range wireless communication unit 114. Thereafter, the process transitions to Step S41.

In step S41, the control unit 130 provided in the vehicle 100 acquires the vehicle speed information supplied from the vehicle speed sensor 104. Thereafter, the process transitions to Step S42.

In step S42, the control unit 130 acquires the grip operation amount information supplied from the grip sensor 102. Thereafter, the process transitions to Step S43.

In step S43, the control unit 130 acquires the throttle angle of rotation information supplied from the throttle opening sensor 109. Thereafter, the process transitions to Step S44.

In step S44, the control unit 130 acquires the brake pressure information supplied from the brake sensor 108.

Thereafter, the process transitions to Step S45.

In step S45, the control unit 130 executes the travel control in accordance with the road surface condition.

In step S46, the control unit 130 transmits the travel mode information indicative of the travel mode to the terminal device 200 via the short-range wireless communication unit 114. In the case that step S46 is completed, the processes of step S40 and the steps thereafter are repeated. In this manner, the process shown in FIG. 19 is performed.

Figure 20:
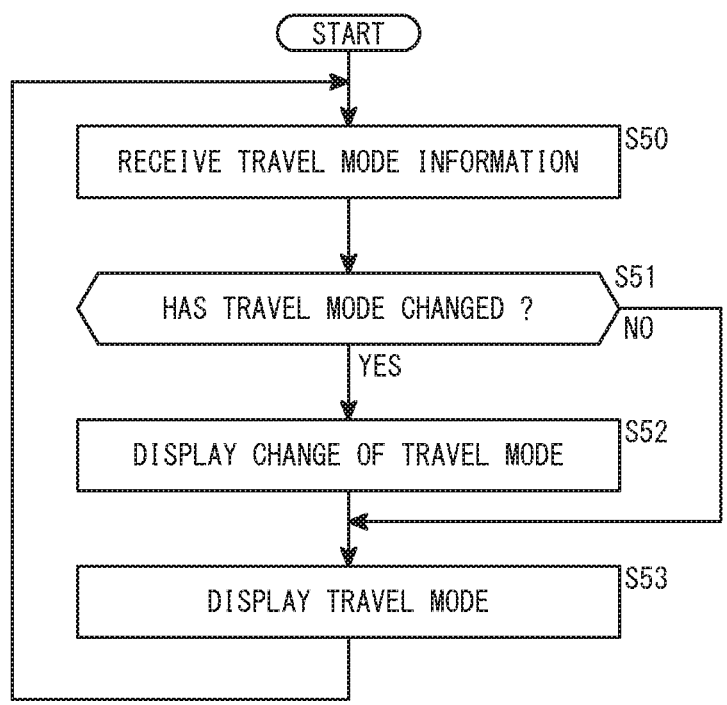
FIG. 20 is a flowchart illustrating an example of operations of the terminal device according to the first embodiment.

An example of operations of the terminal device 200 according to the present embodiment will be described with reference to FIG. 20. FIG. 20 is a flowchart illustrating an example of operations of the terminal device according to the present embodiment.

In step S50, the control unit 217 provided in the terminal device 200 receives the travel mode information from the vehicle 100 via the short-range wireless communication unit 216. Thereafter, the process transitions to Step S51.

In step S51, the control unit 217 determines whether or not the travel mode has been changed. More specifically, the control unit 217 determines whether or not the travel mode indicated by the travel mode information acquired at the previous time differs from the travel mode indicated by the travel mode information acquired at the present time. In the case that the travel mode has been changed (YES in step S51), the process transitions to step S52. In the case that the travel mode has not been changed (NO in step S51), the process transitions to step S53.

In step S52, the control unit 217 displays information indicating that the travel mode has been changed in the display area 88 of the display unit 208. For example, in the case that the travel mode has been changed from the SPORT mode (sports mode) to the RAIN mode (rain mode), the control unit 217 displays information to that effect in the display area 88 of the display unit 208. The attention of the driver may be alerted by causing flashing characters or the like to be displayed in the display area 88.

Thereafter, the process transitions to Step S53.

In step S53, the control unit 217 displays the travel mode in the display area 88 of the display unit 208. In the case that step S53 is completed, the processes of step S50 and the steps thereafter are repeated. In this manner, the process shown in FIG. 20 is performed.

In the foregoing manner, according to the present embodiment, the road surface condition is determined on the basis of the sound acquired by the microphone 202. In addition, the vehicle 100 is controlled on the basis of the control content in accordance with the road surface condition. Therefore, according to the present embodiment, it becomes possible for the vehicle to be controlled satisfactorily depending on the road surface condition.

(Modification)

Figure 21:
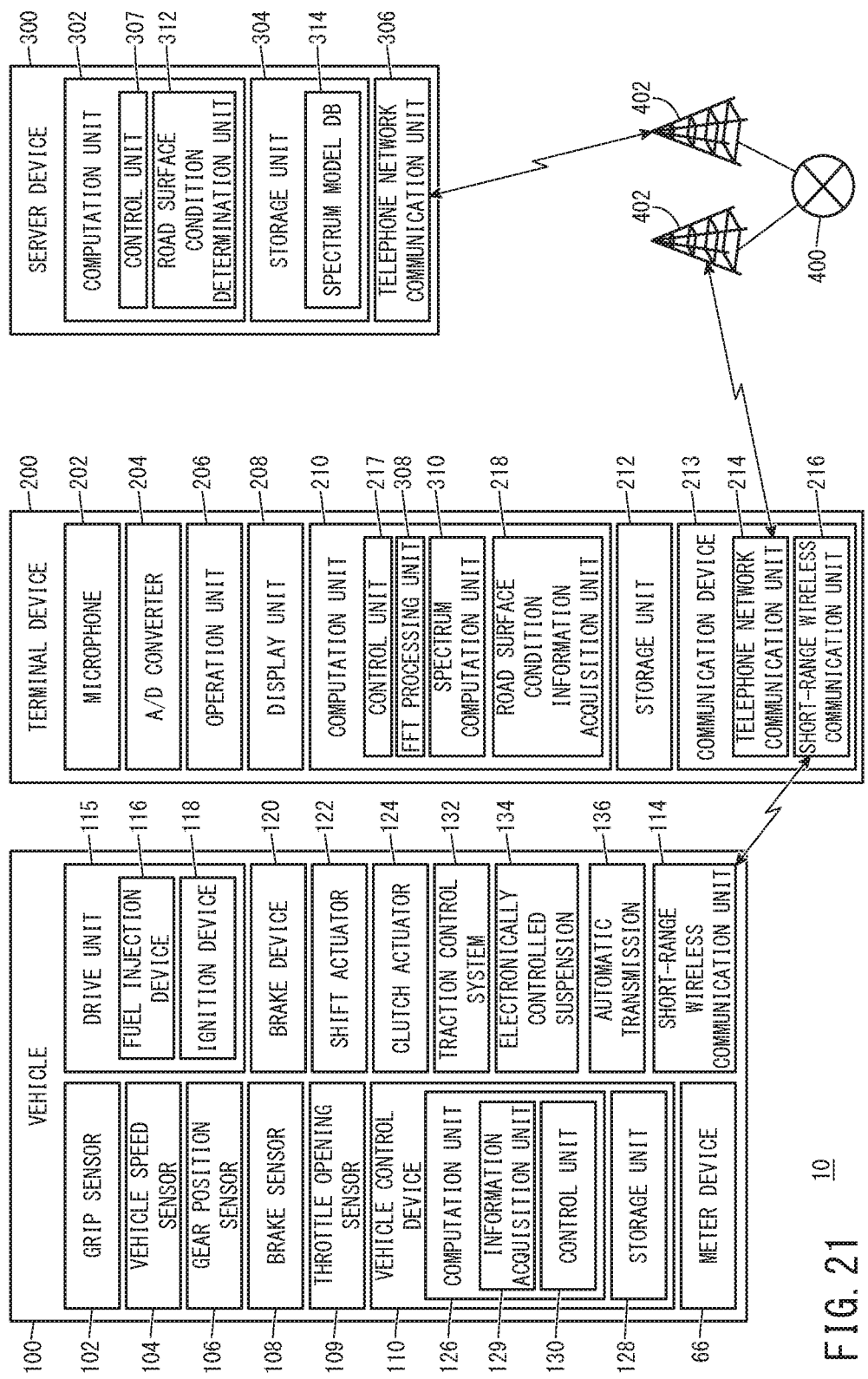
FIG. 21 is a block diagram showing a vehicle control system according to a modification of the first embodiment.
Figure 22:
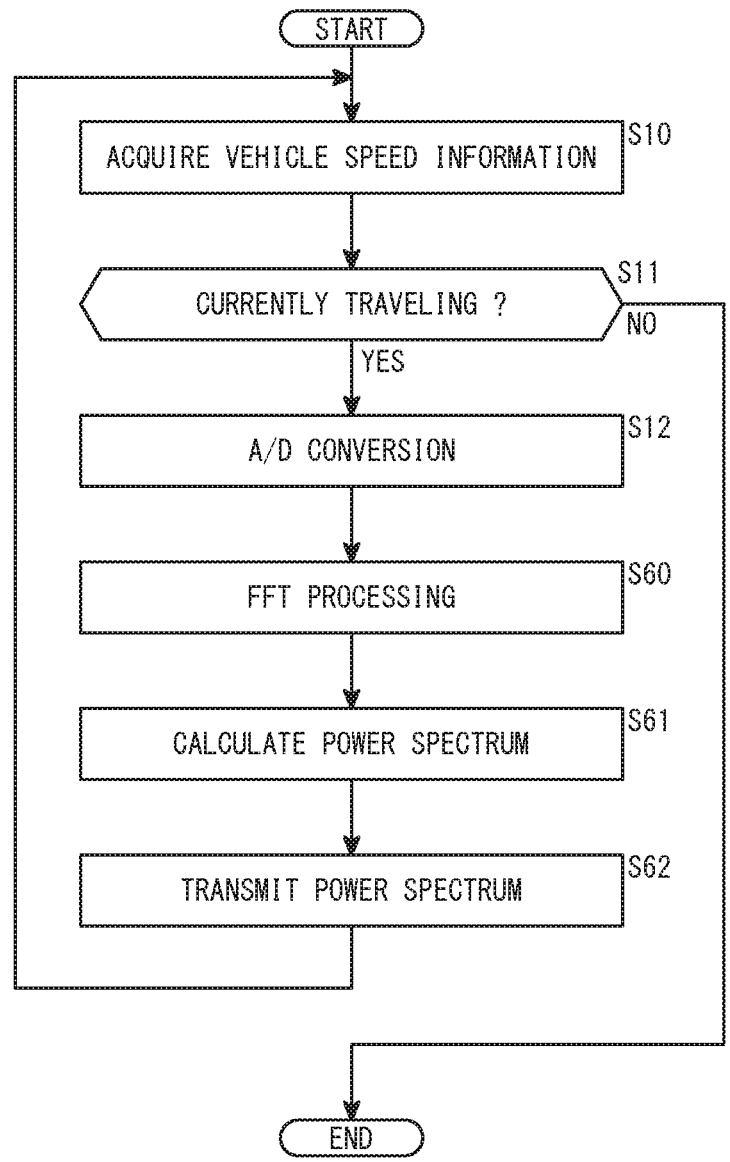
FIG. 22 is a flowchart illustrating operations of the terminal device according to the modification of the first embodiment.
Figure 23:
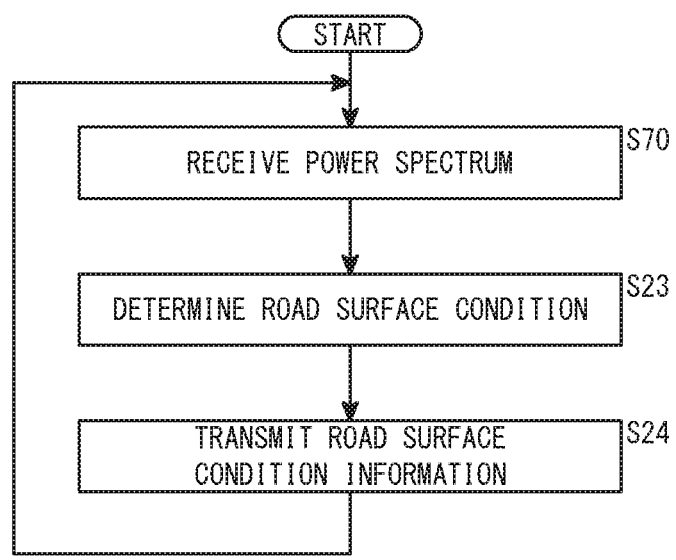
FIG. 23 is a flowchart illustrating operations of the server device according to the modification of the first embodiment.

A vehicle control device, a terminal device, a server device, a vehicle, a vehicle control system, and a vehicle control method according to a modification of the present embodiment will be described with reference to FIGS. 21 to 23. FIG. 21 is a block diagram showing a vehicle control system according to the present modification.

As shown in FIG. 21, according to the present modification, the computation unit 210 provided in the terminal device 200 is equipped with the FFT processing unit 308 and the spectrum computation unit 310. According to the present modification, the FFT processing unit 308 and the spectrum computation unit 310 are not provided in the computation unit 302 provided in the server device 300.

An example of operations of the terminal device 200 according to the present modification will be described with reference to FIG. 22. FIG. 22 is a flowchart illustrating operations of the terminal device according to the present modification.

Steps S10 to S12 are the same as steps S10 to S12 shown in FIG. 16, and therefore, description of these steps is omitted. In the case that step S12 is completed, the process transitions to step S60.

In step S60, the FFT processing unit 308 provided in the terminal device 200 performs a Fourier transform on the sound data to thereby generate transformation data. Thereafter, the process transitions to Step S61.

In step S61, the spectrum computation unit 310 provided in the terminal device 200 calculates the power spectrum on the basis of the transformation data generated by the FFT processing unit 308. Thereafter, the process transitions to Step S62.

In step S62, the control unit 217 provided in the terminal device 200 transmits the power spectrum to the server device 300 via the telephone network communication unit 214. After the completion of step S62, the processes of step S10 and the steps thereafter are repeated.

An example of operations of the server device 300 according to the present modification will be described with reference to FIG. 23. FIG. 23 is a flowchart illustrating operations of the server device according to the present modification.

In step S70, the control unit 307 provided in the server device 300 receives the power spectrum supplied from the terminal device 200 via the telephone network communication unit 306. Thereafter, the process transitions to Step S23.

Steps S23 and S24 are the same as steps S23 and S24 shown in FIG. 17, and therefore, description of these steps is omitted.

The operations of the vehicle 100 in the present modification are the same as the operations of the vehicle 100 according to the first embodiment described above with reference to FIG. 19, and therefore, description of such operations is omitted.

Thus, in the foregoing manner, the FFT processing unit 308 and the spectrum computation unit 310 may be provided in the terminal device 200. In the present modification as well, since the vehicle 100 is controlled on the basis of the control content in accordance with the road surface condition, it is possible to provide a vehicle control system which is capable of suitably controlling the vehicle 100.

Second Embodiment

Figure 24:
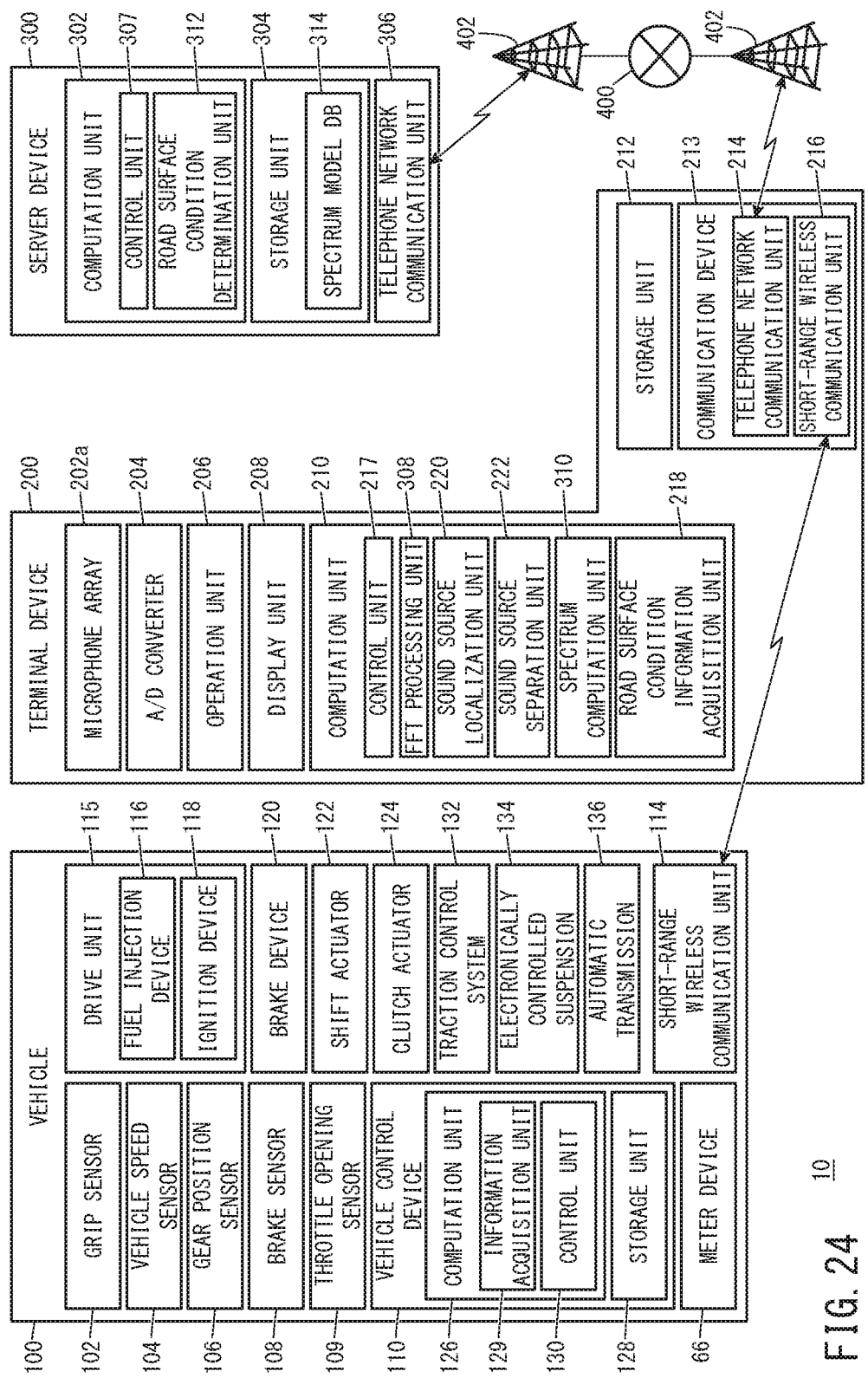
FIG. 24 is a block diagram illustrating a vehicle control system according to a second embodiment.

A vehicle control device, a terminal device, a server device, a vehicle, a vehicle control system, and a vehicle control method according to a second embodiment will be described with reference to FIGS. 24 and 25. FIG. 24 is a block diagram illustrating a vehicle control system according to the present embodiment.

In the present embodiment, a microphone array 202*a* including a plurality of the microphones 202 (see FIG. 1) is provided on the terminal device 200. According to the present embodiment, the computation unit 210 provided in the terminal device 200 is equipped with the FFT processing unit 308, a sound source localization unit 220, a sound source separation unit 222, and a spectrum computation unit 310. According to the present embodiment, the FFT processing unit 308, the sound source localization unit 220, the sound source separation unit 222, and the spectrum computation unit 310 are not provided in the server device 300.

The FFT processing unit 308 provided in the terminal device 200 performs a Fourier transform on the sound data on the basis of the sounds obtained by the microphone array 202*a*. The sound source localization unit 220 provided in the terminal device 200 estimates the position of the sound source by performing sound source localization using the conversion data obtained by the Fourier transform. Sound source localization is performed using, for example, beam forming. In accordance with this feature, the position of the sound source corresponding to the front wheel 20 of the vehicle 100 is estimated. The sound source separation unit 222 provided in the terminal device 200 performs sound source separation with respect to the converted data obtained by the Fourier transform. By performing sound source separation, the sound source separation unit 222 acquires sounds from the sound source corresponding to the front wheel 20 of the vehicle 100. For sound source separation, for example, a GHDSS (Geometric High-order Decorrelation-based Source Separation) method can be used; however, the present invention is not limited to this feature. Details of the sound source separation using a GHDSS method are disclosed, for example, in Japanese Patent No. 4444345. In this manner, the sound from the front wheel 20 of the vehicle 100 is selectively acquired. In the present embodiment, selective acquisition of the sound from the front wheel 20 is carried out because the sounds generated from the engine 115 are disadvantageously included within the sounds from the direction of the rear wheel 28.

The spectrum computation unit 310 provided in the terminal device 200 acquires the power spectrum on the basis of the separation data obtained by sound source separation. The control unit 217 provided in the terminal device 200 transmits the power spectrum obtained by the spectrum computation unit 310 to the server device 300 via the telephone network communication unit 214.

The control unit 307 provided in the server device 300 receives the power spectrum obtained in this manner via the telephone network communication unit 306. The road surface condition determination unit 312 determines the road surface condition by comparing the spectrum models, which are acquired in advance for each of respective road surface conditions, with the power spectrum supplied from the terminal device 200.

The control unit 307 provided in the server device 300 transmits the road surface condition information indicative of the road surface condition determined in this manner to the terminal device 200 via the telephone network communication unit 306. The road surface condition information acquisition unit 218 provided in the terminal device 200 acquires the road surface condition information supplied from the server device 300 via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

Operations of the terminal device 200 according to the present embodiment will be described with reference to FIG. 25. FIG. 25 is a flowchart illustrating operations of the terminal device according to the present embodiment.

Steps S10 to S12 are the same as steps S10 to S12 described above with reference to FIG. 16, and therefore, description of these steps is omitted. In the case that step S12 is completed, the process transitions to step S60.

Step S60 is the same as step S60 described above with reference to FIG. 22, and therefore, description of this step is omitted. Thereafter, the process transitions to Step S80.

In step S80, the sound source localization unit 220 provided in the terminal device 200 carries out sound source localization. According to the present embodiment, since the microphone array 202*a* is provided, it is possible to perform sound source localization. Since the sound source localization method is a well known method, description of such a method is omitted herein. Moreover, when performing such sound source localization, it is preferable that beam forming be used. Thereafter, the process transitions to Step S81.

In step S81, the sound source separation unit 222 provided in the terminal device 200 carries out sound source separation. The sound from the sound source corresponding to the front wheel 20 of the vehicle 100 is selectively obtained. Thereafter, the process transitions to Step S61.

Steps S61 and S62 are the same as steps S61 and S62 described above with reference to FIG. 22, and therefore, description of these steps is omitted.

The operations of the server device 300 according to the present embodiment are the same as the operations of the server device 300 according to the modification of the first embodiment described above with reference to FIG. 23, and therefore, description of such operations is omitted.

The operations of the vehicle 100 according to the present embodiment are the same as the operations of the vehicle 100 according to the first embodiment described above with reference to FIG. 19, and therefore, description of such operations is omitted.

In the foregoing manner, according to the present embodiment, since the sound source localization unit 220 and the sound source separation unit 222 are provided, the sound from the front wheel 20 can be selectively acquired while suppressing the acquisition of sounds emitted from the engine 115. Therefore, in accordance with the present embodiment, the road surface condition can be determined more suitably, and the control of the vehicle 100 can be performed more favorably depending on the road surface condition.

(Modification 1)

Figure 26:
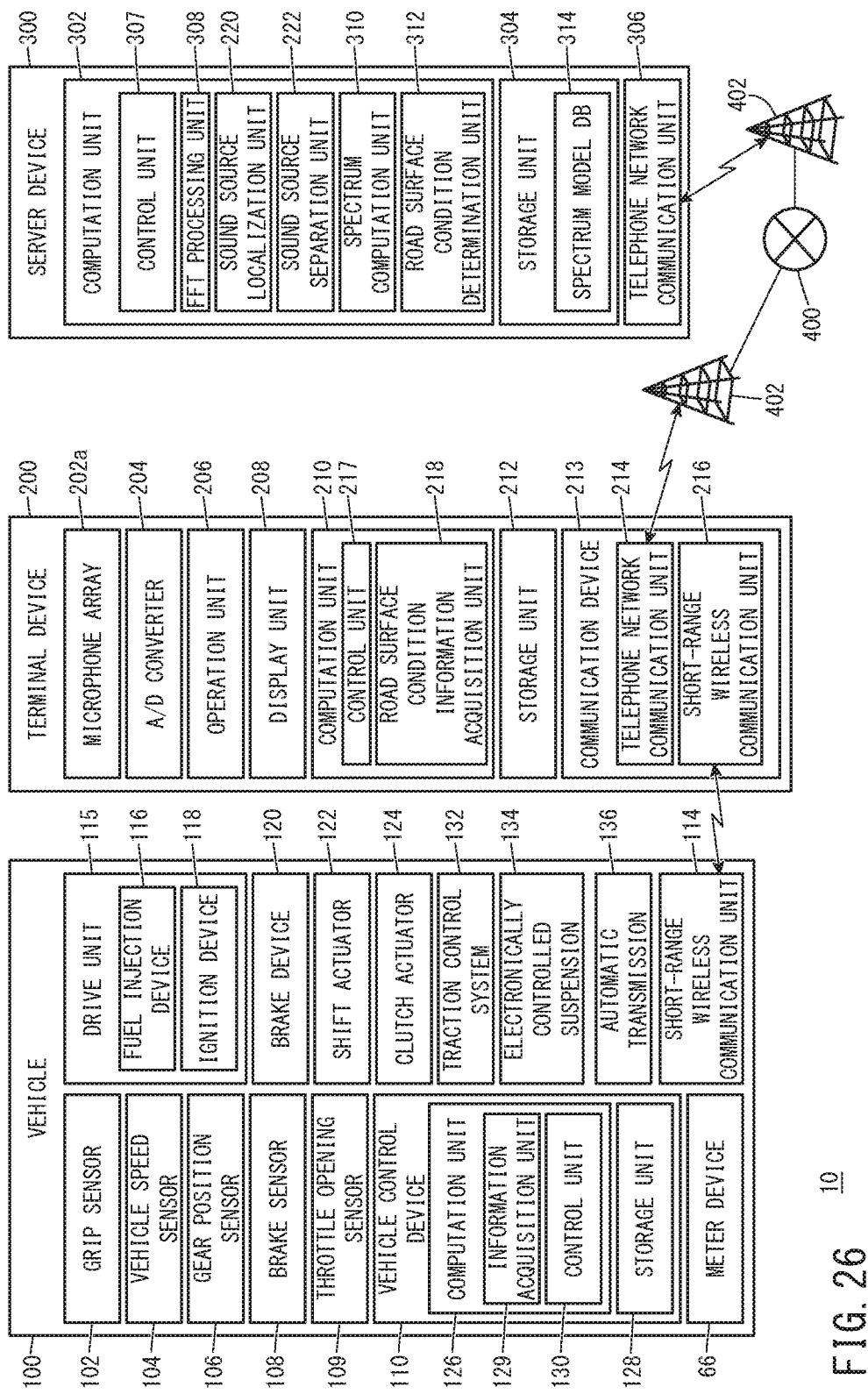
FIG. 26 is a block diagram showing a vehicle control system according to a first modification of the second embodiment.

A vehicle control device, a terminal device, a server device, a vehicle, a vehicle control system, and a vehicle control method according to Modification 1 of the present embodiment will be described with reference to FIGS. 26 and 27. FIG. 26 is a block diagram showing a vehicle control system according to the present modification.

According to the present modification, the FFT processing unit 308, the sound source localization unit 220, the sound source separation unit 222, and the spectrum computation unit 310 are provided in the server device 300. According to the present modification, the FFT processing unit 308, the sound source localization unit 220, the sound source separation unit 222, and the spectrum computation unit 310 are not provided in the terminal device 200.

The control unit 217 provided in the terminal device 200 transmits the sound data on the basis of the sounds acquired by the microphone array 202a to the server device 300 via the telephone network communication unit 214.

The control unit 307 provided in the server device 300 acquires the sound data via the telephone network communication unit 306. The FFT processing unit 308 provided in the server device 300 performs a Fourier transform on the sound data supplied from the terminal device 200 to thereby generate the transformation data. The sound source localization unit 220 provided in the server device 300 estimates the position of the sound source by performing sound source localization using the conversion data. The sound source separation unit 222 provided in the server device 300 acquires separation data by performing sound source separation with respect to the converted data obtained by the Fourier transform. In this manner, the sound from the front wheel 20 of the vehicle 100 is selectively acquired.

The spectrum computation unit 310 provided in the server device 300 acquires the power spectrum on the basis of the separation data obtained by sound source separation. The road surface condition determination unit 312 provided in the server device 300 determines the road surface condition by comparing the spectrum models, which are acquired in advance for each of respective road surface conditions, with the power spectrum acquired by the spectrum computation unit 310. The control unit 307 provided in the server device 300 transmits the road surface condition information indicative of the road surface condition determined by the road surface condition determination unit 312 to the terminal device 200 via the telephone network communication unit 306.

The road surface condition information acquisition unit 218 provided in the terminal device 200 receives the road surface condition information via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

The operations of the terminal device 200 according to the present modification are the same as the operations of the terminal device 200 according to the first embodiment described above with reference to FIG. 16, and therefore, description of such operations is omitted.

Operations of the server device 300 according to the present modification will be described with reference to FIG. 27. FIG. 27 is a flowchart illustrating operations of the server device according to the present modification.

Steps S20 and S21 are the same as steps S20 and S21 described above with reference to FIG. 17, and therefore, description of these steps is omitted. In the case that step S21 is completed, the process transitions to step S90.

In step S90, the sound source localization unit 220 provided in the server device 300 carries out sound source localization. Thereafter, the process transitions to Step S91.

In step S91, the sound source separation unit 222 provided in the server device 300 carries out sound source separation. In accordance with this feature, the sound from the sound source corresponding to the front wheel 20 of the vehicle 100 is selectively obtained. Thereafter, the process transitions to Step S22.

Steps S22 to S24 are the same as steps S22 to S24 described above with reference to FIG. 17, and therefore, description of these steps is omitted.

The operations of the vehicle 100 in the present modification are the same as the operations of the vehicle 100 according to the first embodiment described above with reference to FIG. 19, and therefore, description of such operations is omitted.

Thus, in the foregoing manner, the sound source localization unit 220 and the sound source separation unit 222 may be provided in the server device 300. According to the present modification as well, since the sound from the front wheel 20 can be selectively obtained, the road surface condition can be determined more suitably, and the control of the vehicle 100 can be performed more favorably depending on the road surface condition.

(Modification 2)

Figure 28:
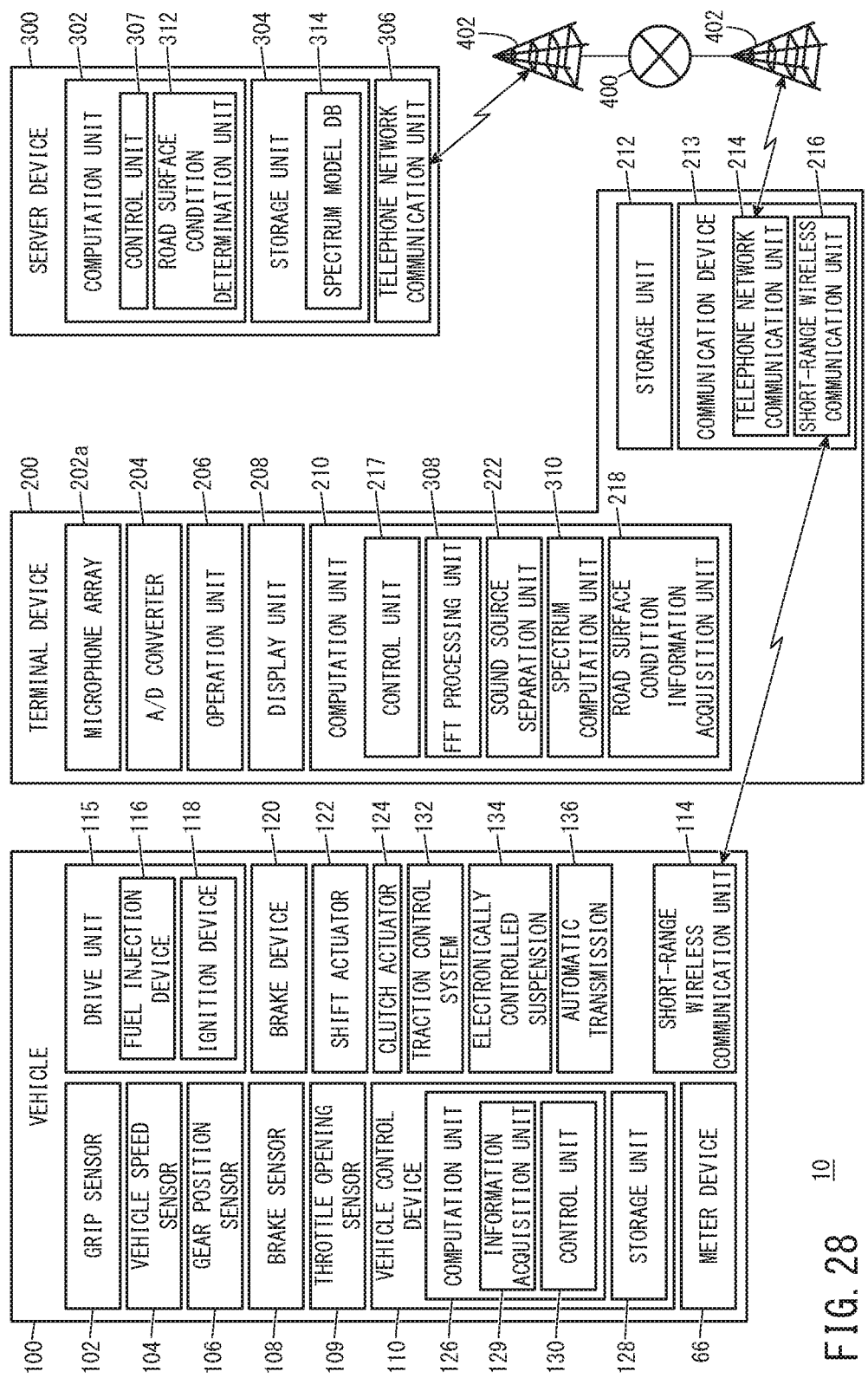
FIG. 28 is a block diagram showing a vehicle control system according to a second modification of the second embodiment.
Figure 29:
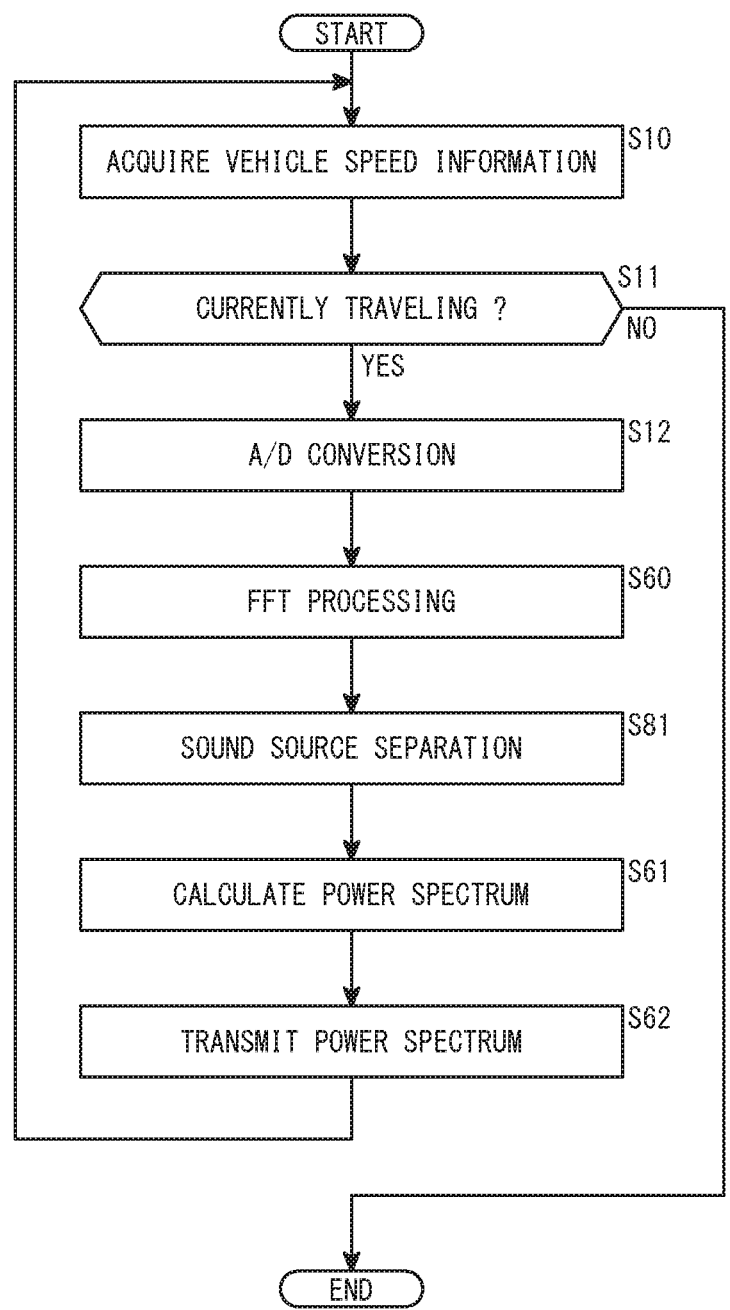
FIG. 29 is a flowchart illustrating operations of the terminal device according to the second modification of the second embodiment.

A vehicle control device, a terminal device, a server device, a vehicle, a vehicle control system, and a vehicle control method according to Modification 2 of the present embodiment will be described with reference to FIGS. 28 and 29. FIG. 28 is a block diagram showing a vehicle control system according to the present modification.

According to the present modification, the sound source localization unit 220 is not provided in the terminal device 200 or the server device 300. In the present modification, the FFT processing unit 308, the sound source separation unit 222, and the spectrum computation unit 310 are provided in the computation unit 210 that is provided in the terminal device 200. Further, according to the present modification, the FFT processing unit 308, the sound source separation unit 222, and the spectrum computation unit 310 are not provided in the server device 300.

The FFT processing unit 308 provided in the terminal device 200 performs a Fourier transform on the sound data on the basis of the sounds obtained by the microphone array 202a. The sound source separation unit 222 provided in the terminal device 200 performs sound source separation with respect to the converted data obtained by the Fourier transform. In the case that the relative positional relationship between the microphone array 202a and the front wheel 20 is known, sound source separation can be performed satisfactorily even without being equipped with the sound source localization unit 220, and the sound can be selectively acquired from the front wheel 20. In this manner, the sound from the front wheel 20 of the vehicle 100 is selectively acquired.

The spectrum computation unit 310 provided in the terminal device 200 acquires the power spectrum on the basis of the separation data obtained by sound source separation. The control unit 217 provided in the terminal device 200 transmits the power spectrum obtained by the spectrum computation unit 310 to the server device 300 via the telephone network communication unit 214.

The control unit 307 provided in the server device 300 receives the power spectrum obtained in this manner via the telephone network communication unit 306. The road surface condition determination unit 312 determines the road surface condition by comparing the spectrum models, which are acquired in advance for each of respective road surface conditions, with the power spectrum supplied from the terminal device 200.

The control unit 307 provided in the server device 300 transmits the road surface condition information indicative of the road surface condition determined in this manner to the terminal device 200 via the telephone network communication unit 306. The road surface condition information acquisition unit 218 provided in the terminal device 200 acquires the road surface condition information supplied from the server device 300 via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

Operations of the terminal device 200 according to the present modification will be described with reference to FIG. 29. FIG. 29 is a flowchart illustrating operations of the terminal device according to the present modification.

Figure 25:
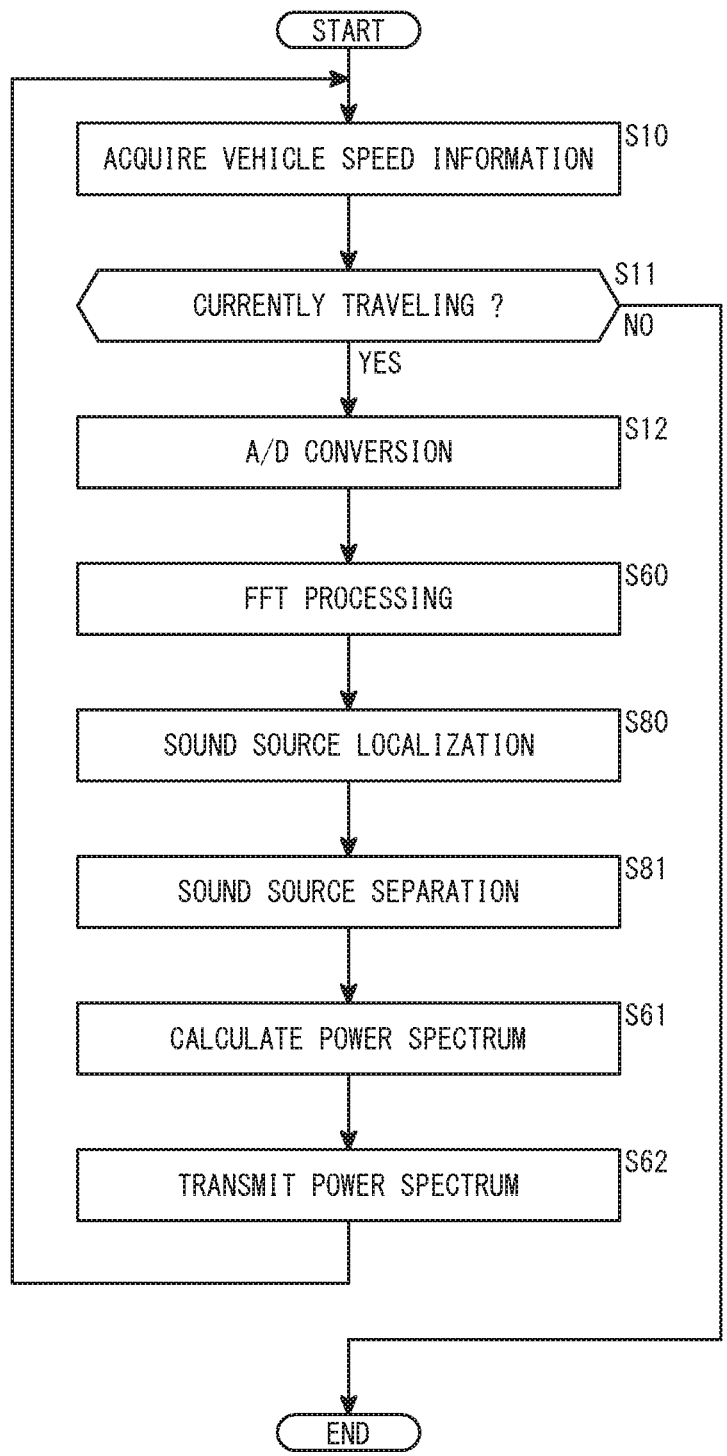
FIG. 25 is a flowchart illustrating operations of the terminal device according to the second embodiment.

Steps S10, S22, S11, S12, and S60 are the same as steps S10, S22, S11, S12, and S60 shown in FIG. 25, and therefore, description of these steps is omitted. In the case that step S60 is completed, the process transitions to step S81. Steps S81, S61, and S62 are the same as steps S81, S61, and S62 shown in FIG. 25, and therefore, description of these steps is omitted. In the case that step S62 is completed, the processes of step S10 and the steps thereafter are repeated.

The operations of the server device 300 in the present modification are the same as the operations of the server device 300 according to the modification of the first embodiment described above with reference to FIG. 23, and therefore, description of such operations is omitted.

The operations of the vehicle 100 in the present modification are the same as the operations of the vehicle 100 according to the first embodiment described above with reference to FIG. 19, and therefore, description of such operations is omitted.

Thus, in the foregoing manner, the sound source localization unit 220 need not necessarily be provided. In the manner described above, in the case that the relative positional relationship between the microphone array 202a and the front wheel 20 is known, sound source separation can be performed satisfactorily even without being equipped with the sound source localization unit 220, and the sound can be selectively acquired from the front wheel 20. Therefore, in accordance with the present modification as well, it is possible for the vehicle 100 to be controlled satisfactorily depending on the road surface condition.

(Modification 3)

Figure 30:
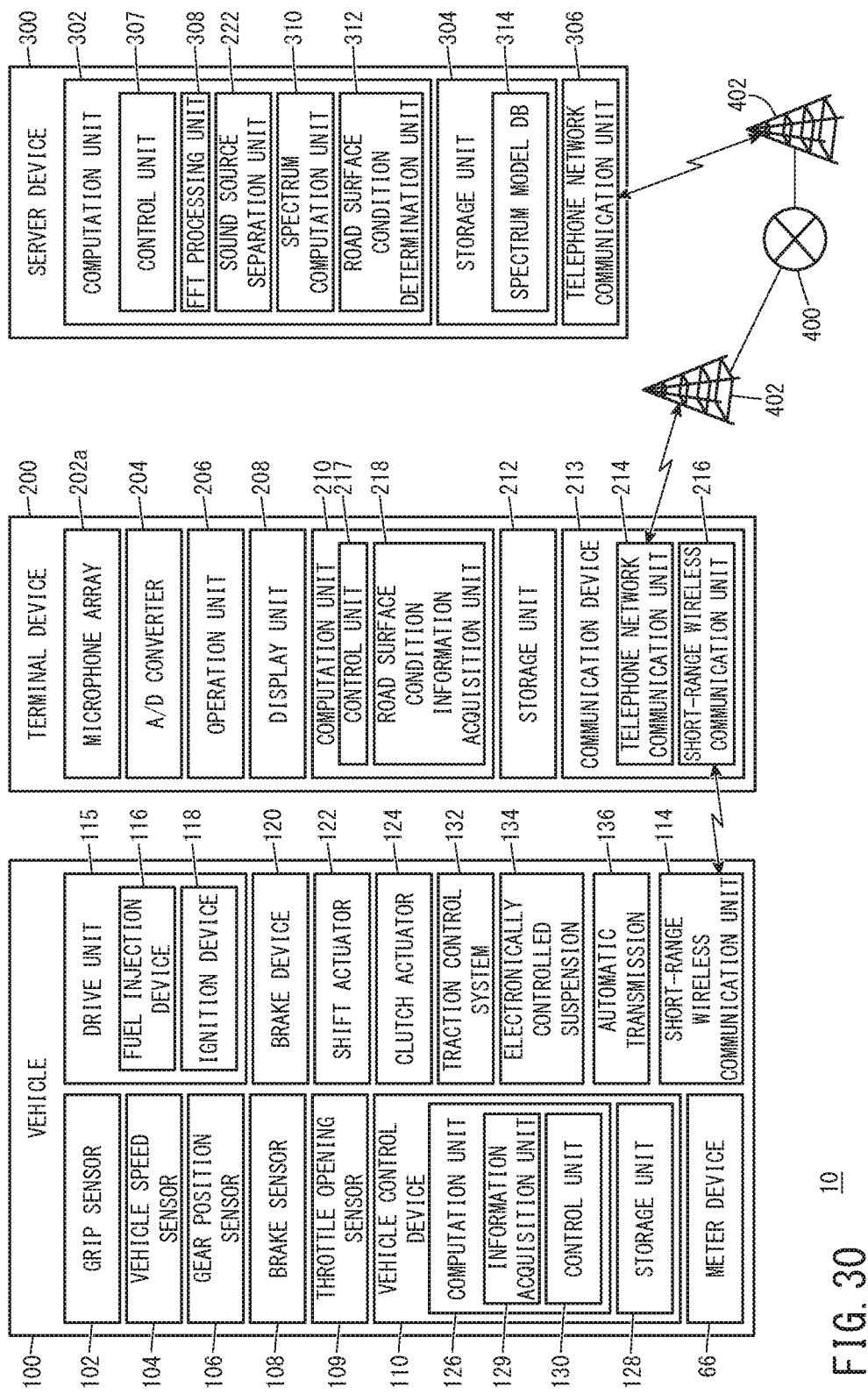
FIG. 30 is a block diagram showing a vehicle control system according to a third modification of the second embodiment.
Figure 31:
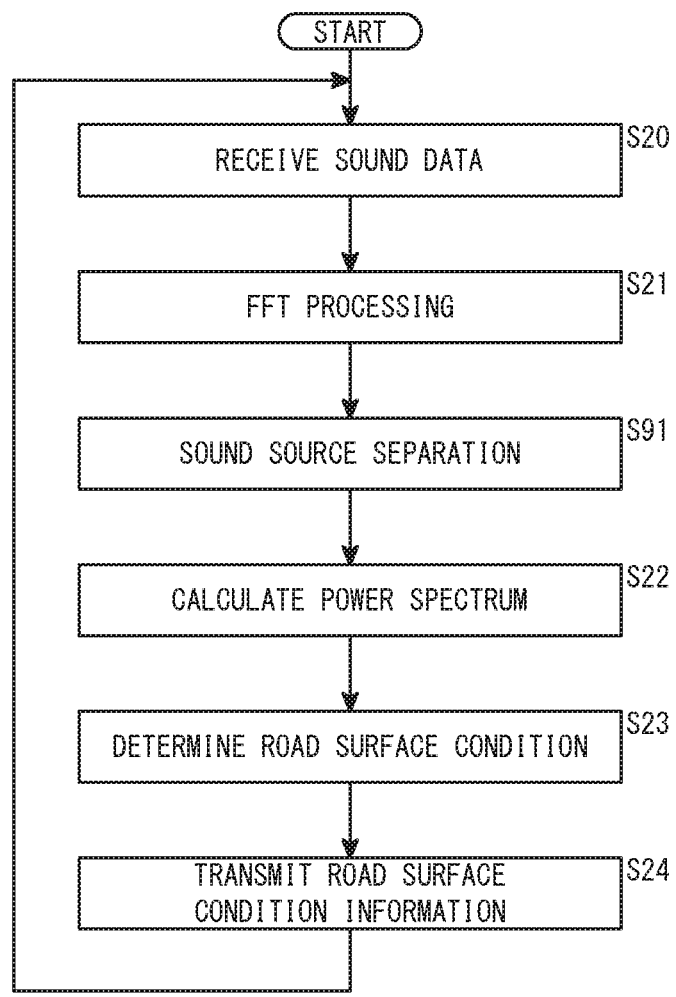
FIG. 31 is a flowchart illustrating operations of the server device according to the third modification of the second embodiment.

A vehicle control device, a terminal device, a server device, a vehicle, a vehicle control system, and a vehicle control method according to Modification 3 of the present embodiment will be described with reference to FIGS. 30 and 31. FIG. 30 is a block diagram showing a vehicle control system according to the present modification.

According to the present modification, the sound source localization unit 220 is not provided in the terminal device 200 or the server device 300. In the present modification, the FFT processing unit 308, the sound source separation unit 222, and the spectrum computation unit 310 are provided in the computation unit 302 that is provided in the server device 300. According to the present modification, the FFT processing unit 308, the sound source separation unit 222, and the spectrum computation unit 310 are not provided in the terminal device 200.

The control unit 217 provided in the terminal device 200 transmits the sound data on the basis of the sounds acquired by the microphone array 202a to the server device 300 via the telephone network communication unit 214.

The FFT processing unit 308 provided in the server device 300 performs a Fourier transform on the sound data supplied from the terminal device 200 to thereby generate the transformation data. The sound source separation unit 222 provided in the server device 300 acquires separation data by performing sound source separation with respect to the converted data obtained by the Fourier transform. In the case that the relative positional relationship between the microphone array 202a and the front wheel 20 is known, sound source separation can be performed satisfactorily even without being equipped with the sound source localization unit 220, and the sound can be selectively acquired from the front wheel 20.

The spectrum computation unit 310 provided in the server device 300 acquires the power spectrum on the basis of the separation data obtained by sound source separation. The road surface condition determination unit 312 provided in the server device 300 determines the road surface condition by comparing the spectrum models, which are acquired in advance for each of respective road surface conditions, with the power spectrum acquired by the spectrum computation unit 310. The control unit 307 provided in the server device 300 transmits the road surface condition information indicative of the road surface condition determined by the road surface condition determination unit 312 to the terminal device 200 via the telephone network communication unit 306.

The road surface condition information acquisition unit 218 provided in the terminal device 200 receives the road surface condition information via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

The operations of the terminal device 200 in the present embodiment are the same as the operations of the terminal device 200 according to the first embodiment described above with reference to FIG. 16, and therefore, description of such operations is omitted.

Operations of the server device 300 according to the present modification will be described with reference to FIG. 31. FIG. 31 is a flowchart illustrating operations of the server device according to the present modification.

Figure 27:
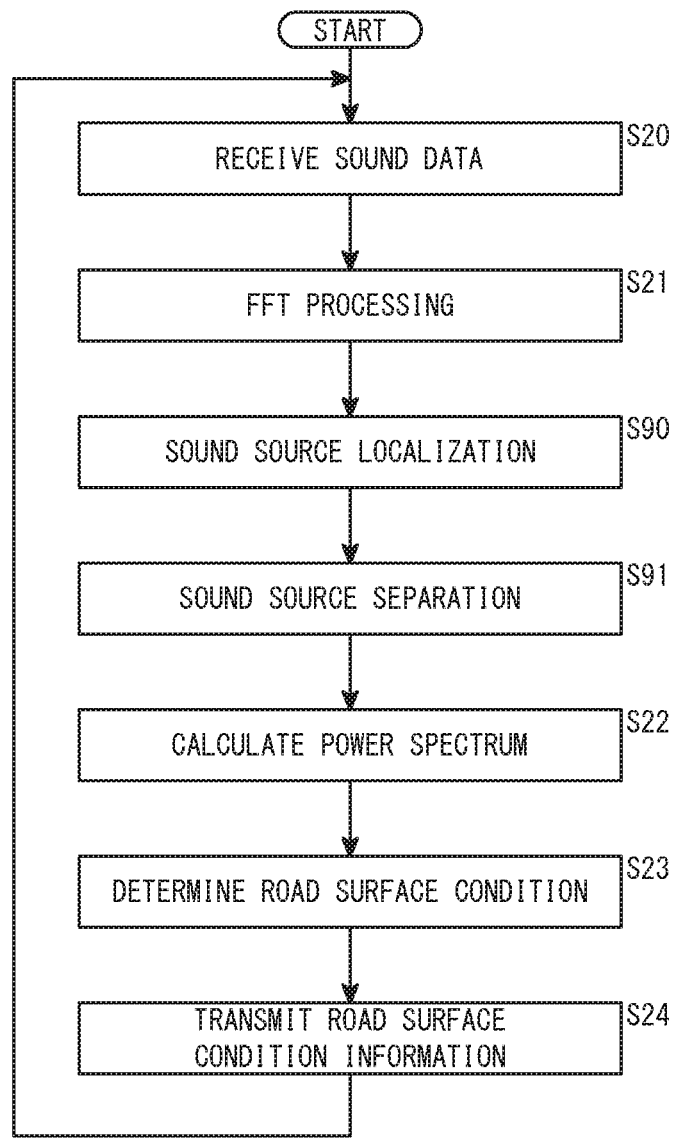
FIG. 27 is a flowchart illustrating operations of the server device according to the first modification of the second embodiment.

Steps S20 and S21 are the same as steps S20 and S21 shown in FIG. 27, and therefore, description of these steps is omitted. In the case that step S21 is completed, the process transitions to step S91.

Steps S91, S22, S23, and S24 are the same as steps S91, S22, S23, and S24 shown in FIG. 27, and therefore, description of these steps is omitted. In the case that step S24 is completed, the processes of step S20 and the steps thereafter are repeated.

The operations of the vehicle 100 in the present modification are the same as the operations of the vehicle 100 according to the first embodiment described above with reference to FIG. 19, and therefore, description of such operations is omitted.

Thus, in the foregoing manner, the sound source localization unit 220 need not necessarily be provided. In the manner described above, in the case that the relative positional relationship between the microphone array 202a and the front wheel 20 is known, sound source separation can be performed satisfactorily even without being equipped with the sound source localization unit 220, and the sound can be selectively acquired from the front wheel 20. Therefore, in accordance with the present modification as well, it is possible for the vehicle 100 to be controlled satisfactorily depending on the road surface condition.

Third Embodiment

Figure 32:
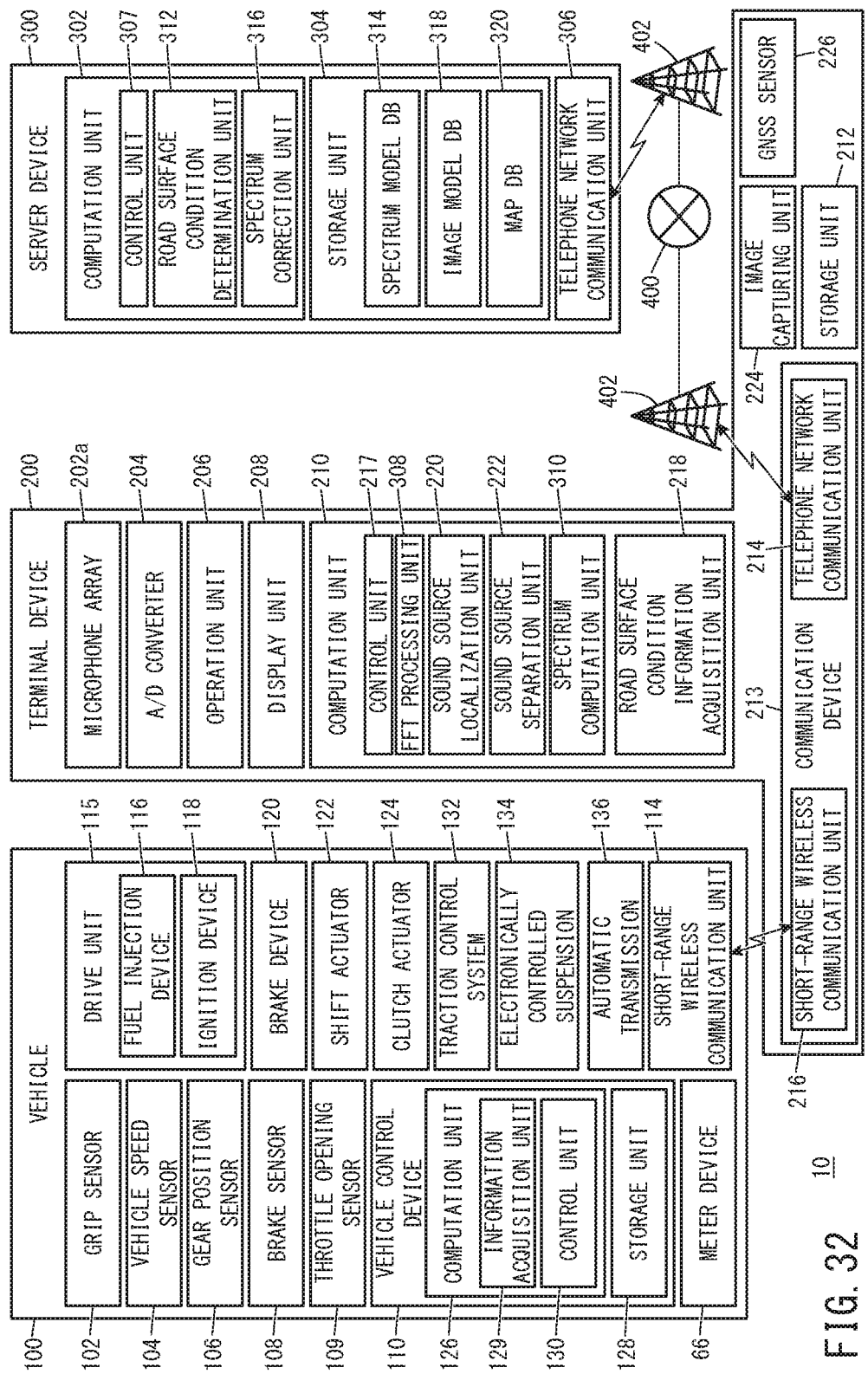
FIG. 32 is a block diagram illustrating a vehicle control system according to a third embodiment.

A vehicle control device, a terminal device, a server device, a vehicle, a vehicle control system, and a vehicle control method according to a third embodiment will be described with reference to FIGS. 32 to 34. FIG. 32 is a block diagram illustrating the vehicle control system according to the present embodiment.

According to the present embodiment, the terminal device 200 is equipped with the image capturing unit 224. According to the present embodiment, the microphone array 202a, the FFT processing unit 308, the sound source localization unit 220, the sound source separation unit 222, and the spectrum computation unit 310 are provided in the terminal device 200. In the present embodiment, the terminal device 200 is further equipped with a GNSS (Global Navigation Satellite System) sensor 226. The GNSS sensor 226 is capable of detecting the current position of the terminal device 200, and more specifically, the current position of the vehicle 100. The GNSS sensor 226 supplies information indicative of the current position, or in other words, current position information, to the computation unit 210 that is provided in the terminal device 200.

According to the present embodiment, the FFT processing unit 308, the sound source localization unit 220, the sound source separation unit 222, and the spectrum computation unit 310 are not provided in the server device 300.

According to the present embodiment, the computation unit 302 provided in the server device 300 is equipped with a spectrum correction unit 316. Further, according to the present embodiment, an image model database 318 is provided in the storage unit 304 provided in the server device 300.

The FFT processing unit 308 provided in the terminal device 200 performs a Fourier transform on the sound data on the basis of the sounds obtained by the microphone array 202a. The sound source localization unit 220 provided in the terminal device 200 estimates the position of the sound source by performing sound source localization using the conversion data obtained by the Fourier transform. In accordance with this feature, the position of the sound source corresponding to the front wheel 20 of the vehicle 100 is estimated. The sound source separation unit 222 provided in the terminal device 200 performs sound source separation with respect to the converted data obtained by the Fourier transform. In this manner, the sound from the front wheel 20 of the vehicle 100 is selectively acquired.

The spectrum computation unit 310 provided in the terminal device 200 acquires the power spectrum on the basis of the separation data obtained by sound source separation. The control unit 217 provided in the terminal device 200 transmits the power spectrum obtained by the spectrum computation unit 310 to the server device 300 via the telephone network communication unit 214.

The image capturing unit 224 provided in the terminal device 200 acquires a road surface image (image data) by capturing an image of the road surface. The control unit 217 provided in the terminal device 200 transmits the road surface image acquired by the image capturing unit 224 to the server device 300 via the telephone network communication unit 214. The control unit 217 acquires the current position information from the GNSS sensor 226. The control unit 217 transmits the current position information to the server device 300 via the telephone network communication unit 214.

The control unit 307 provided in the server device 300 receives the power spectrum via the telephone network communication unit 306. The control unit 307 receives the road surface image via the telephone network communication unit 306. The control unit 307 receives the current position information supplied from the terminal device 200 via the telephone network communication unit 306.

The control unit 307 reads out the map information corresponding to the received current position information from a map database 320 that is stored in the storage unit 304. The map information includes information that indicates the type of road surface. For example, information indicative of whether the road surface is asphalt, concrete, or cobblestone is included in the map information. On the basis of the information indicative of the type of road surface included within the map information, the control unit 307 determines the type of road surface on which the vehicle 100 is currently traveling. The spectrum correction unit 316 provided in the server device 300 corrects the spectrum models on the basis of the type of road surface.

The road surface condition determination unit 312 acquires a sound likelihood by comparing the spectrum models, which were corrected by the spectrum correction unit 316, with the power spectrum supplied from the terminal device 200. The road surface condition determination unit 312 acquires an image likelihood by comparing the road surface image with previously acquired image models which are acquired in advance for each of respective road surface conditions. The image model database (image model DB) 318 is provided in the storage unit 304. Image models which are acquired in advance for each of respective road surface conditions are stored in the image model database 318. As examples of the image models for each of the respective road surface conditions, there may be cited an image model for a case in which the road surface is dry, an image model for a case in which the road surface is wet, and the like. The road surface condition determination unit 312 determines the road surface condition using the sound likelihood and the image likelihood. More specifically, the road surface condition determination unit 312 determines the road surface condition on the basis of a likelihood obtained by integrating the sound likelihood and the image likelihood using a logistic function. The logistic function is represented by the following Expressions (1) and (2). Details of a method of integrating the sound likelihood and the image likelihood using the logistic function are disclosed in Japanese Patent No. 6427807.

The road surface condition determination unit 312 integrates the sound likelihood $L_s$ (s; $\Lambda_i$) and the image likelihood $L_v$ (v; $o_i$) using the logistic function shown in Expression (1) to thereby obtain a likelihood $F_L$ of the road surface condition for each of respective candidates. The term s is a characteristic value of the sound. The term $\Lambda_i$ is an ith spectrum model that is stored in the spectrum model database 314. The terms $\alpha_0$, $\alpha_1$, and $\alpha_2$ are parameters of the logistic function. The term v is a characteristic value of the image. The term $o_i$ is an image model of an ith object that is stored in the image model database 318.

The road surface condition determination unit 312 estimates a candidate $\hat{i}$ which maximizes the likelihood $F_L$ that is calculated using Expression (2). The term v is an input image, or in other words, image data. The term $o_i$ is an ith image model. The term argmax$F_L$ ( . . . ) is a function that gives $F_L$ so as to maximize . . . .

$$F_L(L_s, L_v) = \frac{1}{1 + e^{-(\alpha_0 + \alpha_1 L_s + \alpha_2 L_v)}} \quad (1)$$

$$\hat{i} = \underset{i}{\mathrm{argmax}} = F_L(L_s(s; \Lambda_i), L_v(v; o_i)) \quad (2)$$

The control unit 307 provided in the server device 300 transmits the road surface condition information indicative of the road surface condition determined in this manner to the terminal device 200 via the telephone network communication unit 306. The road surface condition information acquisition unit 218 provided in the terminal device 200 acquires the road surface condition information supplied from the server device 300 via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

Operations of the terminal device 200 according to the present embodiment will be described with reference to FIG. 33. FIG. 33 is a flowchart illustrating operations of the terminal device according to the present embodiment.

Steps S10 and S11 are the same as steps S10 and S11 shown in FIG. 25, and therefore, description of these steps is omitted. In the case that step S11 is completed, the process transitions to step S100.

In step S100, the image capturing unit 224 provided in the terminal device 200 acquires the road surface image by capturing an image of the road surface. Thereafter, the process transitions to Step S101.

In step S101, the control unit 217 provided in the terminal device 200 acquires the position information, and more specifically, the current position information using the GNSS sensor 226. Thereafter, the process transitions to Step S12.

Steps S12, S60, S80, S81, S61, and S62 are the same as steps S12, S60, S80, S81, S61, and S62 shown in FIG. 25, and therefore, description of these steps is omitted. In the case that step S62 is completed, the process transitions to step S102.

In step S102, the control unit 217 transmits the image data (the road surface image) to the server device 300 via the telephone network communication unit 214. Thereafter, the process transitions to Step S103.

In step S103, the control unit 217 transmits the position information, and more specifically, the current position information, to the server device 300 via the telephone network communication unit 214. In the case that step S103 is completed, the processes of step S10 and the steps thereafter are repeated. In this manner, the process shown in FIG. 33 is performed.

Operations of the server device 300 according to the present embodiment will be described with reference to FIG. 34. FIG. 34 is a flowchart illustrating operations of the server device according to the present embodiment.

Step S70 is the same as step S70 described above with reference to FIG. 23, and therefore, description of this step is omitted. In the case that step S70 is completed, the process transitions to step S110.

In step S110, the control unit 307 provided in the server device 300 receives the image data from the terminal device 200 via the telephone network communication unit 306. Thereafter, the process transitions to Step S111.

In step S111, the control unit 307 receives the position information, and more specifically, the current position information, via the telephone network communication unit 306. Thereafter, the process transitions to Step S112.

In step S112, the control unit 307 reads out from the map database 320 that is stored in the storage unit 304 the map information corresponding to the current position of the vehicle 100 indicated by the current position information. The map information includes information that indicates the type of road surface. On the basis of the information indicative of the type of road surface included within the map information, the control unit 307 determines the type of road surface corresponding to the current position of the vehicle 100. Thereafter, the process transitions to Step S113.

In step S113, the spectrum correction unit 316 provided in the server device 300 corrects the spectrum models on the basis of the type of road surface. Thereafter, the process transitions to Step S114.

In step S114, the road surface condition determination unit 312 provided in the server device 300 acquires the sound likelihood by comparing the spectrum models, which were corrected by the spectrum correction unit 316, with the power spectrum supplied from the terminal device 200. The road surface condition determination unit 312 acquires the image likelihood by comparing the road surface image with previously acquired image models which are acquired in advance for each of respective road surface conditions. The road surface condition determination unit 312 determines the road surface condition using the sound likelihood and the image likelihood. More specifically, the road surface condition determination unit 312 determines the road surface condition on the basis of a likelihood obtained by integrating the sound likelihood and the image likelihood using the logistic function. Thereafter, the process transitions to Step S24.

Step S24 is the same as step S24 shown in FIG. 17, and therefore, description of this step is omitted. In the case that step S24 is completed, the processes of step S70 and the steps thereafter are repeated. In this manner, the process shown in FIG. 34 is performed.

In the foregoing manner, according to the present embodiment, the road surface condition is determined on the basis of the sound acquired by the microphone 202, and the road surface image obtained by capturing an image of the road surface. Therefore, according to the present embodiment, the road surface condition information can be determined with higher accuracy. Therefore, according to the present embodiment, it becomes possible for the vehicle to be controlled satisfactorily depending on the road surface condition.

(Modification 1)

Figure 35:
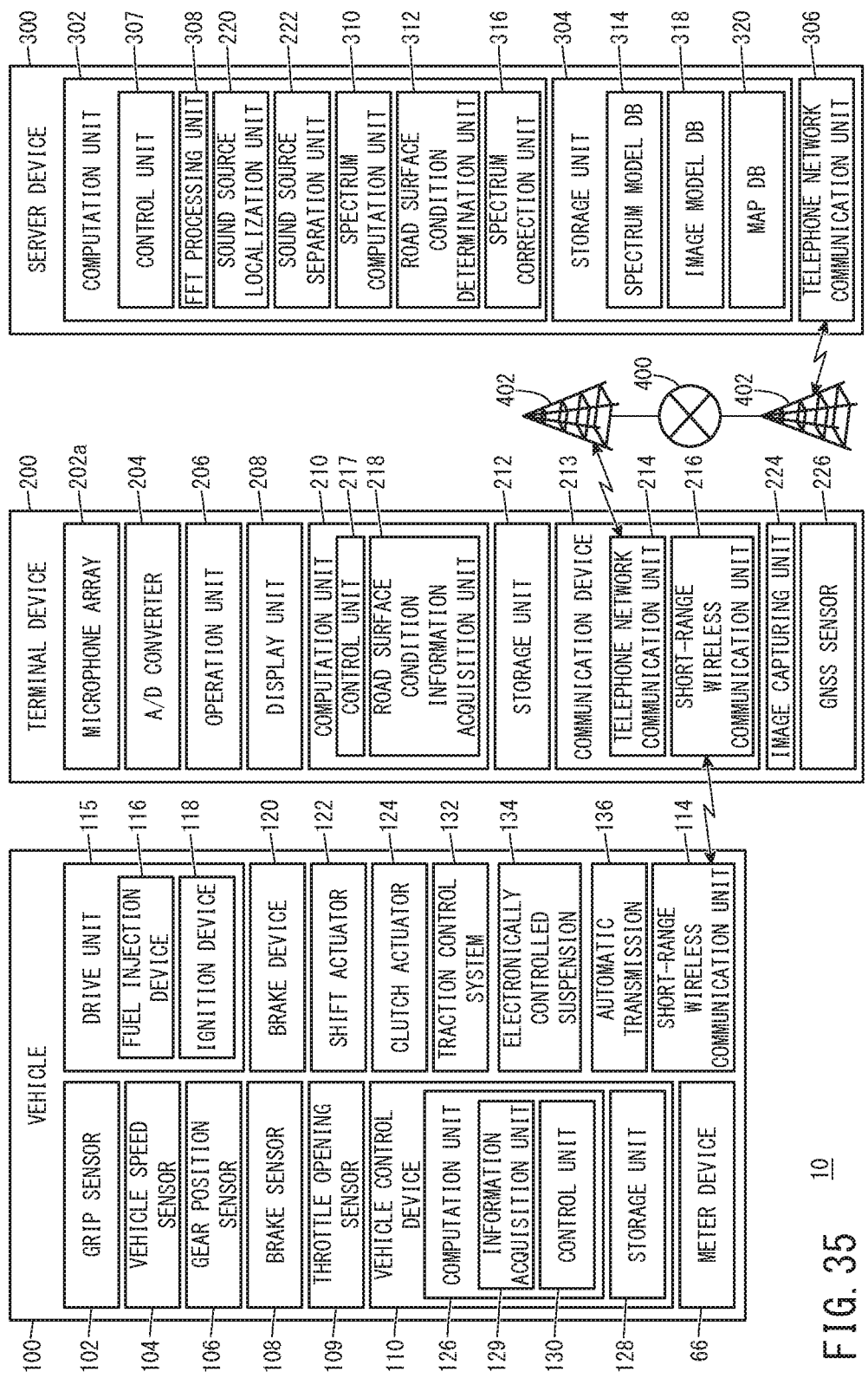
FIG. 35 is a block diagram showing a vehicle control system according to a first modification of the third embodiment.
Figure 36:
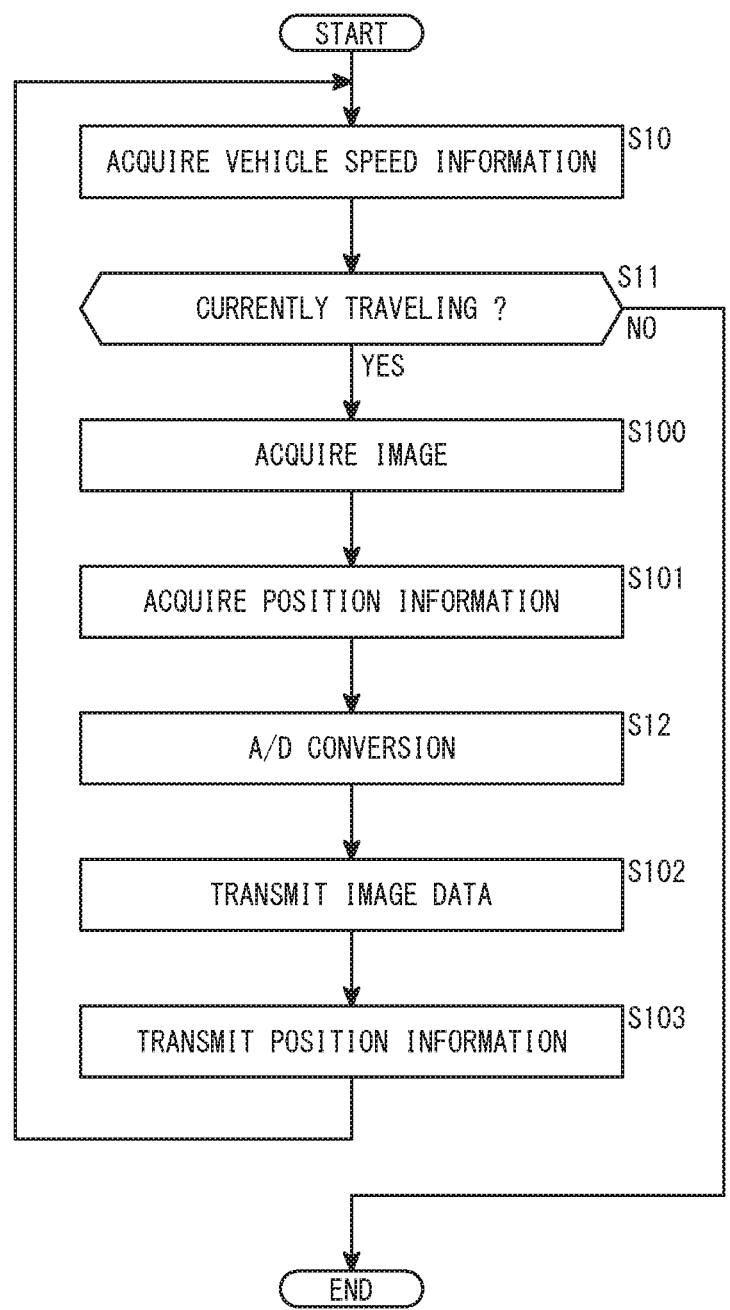
FIG. 36 is a flowchart illustrating operations of the terminal device according to a first modification of the third embodiment.

A vehicle control device, a terminal device, a server device, a vehicle, a vehicle control system, and a vehicle control method according to Modification 1 of the present embodiment will be described with reference to FIGS. 35 to 37. FIG. 35 is a block diagram showing a vehicle control system according to the present modification.

According to the present modification, the FFT processing unit 308, the sound source localization unit 220, the sound source separation unit 222, and the spectrum computation unit 310 are provided in the server device 300. According to the present modification, the FFT processing unit 308, the sound source localization unit 220, the sound source separation unit 222, and the spectrum computation unit 310 are not provided in the terminal device 200.

The control unit 217 provided in the terminal device 200 transmits the sound data on the basis of the sounds acquired by the microphone array 202a to the server device 300 via the telephone network communication unit 214. The image capturing unit 224 provided in the terminal device 200 acquires a road surface image (image data) by capturing an image of the road surface. The control unit 217 provided in the terminal device 200 transmits the road surface image acquired by the image capturing unit 224 to the server device 300 via the telephone network communication unit 214. The control unit 217 acquires the current position information from the GNSS sensor 226. The control unit 217 transmits the current position information to the server device 300 via the telephone network communication unit 214.

The control unit 307 provided in the server device 300 acquires the sound data via the telephone network communication unit 306. The control unit 307 acquires the image data via the telephone network communication unit 306. The control unit 307 acquires the current position information via the telephone network communication unit 306.

The FFT processing unit 308 provided in the server device 300 performs a Fourier transform on the sound data supplied from the terminal device 200 to thereby generate the transformation data. The sound source localization unit 220 provided in the server device 300 estimates the position of the sound source by performing sound source localization using the conversion data. The sound source separation unit 222 provided in the server device 300 acquires separation data by performing sound source separation with respect to the converted data obtained by the Fourier transform. In this manner, the sound from the front wheel 20 of the vehicle 100 is selectively acquired.

The spectrum computation unit 310 provided in the server device 300 acquires the power spectrum on the basis of the separation data obtained by sound source separation. The control unit 307 reads out the map information corresponding to the received current position information from a map database 320 that is stored in the storage unit 304. On the basis of the information indicative of the type of road surface included within the map information, the control unit 307 determines the type of road surface on which the vehicle 100 is currently traveling. The spectrum correction unit 316 provided in the server device 300 corrects the spectrum models on the basis of the type of road surface.

The road surface condition determination unit 312 acquires the sound likelihood by comparing the spectrum models, which were corrected by the spectrum correction unit 316, with the power spectrum supplied from the terminal device 200. The road surface condition determination unit 312 acquires the image likelihood by comparing the road surface image with previously acquired image models which are acquired in advance for each of respective road surface conditions. The road surface condition determination unit 312 determines the road surface condition using the sound likelihood and the image likelihood. More specifically, the road surface condition determination unit 312 determines the road surface condition on the basis of a likelihood obtained by integrating the sound likelihood and the image likelihood using the logistic function.

The control unit 307 provided in the server device 300 transmits the road surface condition information indicative of the road surface condition determined in this manner to the terminal device 200 via the telephone network communication unit 306. The road surface condition information acquisition unit 218 provided in the terminal device 200 acquires the road surface condition information supplied from the server device 300 via the telephone network communication unit 214. The control unit 217 provided in the terminal device 200 transmits the road surface condition information to the vehicle 100 via the short-range wireless communication unit 216.

The road surface condition information acquisition unit 218 provided in the terminal device 200 receives the road surface condition information via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

Operations of the terminal device 200 according to the present embodiment will be described with reference to FIG. 36. FIG. 36 is a flowchart illustrating operations of the terminal device according to the present modification.

Figure 33:
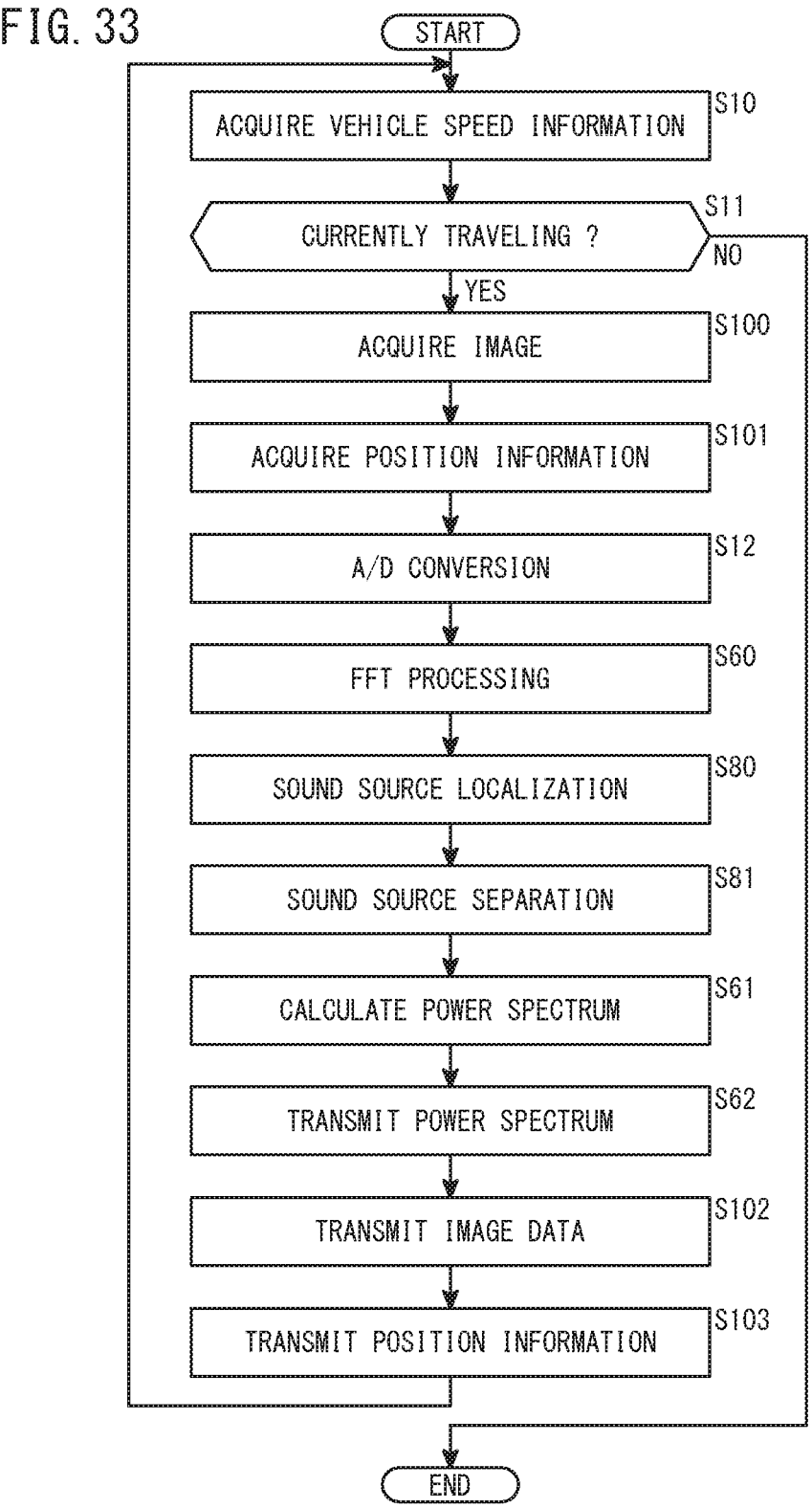
FIG. 33 is a flowchart illustrating operations of the terminal device according to the third embodiment.
Figure 34:
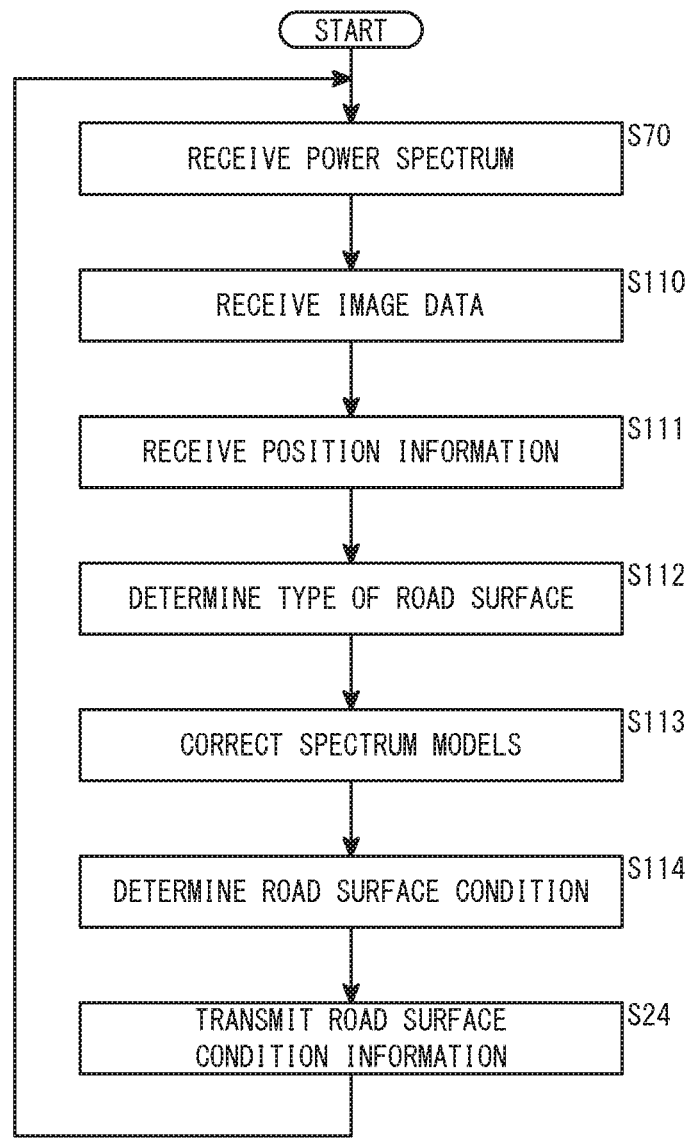
FIG. 34 is a flowchart illustrating an example of operations of a server device according to the third embodiment.

Steps S10, S11, S100, S101, and S12 are the same as steps S10, S11, S100, S101, and S12 shown in FIG. 33, and therefore, description of these steps is omitted. In the case that step S12 is completed, the process transitions to step S102.

Steps S102 and S103 are the same as steps S102 and S103 described above with reference to FIG. 33, and therefore, description of these steps is omitted. In the case that step S103 is completed, the processes of step S10 and the steps thereafter are repeated. In this manner, the process shown in FIG. 36 is performed.

Operations of the server device 300 according to the present modification will be described with reference to FIG. 37. FIG. 37 is a flowchart illustrating operations of the server device according to the present modification.

Step S20 is the same as step S20 described above with reference to FIG. 17, and therefore, description of this step is omitted. In the case that step S20 is completed, the process transitions to step S110.

Steps S110 and S111 are the same as steps S110 and S111 described above with reference to FIG. 34, and therefore, description of these steps is omitted. In the case that step S111 is completed, the process transitions to step S21.

Steps S21, S90, S91, and S22 are the same as steps S21, S90, S91, and S22 shown in FIG. 27, and therefore, description of these steps is omitted. In the case that step S22 is completed, the process transitions to step S112.

Steps S112, S113, S114, and S24 are the same as steps S112, S113, S114, and S24 described above with reference to FIG. 34, and therefore, description of these steps is omitted. In the case that step S24 is completed, the processes of step S20 and the steps thereafter are repeated. In this manner, the process shown in FIG. 37 is performed.

In the foregoing manner, the FFT processing unit 308, the sound source localization unit 220, the sound source separation unit 222, and the spectrum computation unit 310 are not provided in the server device 300.

(Modification 2)

Figure 38:
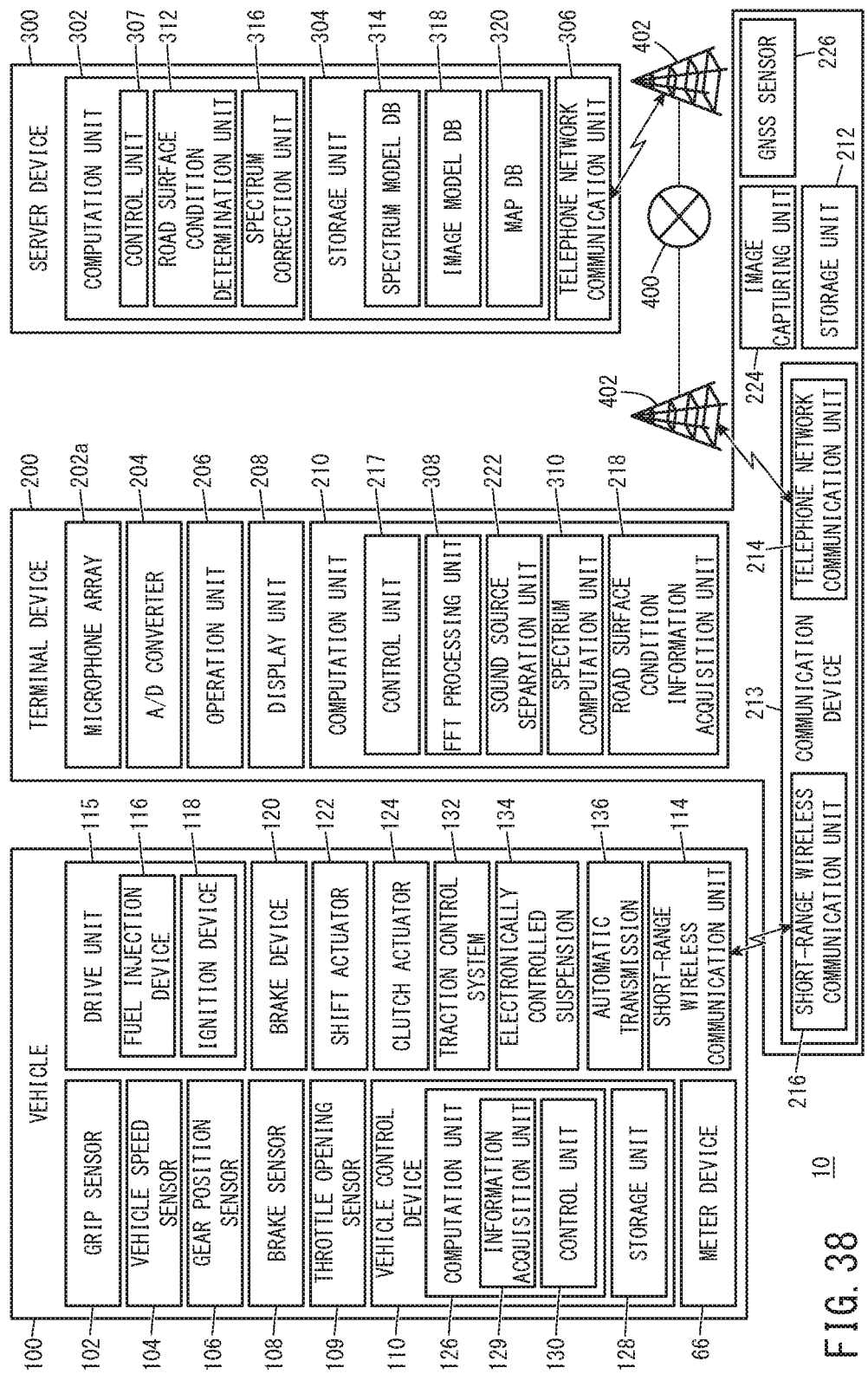
FIG. 38 is a block diagram showing a vehicle control system according to a second modification of the third embodiment.
Figure 39:
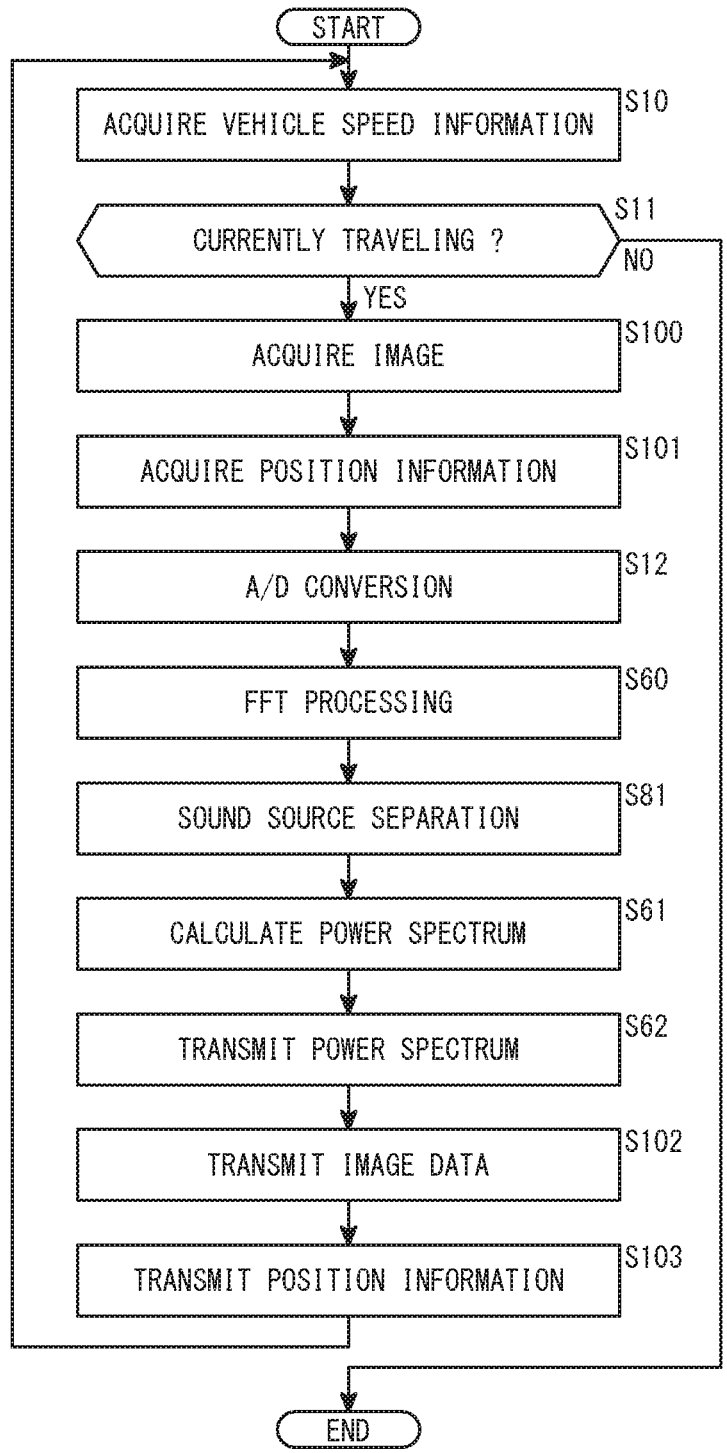
FIG. 39 is a flowchart illustrating operations of the terminal device according to the second modification of the third embodiment.

A vehicle control device, a terminal device, a server device, a vehicle, a vehicle control system, and a vehicle control method according to Modification 2 of the present embodiment will be described with reference to FIGS. 38 and 39. FIG. 38 is a block diagram showing a vehicle control system according to the present modification.

According to the present modification, the sound source localization unit 220 is not provided. In the present modification, the FFT processing unit 308, the sound source separation unit 222, and the spectrum computation unit 310 are provided in the computation unit 210 that is provided in the terminal device 200. Further, according to the present modification, the FFT processing unit 308, the sound source separation unit 222, and the spectrum computation unit 310 are not provided in the server device 300.

The FFT processing unit 308 provided in the terminal device 200 performs a Fourier transform on the sound data on the basis of the sounds obtained by the microphone array 202a. The sound source separation unit 222 provided in the terminal device 200 performs sound source separation with respect to the converted data obtained by the Fourier transform. In the case that the relative positional relationship between the microphone array 202a and the front wheel 20 is known, sound source separation can be performed satisfactorily even without being equipped with the sound source localization unit 220, and the sound can be selectively acquired from the front wheel 20. In this manner, the sound from the front wheel 20 of the vehicle 100 is selectively acquired.

The spectrum computation unit 310 provided in the terminal device 200 acquires the power spectrum on the basis of the separation data obtained by sound source separation. The control unit 217 provided in the terminal device 200 transmits the power spectrum obtained by the spectrum computation unit 310 to the server device 300 via the telephone network communication unit 214.

The image capturing unit 224 provided in the terminal device 200 acquires the image data by capturing an image of the road surface. The control unit 217 provided in the terminal device 200 transmits the image data to the server device 300 via the telephone network communication unit 214. The control unit 217 acquires the current position information from the GNSS sensor 226. The control unit 217 transmits the current position information to the server device 300 via the telephone network communication unit 214.

The control unit 307 provided in the server device 300 receives the power spectrum via the telephone network communication unit 306. The control unit 307 receives the road surface image via the telephone network communication unit 306. The control unit 307 receives the current position information supplied from the terminal device 200 via the telephone network communication unit 306.

The control unit 307 reads out the map information corresponding to the received current position information from a map database 320 that is stored in the storage unit 304. The map information includes information that indicates the type of road surface. On the basis of the information indicative of the type of road surface included within the map information, the control unit 307 determines the type of road surface on which the vehicle 100 is currently traveling. The spectrum correction unit 316 provided in the server device 300 corrects the spectrum models on the basis of the type of road surface.

The road surface condition determination unit 312 acquires the sound likelihood by comparing the spectrum models, which were corrected by the spectrum correction unit 316, with the power spectrum supplied from the terminal device 200. The road surface condition determination unit 312 acquires the image likelihood by comparing the road surface image with previously acquired image models which are acquired in advance for each of respective road surface conditions. The road surface condition determination unit 312 determines the road surface condition using the sound likelihood and the image likelihood. More specifically, the road surface condition determination unit 312 determines the road surface condition on the basis of a likelihood obtained by integrating the sound likelihood and the image likelihood using the logistic function.

The control unit 307 provided in the server device 300 transmits the road surface condition information indicative of the road surface condition determined in this manner to the terminal device 200 via the telephone network communication unit 306. The road surface condition information acquisition unit 218 provided in the terminal device 200 acquires the road surface condition information supplied from the server device 300 via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

Operations of the terminal device 200 according to the present modification will be described with reference to FIG. 39. FIG. 39 is a flowchart illustrating operations of the terminal device according to the present modification. Steps S10, S11, S100, S101, S12, and S60 are the same as steps S10, S11, S100, S101, S12, and S60 described above with reference to FIG. 33, and therefore, description of these steps is omitted. In the case that step S60 is completed, the process transitions to step S81.

Steps S81, S61, S62, S102, and S103 are the same as steps S81, S61, S62, S102, and S103 described above with reference to FIG. 33, and therefore, description of these steps is omitted. In the case that step S103 is completed, the processes of step S10 and the steps thereafter are repeated.

The operations of the server device 300 in the present modification are the same as the operations of the server device 300 described above with reference to FIG. 34, and therefore, description of such operations is omitted.

The operations of the vehicle 100 in the present modification are the same as the operations of the vehicle 100 according to the first embodiment described above with reference to FIG. 19, and therefore, description of such operations is omitted.

Thus, in the foregoing manner, the sound source localization unit 220 need not necessarily be provided. In the case that the relative positional relationship between the microphone array 202a and the front wheel 20 is known, sound source separation can be performed satisfactorily even without being equipped with the sound source localization unit 220, and the sound can be selectively acquired from the front wheel 20. Therefore, in accordance with the present modification as well, it is possible for the vehicle 100 to be controlled satisfactorily depending on the road surface condition.

(Modification 3)

Figure 40:
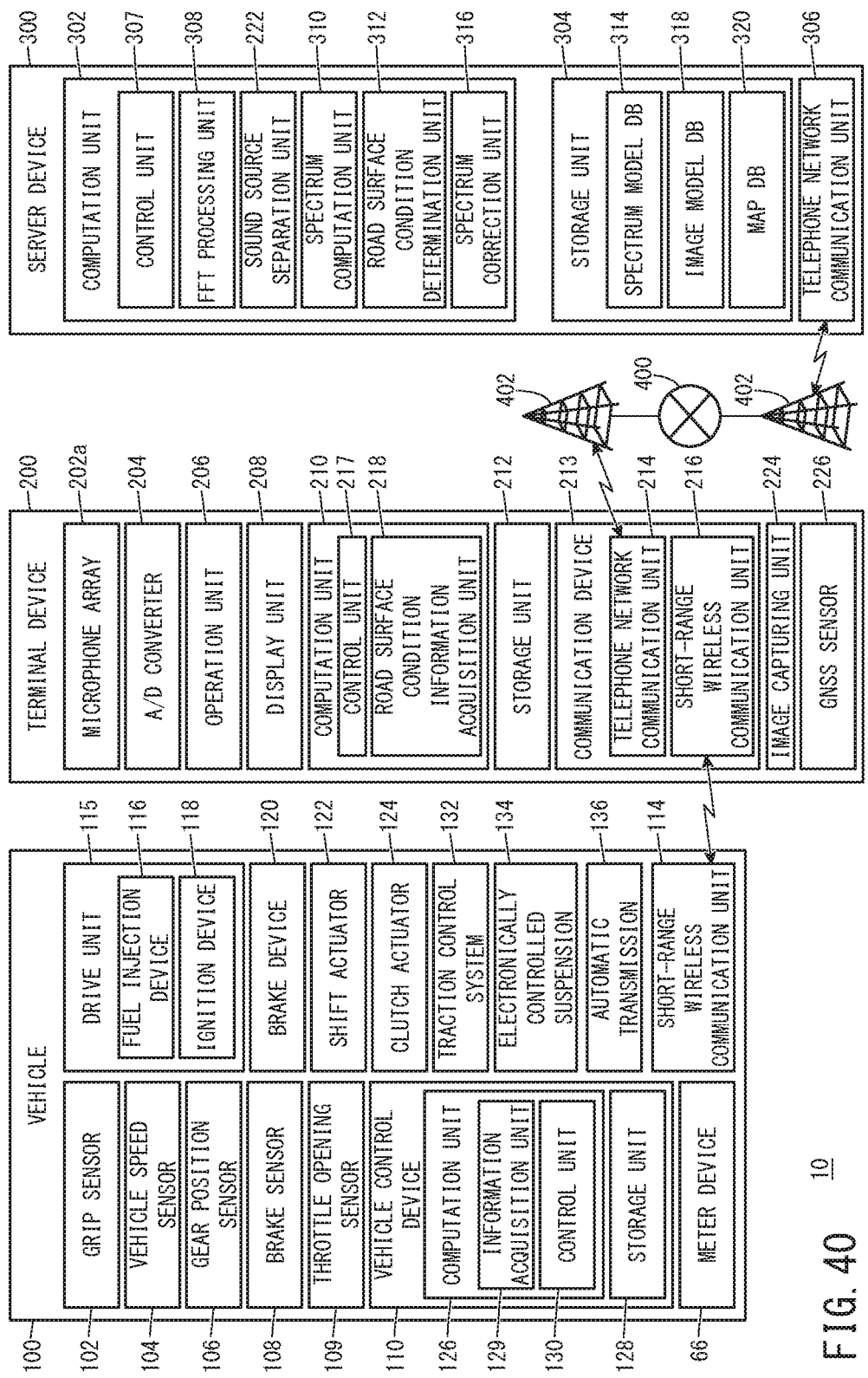
FIG. 40 is a block diagram showing a vehicle control system according to a third modification of the third embodiment.
Figure 41:
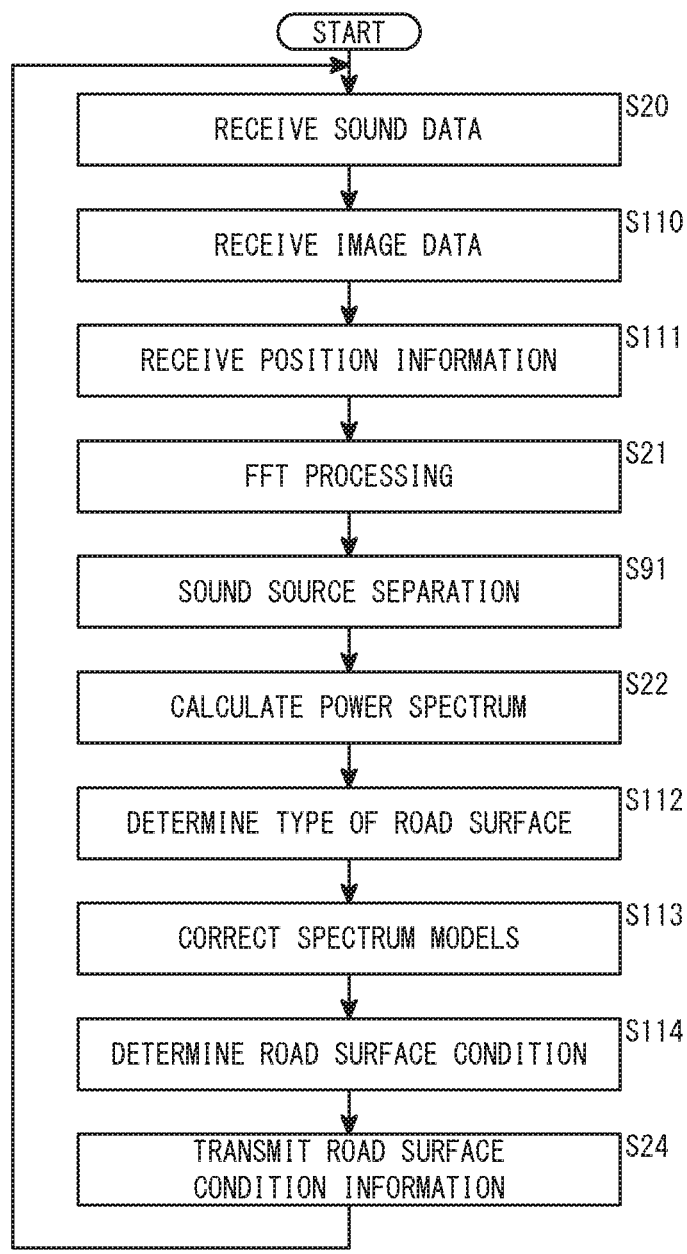
FIG. 41 is a flowchart illustrating operations of the server device according to the third modification of the third embodiment.

A vehicle control device, a terminal device, a server device, a vehicle, a vehicle control system, and a vehicle control method according to Modification 3 of the present embodiment will be described with reference to FIGS. 40 and 41. FIG. 40 is a block diagram showing a vehicle control system according to the present modification.

According to the present modification, the sound source localization unit 220 is not provided. In the present modification, the FFT processing unit 308, the sound source separation unit 222, and the spectrum computation unit 310 are provided in the computation unit 302 that is provided in the server device 300. According to the present modification, the FFT processing unit 308, the sound source separation unit 222, and the spectrum computation unit 310 are not provided in the terminal device 200.

The control unit 217 provided in the terminal device 200 transmits the sound data on the basis of the sounds acquired by the microphone array 202a to the server device 300 via the telephone network communication unit 214.

The image capturing unit 224 provided in the terminal device 200 acquires the image data by capturing an image of the road surface. The control unit 217 provided in the terminal device 200 transmits the image data to the server device 300 via the telephone network communication unit 214. The control unit 217 acquires the current position information from the GNSS sensor 226. The control unit 217 transmits the current position information to the server device 300 via the telephone network communication unit 214.

The FFT processing unit 308 provided in the server device 300 performs a Fourier transform on the sound data supplied from the terminal device 200 to thereby generate the transformation data. The sound source separation unit 222 provided in the server device 300 acquires separation data by performing sound source separation with respect to the converted data obtained by the Fourier transform. In the case that the relative positional relationship between the microphone array 202a and the front wheel 20 is known, sound source separation can be performed satisfactorily even without being equipped with the sound source localization unit 220, and the sound can be selectively acquired from the front wheel 20. The spectrum computation unit 310 provided in the server device 300 acquires the power spectrum on the basis of the separation data obtained by sound source separation.

The control unit 307 provided in the server device 300 receives the power spectrum via the telephone network communication unit 306. The control unit 307 receives the road surface image via the telephone network communication unit 306. The control unit 307 receives the current position information supplied from the terminal device 200 via the telephone network communication unit 306.

The control unit 307 reads out the map information corresponding to the received current position information from a map database 320 that is stored in the storage unit 304. The map information includes information that indicates the type of road surface. On the basis of the information indicative of the type of road surface included within the map information, the control unit 307 determines the type of road surface on which the vehicle 100 is currently traveling. The spectrum correction unit 316 provided in the server device 300 corrects the spectrum models on the basis of the type of road surface.

The road surface condition determination unit 312 acquires the sound likelihood by comparing the spectrum models, which were corrected by the spectrum correction unit 316, with the power spectrum supplied from the terminal device 200. The road surface condition determination unit 312 acquires the image likelihood by comparing the road surface image with previously acquired image models which are acquired in advance for each of respective road surface conditions. The road surface condition determination unit 312 determines the road surface condition using the sound likelihood and the image likelihood. More specifically, the road surface condition determination unit 312 determines the road surface condition on the basis of a likelihood obtained by integrating the sound likelihood and the image likelihood using the logistic function.

The control unit 307 provided in the server device 300 transmits the road surface condition information indicative of the road surface condition determined in this manner to the terminal device 200 via the telephone network communication unit 306. The road surface condition information acquisition unit 218 provided in the terminal device 200 acquires the road surface condition information supplied from the server device 300 via the telephone network communication unit 214. The control unit 217 provided in the terminal device 200 transmits the road surface condition information to the vehicle 100 via the short-range wireless communication unit 216.

The information acquisition unit 129 provided in the vehicle 100 acquires the road surface condition information via the short-range wireless communication unit 114. The control unit 130 reads out from the storage unit 128 the control content corresponding to the road surface condition indicated by the road surface condition information. On the basis of the control content read out from the storage unit 128, the control unit 130 controls the drive unit 115 provided in the vehicle 100 in the same manner as in the first embodiment.

The operations of the terminal device 200 according to the present modification are the same as the operations of the terminal device 200 described above with reference to FIG. 36, and therefore, description of such operations is omitted.

Operations of the server device 300 according to the present modification will be described with reference to FIG. 41. FIG. 41 is a flowchart illustrating operations of the server device according to the present modification.

Figure 37:
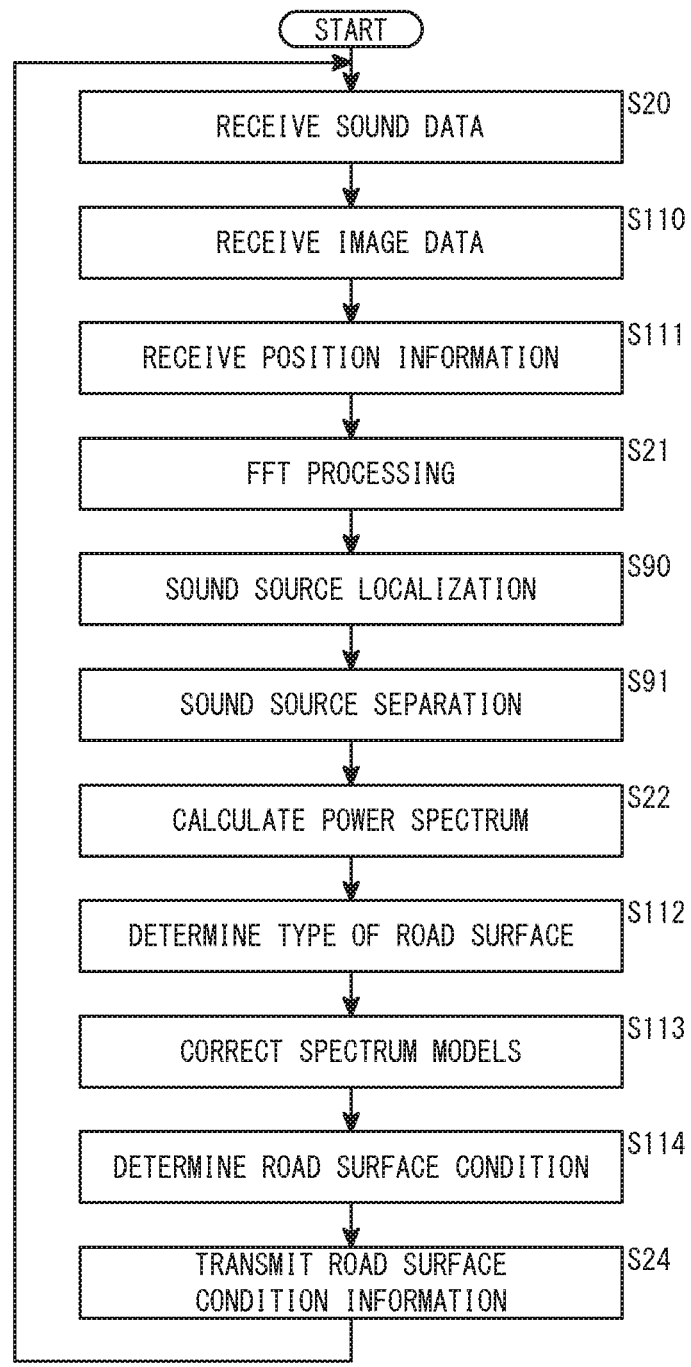
FIG. 37 is a flowchart illustrating operations of the server device according to a first modification of the third embodiment.

Steps S20, S110, S111, and S21 are the same as steps S20, S110, S111, and S21 shown in FIG. 37, and therefore, description of these steps is omitted. In the case that step S21 is completed, the process transitions to step S91.

Steps S91, S22, S112, S113, S114, and S24 are the same as steps S91, S22, S112, S113, S114, and S24 shown in FIG. 37, and therefore, description of these steps is omitted. In the case that step S24 is completed, the processes of step S20 and the steps thereafter are repeated.

The operations of the vehicle 100 in the present modification are the same as the operations of the vehicle 100 according to the first embodiment described above with reference to FIG. 19, and therefore, description of such operations is omitted.

Thus, in the foregoing manner, the sound source localization unit 220 need not necessarily be provided. In the manner described above, in the case that the relative positional relationship between the microphone array 202*a* and the front wheel 20 is known, sound source separation can be performed satisfactorily even without being equipped with the sound source localization unit 220, and the sound can be selectively acquired from the front wheel 20. Therefore, in accordance with the present modification as well, it is possible for the vehicle 100 to be controlled satisfactorily depending on the road surface condition.

Although preferred embodiments of the present invention have been described above, the present invention is not limited to the above-described embodiments, and various modifications thereto are possible without departing from the essence and gist of the present invention.

The above-described embodiments can be summarized in the following manner.

The vehicle control device (110) includes the information acquisition unit (129) that acquires the road surface condition information indicative of the road surface condition determined on the basis of the separation data obtained by performing the sound source separation with respect to the sound acquired by the microphone array (202*a*), the storage unit (128) in which there is stored the control content in accordance with the road surface condition, and the control unit (130) which controls the drive unit (115) provided on the vehicle (100), on the basis of the control content in accordance with the road surface condition indicated by the road surface condition information. In accordance with such a configuration, since the sound source separation is performed, the sound from the front wheel can be selectively acquired while suppressing the acquisition of sounds emitted from the engine. Therefore, in accordance with such a configuration, the road surface condition can be determined more suitably, and it becomes possible for the vehicle to be controlled more satisfactorily depending on the road surface condition.

A Fourier transform may be performed on the sound data on the basis of the sound acquired by the microphone array (202*a*), a separation data may be obtained by the sound source separation performed with respect to the transformation data obtained by the Fourier transform, a power spectrum may be acquired on the basis of the the separation data obtained by the sound source separation, and the road surface condition may be determined by comparing the power spectrum with previously acquired spectrum models for each of respective road surface conditions.

The vehicle (100) is a two-wheeled vehicle, and a sound from a front wheel (20) of the two-wheeled vehicle may be acquired in the sound source separation.

A position of the sound source is estimated by performing sound source localization with respect to the sound acquired by the microphone array (202*a*), and the sound from a sound source corresponding to the front wheel (20) of the two-wheeled vehicle may be obtained by the sound source separation.

The sound source localization may be performed using beam forming.

The sound source separation may be performed using a GHDSS (Geometric High-order Decorrelation-based Source Separation) method.

The control unit (130) may change an output characteristic of the drive unit (115) in accordance with the road surface condition.

The control unit (130) may change a degree of a throttle opening, which is dependent on an operated amount of the throttle grip (72) provided on the vehicle (100), in accordance with the road surface condition.

The control unit (130) may change a threshold value that activates a traction control system (132) in accordance with the road surface condition.

The control unit (130) may change an operating characteristic of the electronically controlled suspension (134) in accordance with the road surface condition.

The terminal device (200) comprises a generating unit (204) configured to generate sound data on the basis of a sound acquired by a microphone array (202*a*), a Fourier transform unit (308) configured to generate transformation data by performing a Fourier transform on the sound data, a sound source separation unit (222) configured to acquire separation data by performing sound source separation with respect to the transformation data, a spectrum computation unit (310) configured to acquire a power spectrum on the basis of the separation data, and a communication unit (213) configured to transmit the power spectrum to a server device (300), receive road surface condition information from the server device (300) indicative of a road surface condition determined on the basis of the power spectrum, and transmit the received road surface condition information to a vehicle (100).

The terminal device (200) comprises the generating unit (204) that generates the sound data on the basis of the sound acquired by the microphone array (202*a*), and the communication unit (213) which transmits the sound data to the server device (300), receives the road surface condition information from the server device (300) indicative of the road surface condition determined on the basis of the sound data, and transmits the received road surface condition information to the vehicle (100).

The server device (300) comprises the communication unit (306) that receives from the terminal device (200) power spectrum on the basis of separation data obtained by the sound source separation performed with respect to the sound acquired by the microphone (202), and the road surface condition determination unit (312) that determines the road surface condition by comparing the power spectrum with previously acquired spectrum models for each of respective road surface conditions, wherein the communication unit (306) transmits to the terminal device (200) the road surface condition information indicative of the road surface condition.

The server device (300) comprises the communication unit (306) that receives from the terminal device (200) the sound data on the basis of the sound acquired by the microphone array (202*a*), a Fourier transform unit (308) configured to generate transformation data by performing a Fourier transform on the sound data, a sound source separation unit (222) configured to acquire separation data by performing sound source separation with respect to the transformation data, a spectrum computation unit (310) configured to acquire a power spectrum on the basis of the separation data, and the road surface condition determination unit (312) that determines the road surface condition by comparing the power spectrum with previously acquired spectrum models for each of respective road surface conditions, wherein the communication unit (306) transmits to the terminal device (200) the road surface condition information indicative of the road surface condition.

The vehicle (100) comprises the information acquisition unit (129) that acquires the road surface condition information indicative of the road surface condition determined on the basis of sound data obtained by performing sound source separation with respect to the sound acquired by the microphone array (202*a*), the storage unit (128) in which there is stored the control content in accordance with the road surface condition, and the control unit (130) which controls the drive unit (115), on the basis of the control content in accordance with the road surface condition indicated by the road surface condition information.

A vehicle control system (10) according to yet another aspect of the present invention comprises a terminal device (200) configured to transmit a power spectrum on the basis of separation data obtained by performing sound source separation with respect to a sound acquired by a microphone array (202*a*), a server device (300) configured to determine a road surface condition on the basis of the power spectrum supplied from the terminal device (200), and transmit to the terminal device (200) road surface condition information which is information concerning the road surface condition, and a vehicle (100) configured to control a drive unit (115) on the basis of control content in accordance with the road surface condition information supplied from the terminal device (200).

The vehicle control system (10) comprises the terminal device (200) that transmits the sound data obtained by performing sound source separation with respect to the sound acquired by the microphone array (202*a*), the server device (300) that determines the road surface condition on the basis of the sound data supplied from the terminal device (200), and transmits to the terminal device (200) the road surface condition information which is information concerning the road surface condition, and the vehicle (100) which controls the drive unit (115) on the basis of the control content in accordance with the road surface condition information supplied from the terminal device (200).

The vehicle control method comprises the step of acquiring the road surface condition information indicative of the road surface condition determined on the basis of sound data obtained by performing sound source separation with respect to the sound acquired by the microphone array (202*a*), and the step of controlling the drive unit (115) provided on the vehicle (100), on the basis of the control content in accordance with the road surface condition indicated by the road surface condition information.

What is claimed is:

1. A vehicle control device, comprising:
a memory:
one or more processors that execute computer-executable instructions stored in the memory, wherein the one or more processors execute the computer-executable instructions to cause the vehicle control device to:

acquire road surface condition information indicative of a road surface condition determined on a basis of separation data obtained by sound source separation performed with respect to a sound acquired by a microphone array;
in the memory, control content in accordance with the road surface condition is stored; and
the one or more processors cause the vehicle control device to control a drive source provided on a vehicle, on a basis of the control content in accordance with the road surface condition indicated by the road surface condition information,
wherein the vehicle is a two-wheeled vehicle, and
in the sound source separation, a sound from a front wheel of the two-wheeled vehicle is selectively acquired while acquisition of sound from the drive source is suppressed.

2. The vehicle control device according to claim 1, wherein a Fourier transform is performed on sound data on a basis of the sound acquired by the microphone array, a separation data is obtained by the sound source separation performed with respect to the transformation data obtained by the Fourier transform, a power spectrum is acquired on a basis of the separation data obtained by the sound source separation, and the road surface condition is determined by comparing the power spectrum with previously acquired spectrum models for each of respective road surface conditions.

3. The vehicle control device according to claim 1, wherein a position of the sound source is estimated by performing sound source localization with respect to the sound acquired by the microphone array, and the sound from a sound source corresponding to the front wheel of the two-wheeled vehicle is obtained by the sound source separation.

4. The vehicle control device according to claim 3, wherein the sound source localization is performed using beam forming.

5. The vehicle control device according to claim 1, wherein the sound source separation is performed using a GHDSS (Geometric High-order Decorrelation-based Source Separation) method.

6. The vehicle control device according to claim 1, wherein the one or more processors cause the vehicle control device to change an output characteristic of the drive source in accordance with the road surface condition.

7. The vehicle control device according to claim 1, wherein the one or more processors cause the vehicle control device to change a degree of a throttle opening, which is dependent on an operated amount of a throttle grip provided on the vehicle, in accordance with the road surface condition.

8. The vehicle control device according to claim 1, wherein the one or more processors cause the vehicle control device to change a threshold value that activates a traction control system in accordance with the road surface condition.

9. The vehicle control device according to claim 1, wherein the one or more processors cause the vehicle control device to change an operating characteristic of an electronically controlled suspension in accordance with the road surface condition.

10. A terminal device mounted on a vehicle, comprising:
a memory;
one or more processors that execute computer-executable instructions stored in the memory;

wherein the one or more processors execute the computer-executable instructions to cause the terminal device to:

generate sound data on a basis of a sound acquired by a microphone array; and transmit the sound data to a server device, receive road surface condition information from the server device indicative of a road surface condition determined on a basis of the sound data with respect to which sound source separation has been performed, and transmit the received road surface condition information to the vehicle, wherein the vehicle is a two-wheeled vehicle, and in the sound source separation, a sound from a front wheel of the two-wheeled vehicle is selectively acquired while acquisition of sound from a drive source provided on the vehicle is suppressed.

11. A vehicle control system, comprising:

a terminal device configured to transmit sound data obtained by performing sound source separation with respect to a sound acquired by a microphone array;

a server device configured to determine a road surface condition on a basis of the sound data supplied from the terminal device, and transmit to the terminal device road surface condition information which is information concerning the road surface condition; and a vehicle configured to control a drive source unit on a basis of control content in accordance with the road surface condition information supplied from the terminal device, wherein the vehicle is a two-wheeled vehicle, and in the sound source separation, a sound from a front wheel of the two-wheeled vehicle is selectively acquired while acquisition of sound from a drive source is suppressed.

* * * * *

UNITED STATES PATENT AND TRADEMARK OFFICE
CERTIFICATE OF CORRECTION

PATENT NO. : 11,370,444 B2
APPLICATION NO. : 16/829008
DATED : June 28, 2022
INVENTOR(S) : Morita et al.

Page 1 of 1

It is certified that error appears in the above-identified patent and that said Letters Patent is hereby corrected as shown below:

In the Claims

In Line 10, in Column 40:
"unit" should be deleted.

Signed and Sealed this
Twenty-seventh Day of September, 2022

Katherine Kelly Vidal
*Director of the United States Patent and Trademark Office*